United States Patent
Wei et al.

(10) Patent No.: US 10,776,502 B2
(45) Date of Patent: Sep. 15, 2020

(54) DIVERSIFICATION OF PUBLIC KEYS

(71) Applicant: Apple Inc., Cupertino, CA (US)

(72) Inventors: Lei Wei, Cupertino, CA (US); Yannick L. Sierra, San Francisco, CA (US); Per Love Hornquist Astrand, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/619,519

(22) Filed: Jun. 11, 2017

(65) Prior Publication Data

US 2017/0357822 A1  Dec. 14, 2017

Related U.S. Application Data

(63) Continuation-in-part of application No. 15/275,234, filed on Sep. 23, 2016, now abandoned.

(60) Provisional application No. 62/349,027, filed on Jun. 12, 2016.

(51) Int. Cl.
*G06F 21/00* (2013.01)
*G06F 21/62* (2013.01)
*H04L 9/08* (2006.01)
*H04L 9/14* (2006.01)

(52) U.S. Cl.
CPC ...... *G06F 21/6218* (2013.01); *G06F 21/6227* (2013.01); *G06F 21/6272* (2013.01); *H04L 9/0825* (2013.01); *H04L 9/14* (2013.01)

(58) Field of Classification Search
CPC ....... H04L 63/102; H04L 63/08; H04L 63/06; H04L 63/0428; H04L 9/14; H04L 9/0825; H04L 2209/42; H04L 9/30; G06F 21/6218; G06F 21/6272; G06F 21/6227
See application file for complete search history.

(56) References Cited

U.S. PATENT DOCUMENTS

| | | | |
|---|---|---|---|
| 6,988,196 B2 * | 1/2006 | Cromer | G06F 21/31 713/155 |
| 7,869,593 B2 | 1/2011 | Beeson | |
| 7,873,169 B2 | 1/2011 | Zeng et al. | |
| 8,233,627 B2 | 7/2012 | Tanaka et al. | |

(Continued)

OTHER PUBLICATIONS

Guo, Hua, et al, "Efficient and Dynamic Key Management for Multiple Identities in Identity-Based Systems," Information Sciences, Sep. 4, 2012, 13 pages, vol. 221, Elsevier Inc., Netherlands.

(Continued)

*Primary Examiner* — Kendall Dolly
(74) *Attorney, Agent, or Firm* — Morgan, Lewis & Bockius LLP

(57) ABSTRACT

Some embodiments provide a method for providing public keys for encrypting data. The method receives (i) a first request from a first source for a public key associated with a particular user and (ii) a second request from a second source for the public key associated with the particular user. In response to the first request, the method distributes a first public key for the particular user to the first source. In response to the second request, the method distributes a second, different public key for the particular user to the second source. Data encrypted with the first public key and data encrypted with the second public key are decrypted by a device of the particular user with a same private key.

19 Claims, 41 Drawing Sheets

(56) References Cited

U.S. PATENT DOCUMENTS

| | | | |
|---|---|---|---|
| 8,259,947 B2* | 9/2012 | Rose | H04L 9/3247 380/277 |
| 8,583,149 B2 | 11/2013 | Vyrros | |
| 8,677,146 B2 | 3/2014 | Spalka et al. | |
| 8,769,612 B2 | 7/2014 | Ganapathy | |
| 9,031,876 B2 | 5/2015 | Mittal et al. | |
| 9,088,557 B2 | 7/2015 | Aoyagi et al. | |
| 9,324,067 B2 | 4/2016 | Van Os et al. | |
| 9,396,245 B2 | 7/2016 | Mackenzie | |
| 9,432,373 B2 | 8/2016 | Ryder | |
| 9,449,160 B1 | 9/2016 | Czeskis | |
| 9,930,067 B1* | 3/2018 | Johansson | H04L 63/166 |
| 9,961,055 B1* | 5/2018 | Johansson | H04L 63/061 |
| 9,990,165 B2 | 6/2018 | Fernandes | |
| 2002/0046188 A1* | 4/2002 | Burges | G06Q 20/3674 705/67 |
| 2002/0073322 A1* | 6/2002 | Park | H04L 9/3271 713/188 |
| 2002/0194476 A1* | 12/2002 | Lewis | H04L 9/3247 713/169 |
| 2004/0064710 A1* | 4/2004 | Vainstein | G06F 21/6209 713/189 |
| 2005/0091078 A1* | 4/2005 | Hunt | H04L 41/042 380/282 |
| 2006/0153368 A1* | 7/2006 | Beeson | H04L 9/3066 380/30 |
| 2007/0226301 A1 | 9/2007 | Provo | |
| 2008/0056501 A1* | 3/2008 | McGough | H04L 63/062 380/281 |
| 2009/0086977 A1* | 4/2009 | Berggren | H04L 9/3263 380/279 |
| 2009/0137225 A1 | 5/2009 | Costanzo | |
| 2009/0276623 A1* | 11/2009 | Jevans | G06F 21/6209 713/155 |
| 2010/0022307 A1* | 1/2010 | Steuer | A63F 13/12 463/42 |
| 2010/0056102 A1 | 3/2010 | Chan | |
| 2011/0252243 A1 | 10/2011 | Brouwer et al. | |
| 2011/0265157 A1 | 10/2011 | Ryder | |
| 2012/0005589 A1 | 1/2012 | Han et al. | |
| 2012/0174212 A1 | 7/2012 | Dart et al. | |
| 2013/0024919 A1 | 1/2013 | Wetter et al. | |
| 2013/0086378 A1* | 4/2013 | Yao | H04L 9/006 713/156 |
| 2013/0275744 A1* | 10/2013 | Resch | H04L 63/0428 713/150 |
| 2013/0282830 A1 | 10/2013 | Besen et al. | |
| 2014/0012616 A1 | 1/2014 | Moshenek | |
| 2014/0095929 A1 | 4/2014 | Chan | |
| 2014/0108108 A1 | 4/2014 | Artman | |
| 2014/0115327 A1 | 4/2014 | Gorbach et al. | |
| 2014/0181514 A1 | 6/2014 | Aoyagi et al. | |
| 2014/0250240 A1 | 9/2014 | Schell et al. | |
| 2014/0364099 A1 | 12/2014 | Pai | |
| 2014/0365459 A1 | 12/2014 | Clark | |
| 2015/0134618 A1 | 5/2015 | Teterin et al. | |
| 2015/0172260 A1 | 6/2015 | Brenner | |
| 2015/0180869 A1 | 6/2015 | Verma | |
| 2015/0244706 A1 | 8/2015 | Grajek et al. | |
| 2015/0304315 A1* | 10/2015 | Estehghari | G06F 16/284 713/156 |
| 2015/0381363 A1 | 12/2015 | Teixeira | |
| 2016/0011990 A1 | 1/2016 | Berengoltz et al. | |
| 2016/0088068 A1 | 3/2016 | Toy | |
| 2016/0217294 A1 | 7/2016 | Hornquist Astrand et al. | |
| 2016/0269381 A1 | 9/2016 | Dave | |
| 2016/0335451 A1* | 11/2016 | Sinor | H04L 63/0442 |
| 2017/0140152 A1* | 5/2017 | Samsonov | H04L 9/32 |
| 2017/0208404 A1 | 7/2017 | Westerkull | |
| 2017/0324762 A1 | 11/2017 | Chow | |
| 2017/0329978 A1 | 11/2017 | Paul | |
| 2017/0346865 A1* | 11/2017 | Hartman | H04L 65/60 |
| 2017/0357816 A1 | 12/2017 | Sharma | |
| 2017/0359318 A1 | 12/2017 | Wei et al. | |
| 2017/0359331 A1 | 12/2017 | Bonnet et al. | |
| 2018/0167373 A1 | 6/2018 | Anderson | |

OTHER PUBLICATIONS

Non-published commonly owned U.S. Appl. No. 15/275,234, filed Sep. 23, 2016, 106 pages, Apple Inc.

Braun et al., "Verifying computations with state," Proceedings of the 24th ACM Symposium on Operating Systems Principles, 2013, pp. 341-357.

Jung et al., "Session-based group key agreements for secure multicast communications," 2012 International Conference on Selected Topics in Mobile and Wireless Networking, Jul. 2012, 6 pages.

* cited by examiner

DIVERSIFICATION OF PUBLIC KEYS

BACKGROUND

Users today are storing increasing amounts of their data (documents, photos, etc.) in the cloud. In addition, the ability to share data with others is becoming more and more important in today's computing environment. While techniques like attaching a document to an e-mail or sending a photo inline in a text message work to share that data with another user, the version opened by the user will be a completely separate and additional copy of the data. On the other hand, sharing data through cloud storage can allow for collaborative editing of a single copy of the document. Accordingly, techniques that allow for more robust sharing of all types of data through a cloud services platform would be useful.

BRIEF SUMMARY

Some embodiments provide novel techniques for sharing data assets (e.g., documents, photos, videos, etc.) through a cloud services platform. In some embodiments, an operating system (OS)-level framework on a device (e.g., a mobile device such as a smartphone or tablet, a computer such as a laptop or desktop computer, etc.) provides multiple applications on the device with in-application functionality to access sharing features and to share individual data assets with different users of the cloud services platform. For instance, the framework may provide to the multiple applications on the device (i) customizable levels of data asset sharing functionality, (ii) graphical user interface (GUI) constructs for accessing these sharing functionalities, and (iii) a set of application programming interfaces (APIs) that allow the applications to use the framework to securely share their data assets through the cloud services platform.

In some embodiments, multiple applications on a single device may use the same OS-level framework, including both native applications (those developed by the OS (and framework) developer) and third-party applications (those developed by entities other than the OS developer). In some embodiments, the developers of any application for the device may incorporate the GUI constructs provided by the framework into the application. These GUI constructs include affordances that allow a user of the application to share data assets managed by the application with other users of the cloud services platform.

The GUI constructs, in some embodiments, include an option for sharing through the cloud services platform that is provided along with other sharing mechanisms (e.g., directly e-mailing or messaging the data asset). Sharing a data asset through the cloud services platform, unlike directly sending the data asset via e-mail or another type of messaging, causes the device to encrypt the asset and store the asset in the cloud, so that both the user of the device and the user(s) with which the data asset is shared can simultaneously view, edit, etc. the same document. As described below, the data asset is stored in a secure manner on the cloud services platform using encryption techniques that enable both users to decrypt the document separately on their respective devices.

Once the user selects the option for sharing through the cloud services platform, some embodiments provide additional options (e.g., as affordances) for allowing the user to identify how to notify other users of the shared document. In some embodiments, these options are different types of messaging, such as e-mail, text messaging, or another application-specific messaging. Whereas a direct share through these different types of messages attaches a copy of the data asset to an e-mails, text message, etc., a selection of a particular type of message for sharing the data asset through cloud services causes the framework to generate a link to a shared copy of the data asset that is stored on the cloud service platform, and attach this link to a new message in the appropriate messaging application. Thus, selecting e-mail causes the framework to call an e-mail application on the device and generate a new editable e-mail with the link attached. For other types of direct messaging, in which messages between groups of two or more users are kept in an ongoing conversation (e.g., text messaging, messaging through social media applications, etc.), the framework of some embodiments provides UI constructs that allow the user to subsequently select the addresses (e.g., phone numbers for text messaging, user accounts for social media applications, etc.) with which to share the document. Once these are selected, the sharing framework calls the appropriate application to create a new message, for the appropriate conversation between the device account and the selected set of additional user accounts, that includes the link and allows the user to add additional content to the message. That is, rather than using a server-generated e-mail or other message type, the sharing framework automatically generates an editable new message of the appropriate type, which can be customized within the messaging application.

When a user shares a data asset with other user accounts, the framework of some embodiments provides customizable sharing options. For instance, the developers of some applications might want all shared data assets to have the same type of sharing (e.g., making all shared data assets either editable or only viewable by all users with which the data asset is shared). On the other hand, other developers might want the owner of the data asset to have the ability to select whether each individual shared data asset is viewable or editable by each different user with which the data asset is shared.

As mentioned, the framework of some embodiments provides APIs to the applications executing on the device that allow the applications to use the framework to securely share their data assets on the cloud services platform. In some embodiments, the sharing framework stores shared data assets in an encrypted manner in cloud storage, such that only users authorized to view and/or edit the assets can decrypt them. Specifically, some embodiments encrypt a shared data asset (or key used to access the shared data asset) with keys belonging to different users, such that only a user in possession of one of the appropriate keys can decrypt the data asset.

In some embodiments, the cloud services platform uses asymmetric encryption with public-private key pairs for each user. A data asset is encrypted using the public keys of each user with whom the data asset is shared, and thus the data asset can be decrypted with any of the corresponding private keys. That is, each user account on the cloud services platform has a private key known only to devices registered with the user account (e.g., derived from the password for the user account). In some embodiments, the cloud services platform stores a public key repository with the public keys of all of the users of the account. When an application on a device belonging to a first user receives input specifying to share a data asset managed by the application with a second user, the application calls the framework API to execute this sharing operation. The framework sends a request to the set of servers for the public key of the second user, which is used to encrypt the shared data asset (as described below, some embodiments do not actually directly encrypt the data asset itself with the user public key, instead using one or more levels of indirection in the encryption). When different data assets are shared with different users (by the same application or by different applications), the framework of some embodiments requests these users' different public keys from the cloud services servers so as to encrypt the data asset with each of these keys. Because the data asset is not decrypted until downloaded by the recipient user's device, the cloud services platform enables end-to-end encryption of the shared data (that is, the data is not exposed either in transmission between a device and the cloud or while stored in the cloud).

To add further variability, some embodiments use a technique to diversify each user's public key, so that different (but equally valid) public keys are sent to different applications. Because the shared data assets are stored in a public database with identifiers that indicate which public keys were used for encryption, diversifying the public keys for a single user prevents application developers from using the public key identifiers to perform cross-application research on user activity.

In some embodiments, the public key repository stores the public key as a first value (g) that is a generator of a cyclic group and a second value that is this generator raised to a power ($g^x$), where this power x is the corresponding private key (using a traditional discrete-logarithm cryptography system, such as Diffie-Hellman (DH), Elgamal, or Elliptic curve DH (ECDH)). When an application requests the public key for this user, the repository randomly selects a new power a (a member of the cyclic group), and returns the values ($g^a$, $g^{ax}$) as the public key. The private key x will be able to decrypt data encrypted with ($g^a$, $g^{ax}$) in the same way as encrypting data encrypted with (g, $g^x$), as $g^a$ is actually just a new generator of the cyclic group, and could just have easily been the original g stored for the public key of the user.

As mentioned above, some embodiments do not directly encrypt the data asset with the user public key (irrespective of whether public key diversification is used), instead using one or more levels of indirection. These levels of indirection also allow for the quick and easy sharing of folders of data assets (or other associated sets of data assets, such as a document with many attachments). Each data asset is encrypted with a content-specific public key in a content record, such that only one encrypted copy of the data asset needs to be stored, irrespective of the number of keys that should be able to decrypt the data asset (though multiple versions of the data asset might be stored, separately encrypted with the content-specific key, e.g. for editable documents). The content-specific private key is stored in a structure record, in some embodiments, and may be generated randomly when the data asset is initially stored on the cloud services platform (though this description regularly refers to storage of the private key, some embodiments actually store a randomly generated value from which the private key can be generated).

If the data asset is shared individually, then some embodiments encrypt the content-specific key with one or more different public keys, and list identifiers for these public keys as part of the structure record data. For instance, if a first user shares an individual data asset with three other users, then (at least) four copies of the content-specific key are stored in the structure record for that data asset, each copy encrypted with the public key of one of the four users. In addition, in some embodiments, other keys may also be used to encrypt the content-specific key. For example, some embodiments do not directly encrypt the content-specific key in the structure record with the user key of the owner of the data asset, with the user key instead used to access a high-level key of a hierarchical set of encrypted keys, one of which encrypts the content-specific key so that the owning user can access the content.

When a folder or other collection of data assets is shared (or even just added to data stored on the cloud services platform by a user), some embodiments use a key chaining procedure so that one key can access the entire set of data assets, and so that those assets can be moved to another folder (or unshared) without having to modify the encryption for each individual data asset. In such embodiments, when a folder with multiple data assets is added to the user's data stored on the cloud services platform, each of the data assets is encrypted with their respective content-specific public keys, the private keys of which are stored in their respective structure records. These content-specific keys, in some embodiments, are each encrypted with the same folder-level public key, the corresponding private key of which is stored as part of a folder record. At least one copy of the folder-level private key is stored in the folder record encrypted with a parent-level public key (also referred to as a chaining key). The chaining private key is then stored in a parent record (to which the folder record refers), encrypted such that the owning user can access this key. For instance, the chaining private key could be directly encrypted with the user's public key, or encrypted with additional hierarchical layers of indirection.

If the user shares the folder or other collection of data assets (e.g., a recipe book with numerous recipes treated as separate data assets, a note with numerous attachments) with a second user, rather than separately encrypting each of the data assets (i.e., the data assets' structure records) with the public key of the second user, the folder-level private key is encrypted with the second user's public key. If the first user removes the second user's ability to access the set of data assets, then the copy of the folder-level private key encrypted with the second user's public key is removed from the record for that folder or other collection of data assets.

Furthermore, if the user moves the collection of data assets (folder, note with attachments, etc.) to a different parent folder (which might, e.g., have different sharing permissions), the framework need not re-encrypt all of the data assets. Instead, the copy of the folder-level private key encrypted with the current chaining key is removed from the folder record. A new copy of the folder-level private key is instead encrypted with a new chaining key, the private key for which is kept (encrypted with the appropriate access keys) in a new parent-level record. In some embodiments, all of the encryption is performed by the OS-level framework on the device of the user that owns the data assets, with the servers only involved in providing the public keys and storing the various data structures.

The above description relates to the user that owns a data asset sharing that data asset, including the GUI constructs provided by the framework to support this sharing within an application. The framework also provides constructs for recipient devices to access the shared data assets. Because the data assets are shared through the cloud services platform and are encrypted with the recipient user's public key, in some embodiments the recipient is required to also have an account with the cloud services platform. However, as mentioned above, the owning user sends a link to the data asset to an e-mail address, phone number, application-specific account, etc., rather than to a cloud services account.

If the recipient communications address has previously been associated with a cloud services account, then sharing is easy.

However, in some cases, the recipient communications address will not be associated with a cloud services account. As such, the framework of some embodiments provides mechanisms for the receiving account to be associated with the cloud services account (typically that with which the receiving device is already associated). When a user accesses the message providing the link (or when the user actually selects the link), the framework of some embodiments identifies that the communications address is not associated with the cloud services account of the device, and thus prompts the user to associate the address with the cloud services account, which requires input of the cloud services account password.

In addition, some embodiments require that the user verify the e-mail or other communications address first. When the user selects the link (or just opens the communications message), the device prompts the user whether their address should be verified. Assuming the user selects to verify the address, the device displays a list of communications addresses with which the data asset owner shared the documents, from which the user selects an address. This prevents other users with whom the owner has not shared the data asset from accessing the data asset, even if they are forwarded the link. The cloud services platform then sends a verification message (containing a verification link) to the selected address, which the user can open and subsequently link the communications address to the cloud services account associated with the device. Some embodiments require the user to input the cloud services account password in order to complete verification and, if the device is not associated with any cloud services account, to input both the account identifier (username, associated communications address, etc.) and password.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
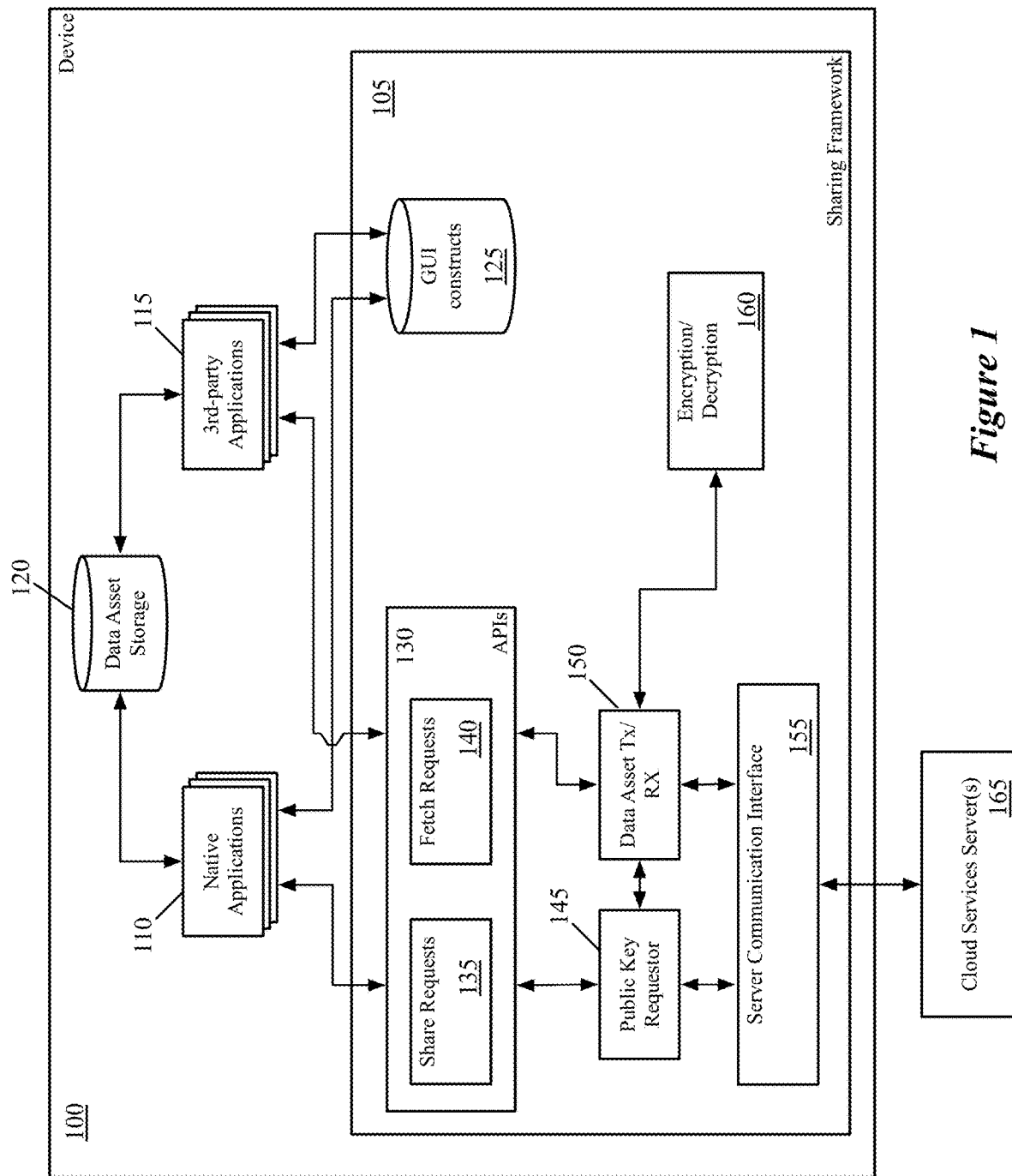
FIG. 1 conceptually illustrates the architecture of a device that includes the sharing framework of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel techniques for sharing data assets (e.g., documents, photos, videos, etc.) through a cloud services platform. In some embodiments, an operating system (OS)-level framework on a device (e.g., a mobile device such as a smartphone or tablet, a computer such as a laptop or desktop computer, etc.) provides multiple applications on the device with in-application functionality to access sharing features and to share individual data assets with different users of the cloud services platform. For instance, the framework may provide to the multiple applications on the device (i) customizable levels of data asset sharing functionality, (ii) graphical user interface (GUI) constructs for accessing these sharing functionalities, and (iii) a set of application programming interfaces (APIs) that allow the applications to use the framework to securely share their data assets through the cloud services platform.

In some embodiments, multiple applications on a single device may use the same OS-level framework, including both native applications (those developed by the OS (and framework) developer) and third-party applications (those developed by entities other than the OS developer). In some embodiments, the developers of any application for the device may incorporate the GUI constructs provided by the framework into the application. These GUI constructs include affordances that allow a user of the application to share data assets managed by the application with other users of the cloud services platform.

The GUI constructs, in some embodiments, include an option for sharing through the cloud services platform that is provided along with other sharing mechanisms (e.g., directly e-mailing or messaging the data asset). Sharing a data asset through the cloud services platform, unlike directly sending the data asset via e-mail or another type of messaging, causes the device to encrypt the asset and store the asset in the cloud, so that both the user of the device and the user(s) with which the data asset is shared can simultaneously view, edit, etc. the same document. As described below, the data asset is stored in a secure manner on the cloud services platform using encryption techniques that enable both users to decrypt the document separately on their respective devices.

Once the user selects the option for sharing through the cloud services platform, some embodiments provide additional options (e.g., as affordances) for allowing the user to identify how to notify other users of the shared document. In some embodiments, these options are different types of messaging, such as e-mail, text messaging, or another application-specific messaging. Whereas a direct share through these different types of messages attaches a copy of the data asset to an e-mails, text message, etc., a selection of a particular type of message for sharing the data asset through cloud services causes the framework to generate a link to a shared copy of the data asset that is stored on the cloud service platform, and attach this link to a new message in the appropriate messaging application. Thus, selecting e-mail causes the framework to call an e-mail application on the device and generate a new editable e-mail with the link attached. For other types of direct messaging, in which messages between groups of two or more users are kept in an ongoing conversation (e.g., text messaging, messaging through social media applications, etc.), the framework of some embodiments provides UI constructs that allow the user to subsequently select the addresses (e.g., phone numbers for text messaging, user accounts for social media applications, etc.) with which to share the document. Once these are selected, the sharing framework calls the appropriate application to create a new message, for the appropriate conversation between the device account and the selected set of additional user accounts, that includes the link and allows the user to add additional content to the message. That is, rather than using a server-generated e-mail or other message type, the sharing framework automatically generates an editable new message of the appropriate type, which can be customized within the messaging application.

When a user shares a data asset with other user accounts, the framework of some embodiments provides customizable sharing options. For instance, the developers of some applications might want all shared data assets to have the same type of sharing (e.g., making all shared data assets either editable or only viewable by all users with which the data asset is shared). On the other hand, other developers might want the owner of the data asset to have the ability to select whether each individual shared data asset is viewable or editable by each different user with which the data asset is shared.

As mentioned, the framework of some embodiments provides APIs to the applications executing on the device that allow the applications to use the framework to securely share their data assets on the cloud services platform. In some embodiments, the sharing framework stores shared data assets in an encrypted manner in cloud storage, such that only users authorized to view and/or edit the assets can decrypt them. Specifically, some embodiments encrypt a shared data asset (or key used to access the shared data asset) with keys belonging to different users, such that only a user in possession of one of the appropriate keys can decrypt the data asset.

In some embodiments, the cloud services use asymmetric encryption with public-private key pairs for each user. A data asset is encrypted using the public keys of each user with whom the data asset is shared, and thus the data asset can be decrypted with any of the corresponding private keys. That is, each user account on the cloud services platform has a private key known only to devices registered with the user account (e.g., derived from the password for the user account). In some embodiments, the cloud services platform stores a public key repository with the public keys of all of the users of the account. When an application on a device belonging to a first user receives input specifying to share a data asset managed by the application with a second user, the application calls the framework API to execute this sharing operation. The framework sends a request to the set of servers for the public key of the second user, which is used to encrypt the shared data asset (as described below, some embodiments do not actually directly encrypt the data asset itself with the user public key, instead using one or more levels of indirection in the encryption). When different data assets are shared with different users (by the same application or by different applications), the framework of some embodiments requests these users' different public keys from the cloud services servers so as to encrypt the data asset with each of these keys. Because the data asset is not decrypted until downloaded by the recipient user's device, the cloud services platform enables end-to-end encryption of the shared data (that is, the data is not exposed either in transmission between a device and the cloud or while stored in the cloud).

To add further variability, some embodiments use a technique to diversify each user's public key, so that different (but equally valid) public keys are sent to different applications. Because the shared data assets are stored in a public database with identifiers that indicate which public keys were used for encryption, diversifying the public keys for a single user prevents application developers from using the public key identifiers to perform cross-application research on user activity.

In some embodiments, the public key repository stores the public key as a first value (g) that is a generator of a cyclic group and a second value that is this generator raised to a power ($g^x$), where this power x is the corresponding private key (using a traditional discrete-logarithm cryptography system, such as DH, Elgamal, or ECDH). When an application requests the public key for this user, the repository randomly selects a new power a (a member of the cyclic group), and returns the values ($g^a$, $g^{ax}$) as the public key. The private key x will be able to decrypt data encrypted with ($g^a$, $g^{ax}$) in the same way as encrypting data encrypted with (g, $g^x$), as $g^a$ is actually just a new generator of the cyclic group, and could just have easily been the original g stored for the public key of the user.

As mentioned above, some embodiments do not directly encrypt the data asset with the user public key (irrespective of whether public key diversification is used), instead using one or more levels of indirection. These levels of indirection also allow for the quick and easy sharing of folders of data assets (or other associated sets of data assets, such as a document with many attachments). Each data asset is encrypted with a content-specific public key in a content record, such that only one encrypted copy of the data asset needs to be stored, irrespective of the number of keys that should be able to decrypt the data asset (though multiple versions of the data asset might be stored, separately encrypted with the content-specific key, e.g. for editable documents). The content-specific private key is stored in a structure record, in some embodiments, and may be generated randomly when the data asset is initially stored on the cloud services platform (though this description regularly refers to storage of the private key, some embodiments actually store a randomly generated value from which the private key can be generated).

If the data asset is shared individually, then some embodiments encrypt the content-specific key with one or more different public keys, and list identifiers for these public keys as part of the structure record data. For instance, if a first user shares an individual data asset with three other users, then (at least) four copies of the content-specific key are stored in the structure record for that data asset, each copy encrypted with the public key of one of the four users. In addition, in some embodiments, other keys may also be used to encrypt the content-specific key. For example, some embodiments do not directly encrypt the content-specific key in the structure record with the user key of the owner of the data asset, with the user key instead used to access a high-level key of a hierarchical set of encrypted keys, one of which encrypts the content-specific key so that the owning user can access the content.

When a folder or other collection of data assets is shared (or even just added to data stored on the cloud services platform by a user), some embodiments use a key chaining procedure so that one key can access the entire set of data assets, and so that those assets can be moved to another folder (or unshared) without having to modify the encryption for each individual data asset. In such embodiments, when a folder with multiple data assets is added to the user's data stored on the cloud services platform, each of the data assets is encrypted with their respective content-specific public keys, the private keys of which are stored in their respective structure records. These content-specific keys, in some embodiments, are each encrypted with the same folder-level public key, the corresponding private key of which is stored as part of a folder record. At least one copy of the folder-level private key is stored in the folder record encrypted with a parent-level public key (also referred to as a chaining key). The chaining private key is then stored in a parent record (to which the folder record refers), encrypted such that the owning user can access this key. For instance, the chaining private key could be directly encrypted with the user's public key, or encrypted with additional hierarchical layers of indirection.

If the user shares the folder or other collection of data assets (e.g., a recipe book with numerous recipes treated as separate data assets, a note with numerous attachments) with a second user, rather than separately encrypting each of the data assets (i.e., the data assets' structure records) with the public key of the second user, the folder-level private key is encrypted with the second user's public key. If the first user removes the second user's ability to access the set of data assets, then the copy of the folder-level private key encrypted with the second user's public key is removed from the record for that folder or other collection of data assets.

Furthermore, if the user moves the collection of data assets (folder, note with attachments, etc.) to a different parent folder (which might, e.g., have different sharing permissions), the framework need not re-encrypt all of the data assets. Instead, the copy of the folder-level private key encrypted with the current chaining key is removed from the folder record. A new copy of the folder-level private key is instead encrypted with a new chaining key, the private key for which is kept (encrypted with the appropriate access keys) in a new parent-level record. In some embodiments, all of the encryption is performed by the OS-level framework on the device of the user that owns the data assets, with the servers only involved in providing the public keys and storing the various data structures.

The above description relates to the user that owns a data asset sharing that data asset, including the GUI constructs provided by the framework to support this sharing within an application. The framework also provides constructs for recipient devices to access the shared data assets. Because the data assets are shared through the cloud services platform and are encrypted with the recipient user's public key, in some embodiments the recipient is required to also have an account with the cloud services platform. However, as mentioned above, the owning user sends a link to the data asset to an e-mail address, phone number, application-specific account, etc., rather than to a cloud services account. If the recipient communications address has previously been associated with a cloud services account, then sharing is easy.

However, in some cases, the recipient communications address will not be associated with a cloud services account. As such, the framework of some embodiments provides mechanisms for the receiving account to be associated with the cloud services account (typically that with which the receiving device is already associated). When a user accesses the message providing the link (or when the user actually selects the link), the framework of some embodiments identifies that the communications address is not associated with the cloud services account of the device, and thus prompts the user to associate the address with the cloud services account, which requires input of the cloud services account password.

In addition, some embodiments require that the user verify the e-mail or other communications address first. When the user selects the link (or just opens the communications message), the device prompts the user whether their address should be verified. Assuming the user selects to verify the address, the device displays a list of communications addresses with which the data asset owner shared the documents, from which the user selects an address. This prevents other users with whom the owner has not shared the data asset from accessing the data asset, even if they are forwarded the link. The cloud services platform then sends a verification message (containing a verification link) to the selected address, which the user can open and subsequently link the communications address to the cloud services account associated with the device. Some embodiments require the user to input the cloud services account password in order to complete verification and, if the device is not associated with any cloud services account, to input both the account identifier (username, associated communications address, etc.) and password.

The above describes examples of the cloud sharing framework of some embodiments. Several more detailed examples are described below. Section I describes in further detail the OS-level data sharing framework of some embodiments. Section II then describes the operations performed within the GUI of a device of the owner of a data asset to share that data asset with other users, while Section III describes operations on the recipient user's device to access a shared data asset. Section IV then describes the storage and sharing of collections of data assets on the cloud services platform of some embodiments. Next, Section V describes the use of different public keys for the same user when encrypting data for different applications in order to increase user privacy. Finally, Section VI describes an electronic system with which some embodiments of the invention are implemented.

I. Data Sharing Framework

As mentioned, some embodiments provide a framework for an operating system of a device that enables multiple applications on the device with an in-application ability to share individual (or collections of) data assets managed by the application with other users of a cloud services platform. This framework provides, to multiple applications on the device, customizable levels of data asset sharing functionality, GUI constructs for incorporation into the application to enable access to these sharing functionalities (and provide for uniform GUI constructs across both native and third-party applications on the device), and APIs that allow the application to use the framework to securely share (and access) data assets through the cloud services platform.

FIG. 1 conceptually illustrates the architecture of a device 100 of some embodiments. Specifically, this figure illustrates the sharing framework 105 which may be used by both native applications 110 and third-party applications 115. The device 100 of some embodiments may be a mobile device that runs a mobile device specific operating system (e.g., iOS, Android, etc.), such as a smart phone, tablet, or similar device (e.g., a multi-function device the size of a smart phone but without the cellular phone capability). In other embodiments, the device is a personal computer, such as a desktop, laptop, or similar device that runs a computer operating system (e.g., OSX, Windows, Linux, etc.). Irrespective of the type of device and operating system, the framework 105 of some embodiments is incorporated into the operating system.

In addition to the sharing framework 105, the device 100 runs both native applications 110 and third-party applications 115. Native applications 110 are applications that are developed by the developer of the operating system (and thus the framework 105), which may also be the device manufacturer in some cases. For example, on many smart phones or tablets, native applications could include e-mail, messaging, news, video calling, calendar, photo editing, note creation and editing, document processing, etc. applications. Third-party applications 115 are those applications that are developed by entities other than the OS developer. Third-party applications often provide functionalities above those found in third-party applications (e.g., games, social network applications), but may often duplicate the functions of existing native applications (e.g., third-party messaging, video calling, document processing, etc. applications) As shown, these third-party applications 115 have the ability to access the GUI constructs and functionalities of the framework, which are publicly exposed. Both of these types of applications may manage various data assets (at least some of which are editable), which are stored on the device in a storage 120. As described below, the applications may also use the sharing framework 105 to store data assets on a cloud services platform.

The sharing framework 105 is part of the operating system of the device 100, the rest of which is not shown. As shown, the sharing framework 105 includes GUI constructs 125 as well as APIs 130. The GUI constructs 125 of some embodiments may include selectable items (e.g., affordances on touch devices), menus, etc. that both native applications 110 and third-party applications 115 can incorporate into their own user interfaces. The selectable items may include items for selecting to share a data asset through the cloud services platform, for indicating whether a data asset is shared with other users (on both owner and recipient user devices), for selecting a mechanism for sharing a data asset, for adding new users to a shared data asset, etc. Furthermore, the GUI constructs 125 may include customizable menus for enabling the owner of a data asset to provide different levels of access to different users with whom the data asset is shared, or menus that indicate which other users are currently viewing and/or editing the asset, as well as other GUI constructs relating to sharing. Examples of many of these GUI constructs will be described below by reference to various figures.

The APIs 130 are publicly exposed functionalities that can be invoked by the native and third-party applications 110 and 115. These include at least share requests 135 and fetch requests 140, though other types of functionality may also be available in some embodiments. Share requests 135 are commands from an application to share one or more data assets with other users through the cloud services platform. These share requests may identify the data asset or assets, the user or users with which to share the asset, and the customized access level for each user and asset. For instance, in some embodiments, the owner of a document might share that document with a first user that is allowed to edit the document and a second user that can only view the document. Similarly, the owner might also share a second document with the first user, but only allow that first user viewing privileges for the second document. The sharing APIs 135 enable any application to access the same framework and same cloud services platform in a uniform manner that ensures that the user's privacy and security are not compromised (either accidentally or intentionally) by the application developers.

The sharing APIs 135 may also be provided along with similar APIs for storing unshared data to the cloud services platform. In some embodiments, each application can write data to the cloud storage servers, which enables a user to share her data across devices that are registered with the cloud services platform. Some embodiments allow each application to write to both (i) a private database for an individual user and (ii) a public database for data shared across users. The private database, in some embodiments, stores data that can only be read by instances of the application (or related applications, as verified by the cloud services provider) running on devices that are also registered for the same user account with the cloud services platform. For instance, a user's private photos, edited notes, etc. could be stored in the private database.

The public database, on the other hand, is accessible by all instances of the application, irrespective of the user to which a device is registered. Accordingly, applications only store data that the user intends to be public into the public database (in some embodiments, the cloud services platform verifies third-party applications in part to ensure that they do not store private user information into the public database). In addition, some embodiments store shared data assets to the public database. However, because these data assets are encrypted in such a way that only the owner and the users with which the assets are shared can decrypt them, they remain secure.

The APIs 130 also include fetch requests 140, which are various commands that the third-party and native applications 110 and 115 can invoke in order to retrieve data from the cloud services platform. These may be requests for data from the private database of the user to which the device 100 is registered, or for data (either completely public data or shared encrypted data) from the public database for the application making the command. In some embodiments, the framework includes features that prevent the applications from requesting data from other public or private databases (i.e., sections of the cloud storage associated with other unrelated applications).

As shown, the OS-level framework 105 includes a public key requestor 145 and data asset transmitter and receiver 150, which connect to a server communication interface 155. The framework also includes an encryption/decryption module 160, which is used by the data asset transmitter and receiver module 150. In some embodiments, these modules are part of the OS but separate from the sharing framework 105, and may be used by other aspects of the OS as well (especially the encryption/decryption module 160).

The public key requestor 145 is responsible for communicating with the public key repository of the cloud services platform, which is part of the cloud services servers 165. The public key requestor 145 sends requests to the key repository (via the server communications interface 155) for the public keys of users with which an application intends to share a data asset, and receives these keys back from the cloud services servers 165. As described below, in some embodiments the request identifies the application making the request and a user identifier of the user whose public key is needed. The same user may be identified differently by different applications, in order to prevent the coordinated sharing of user data between applications. Furthermore, in some embodiments the key repository diversifies these public keys (as described in Section V), so that different applications receive different public keys for the same user (which are all equally valid public keys for that user's private key).

The data asset transmitter and receiver module 150 uses the public keys received from the cloud services key repository to encrypt data assets (by calling the encryption/decryption module 160), and sends these encrypted data assets to the cloud services servers 165 for storage (e.g., in the public database of an application). This module 150 also handles sending unencrypted data to the public database of an application, and receives data assets requested by the application via the fetch request APIs 140. Encrypted data is decrypted using the encryption/decryption module 160. In some embodiments, the decryption takes place in a secure enclave of the device (e.g., a trusted processing unit of the device 100 that securely stores a user private key and/or a device private key), rather than on the main processing unit(s) of the device.

The encryption/decryption module 160, in some embodiments, represents corresponding encryption and decryption algorithms used by various processes on the device, including the sharing framework. In some embodiments, this is a symmetric-key encryption such as the Advanced Encryption Standard (AES). In other embodiments, the encryption/decryption module 160 uses asymmetric-key encryption (i.e., public-key encryption), that uses a public key to encrypt data and a corresponding private key to decrypt data. The data asset sharing system of some embodiments uses such a public-key system so that any device can encrypt data for a user, which can then only be decrypted by that user.

II. GUI for Sharing Data Assets

As mentioned, the framework of some embodiments provides various GUI constructs, including selectable UI items and customizable menus, that enable users to share their data assets with other users from within an application. These GUI constructs can be incorporated into both native and third-party applications in a uniform manner. This both provides a uniform look and feel to the user of the device irrespective of which application is in use and enables the applications to uniformly access the sharing framework. FIGS. 2-15 illustrate various examples of these GUI constructs on several different types of devices.

Figure 2:
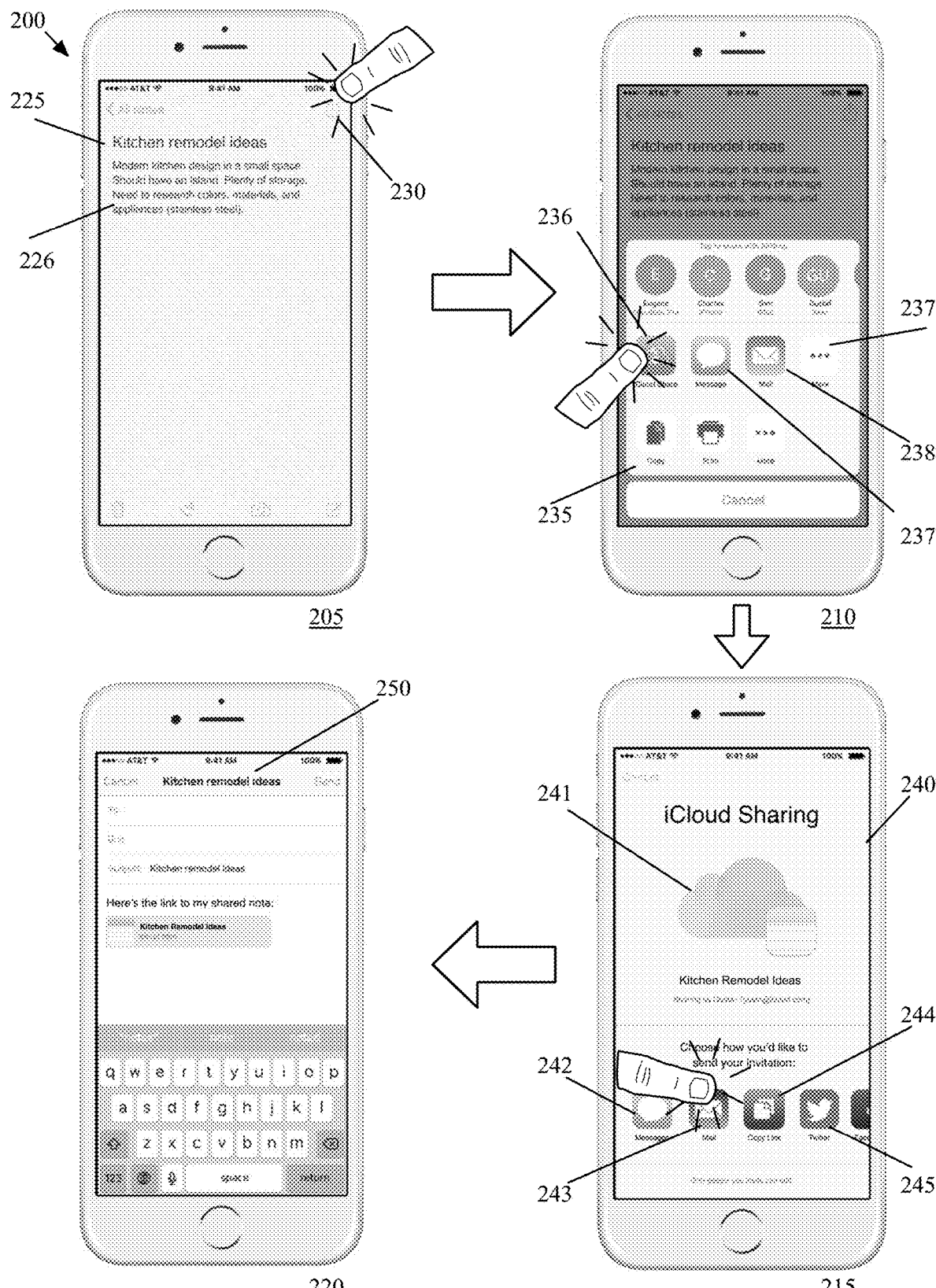
FIG. 2 illustrates a user sharing a data asset (specifically, an editable note) on a smart phone device.

FIG. 2 illustrates a user sharing a data asset (specifically, an editable note) over four stages 205-220 of a smart phone device 200. While shown on a smart phone device, one of ordinary skill will understand that the GUI shown in these figures could be displayed on other devices, such as a multi-function media player device, a tablet, etc. The first stage 205 illustrates a notes application GUI displayed on the device 200, which shows a title 225 for the note document ("Kitchen remodel ideas"), the content 226 of the note (in this example, only text at the moment), and various UI items 227 relating to performing operations on the note. The notes application GUI also includes a sharing GUI item 230, which a user of the device 200 selects at this stage 205.

Throughout this and other sections, user interactions may be shown as touch interactions (e.g., tap, double tap, swipe gesture, multi-touch tap and/or swipe gestures, etc.) or cursor controller interactions (e.g., click, double-click, click-and-drag, etc.). It should be understood that the form of interactions shown herein are only examples, and that these GUI interactions could be made as touch interactions, cursor controller interactions, touchpad interactions, keystrokes, or using other types of input devices.

In response to the selection of the sharing GUI item 230, the second stage 210 illustrates that the device displays a sharing options overlay 235 that includes multiple GUI items for different ways of sharing the currently open data asset (e.g., after animating the overlay 235 onto the display screen). These different sharing options include device-to-device transfer to detected (and compatible) nearby devices, as well as items for sharing through a cloud services platform 236, sharing via a message 237, sharing via e-mail 238, and a more options item 239 which, if selected, provides additional mechanisms for sharing the currently open data asset. The latter options, including via message and e-mail, directly send a copy of the data asset to one or more recipients. On the other hand, sharing via the cloud services platform causes the device to store a shared copy of the asset in cloud storage, so that the owner (i.e., the owner of the device 200) and the users with which the data asset is shared can all edit the same copy of the asset (simultaneously, in some embodiments). In this case, the user selects the item 236 in order to share the item through the cloud services platform.

Thus, at the third stage 215, the device 200 displays a cloud sharing GUI 240, that allows the user to select the mechanism by which to notify other users of the shared document. This GUI displays an icon 241 that indicates that the data asset (with its title shown below) is being shared through cloud services, and also indicates (along with the title) the account name and associated e-mail address of the user that is sharing the note. At the bottom of the GUI 240, the device displays several options for how to send an invitation to access the shared document. This allows the user to select from various different communications types, with selectable affordances for sending via text message 242, e-mail 243, and a social media messaging platform (Twitter) 245. There is also an affordance for copying a link 244, which allows the user to copy a link to the shared data asset on the cloud storage servers and provide this link to other users in any manner chosen. In some embodiments, the user can view additional options with a sideways swipe gesture over this row of affordances.

Selecting e-mail, text messaging, or other application-specific messaging at this stage 215 is different than selecting the same type of messaging at the previous stage 210 as the mechanism for sharing. That is, if a user selects text messaging (or any other type of messaging) at stage 210, the device will generate an e-mail with a copy of the data asset attached, to be received by the other user's device. At this stage 215, however, selecting the messaging type will generate a message with a link to the shared data asset attached. In addition, as described below, the device will encrypt the data asset for storage on the cloud services servers in such a way that the selected users are able to access the data asset. In this example, at stage 215, the user selects the e-mail affordance 243.

As a result, the device 200 automatically generates an editable e-mail message 250 from the e-mail address associated with the device (and with the cloud services account with which the device 200 is associated). This e-mail includes a link to the note, as well as automatically formulated text that the user can edit. In some embodiments, the e-mail subject is the name of the data asset being shared ("Kitchen remodel ideas", in this case). In some embodiments, the notes application (or other application that is sharing data assets) sends a request to the OS-level sharing framework via the sharing API, and the OS generates the link and calls the appropriate messaging application (in this case, an e-mail application) to create a message with the generated link.

For other types of direct messaging, in which messages between groups of two or more users are kept in an ongoing conversation (e.g., text messaging, messaging through social media applications, etc.), selection of the corresponding item from GUI 240 causes the device to provide UI constructs that allow the user to subsequently select the addresses (e.g., phone numbers for text messaging, user accounts for social media applications, etc.) with which to share the data asset. Once these are selected, the OS calls the appropriate application to create a new message, for the appropriate conversation between the device account and the selected set of additional user accounts, that includes the link and allows the user to add additional content to the message. That is, rather than using a server-generated e-mail or other message type, the sharing framework automatically generates an editable new message of the appropriate type, which can be customized within the messaging application.

Figure 3:
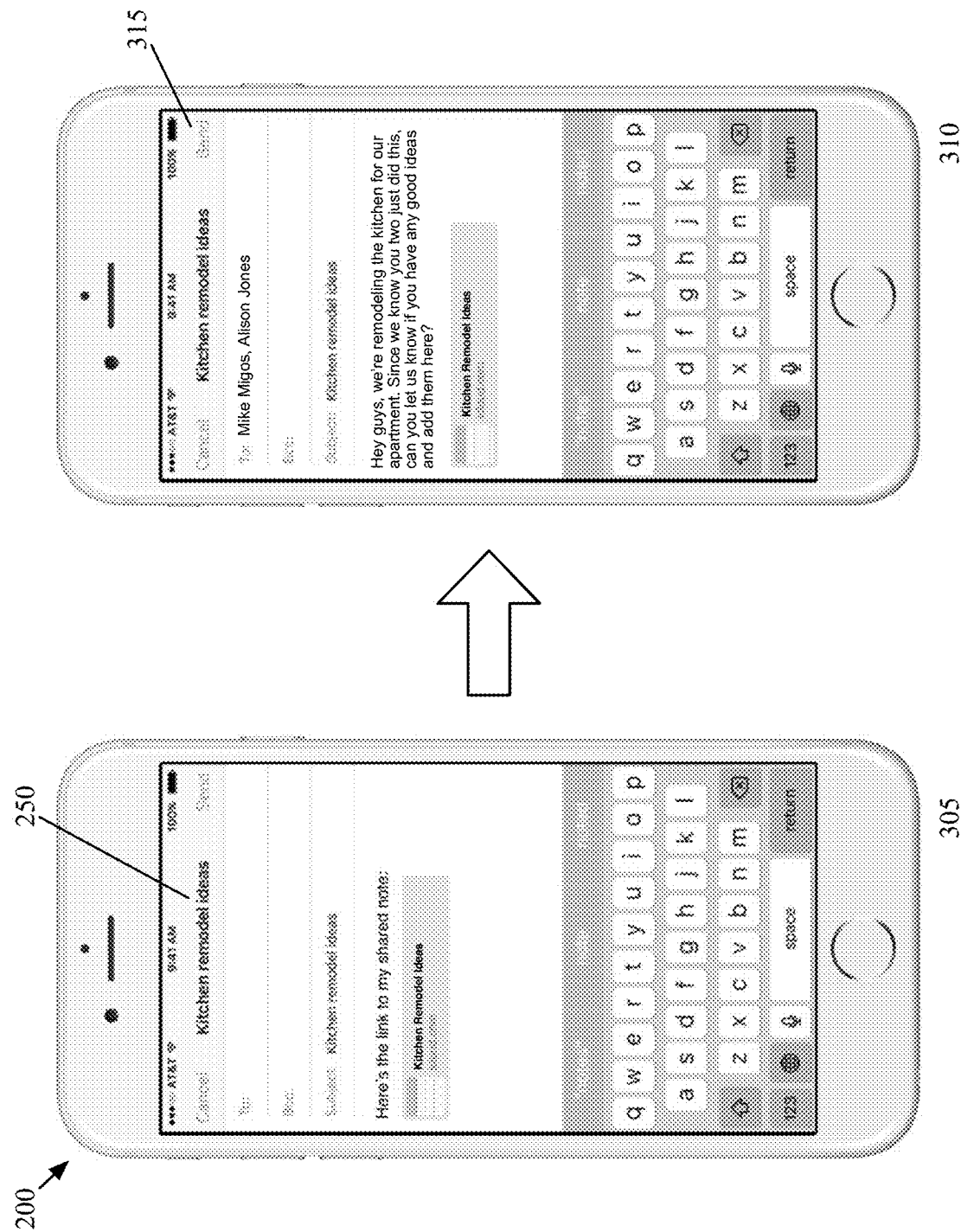
FIG. 3 illustrates the user of the device of FIG. 2 editing the e-mail message and adding recipients to the message.

FIG. 3 illustrates two stages 305-310 of the device 200, in which the user of the device edits the e-mail message 250 and adds recipients to the message. The first stage 305 illustrates the device 200 at the same point as the fourth stage 220 of FIG. 2, with an e-mail message 250 having been automatically generated so that the user can share a note through the cloud services platform. This e-mail GUI includes a touchscreen keyboard that allows the user to type in recipient e-mail addresses (or user names) as well as to edit the content of the message (or subject).

The second stage 310 illustrates the result of this editing. The user has added two recipients (Mike Migos, Alison Jones) to the e-mail message, with whom the notes document will be shared. In some embodiments, as the user types in a recipient name, auto-complete options are provided. In addition, these e-mail addresses may correspond to accounts on the cloud services platform. In this case, once the user has sent the link to a recipient, the sharing framework encrypts the document for storage on the cloud servers in such a way that the recipient will be able to access the document through the cloud services platform. However, in some cases the e-mail address (or phone number, etc.) may not correspond to any user account. In these cases, described below, the recipient is asked to associate the address with a user account before having the ability to access the shared data asset.

This second stage 310 also illustrates that the user has customized the message within the body of the e-mail 250. Rather than a generic message, the user has provided context and personalization in the message itself. Similarly, in some embodiments the user can customize a text message or application-specific message sent along with the link (or as a discrete message in addition to the link). In order to actually send the link to the recipients (and thereby finalize the share), the user can select the send item 315 in the e-mail application.

Figure 4:
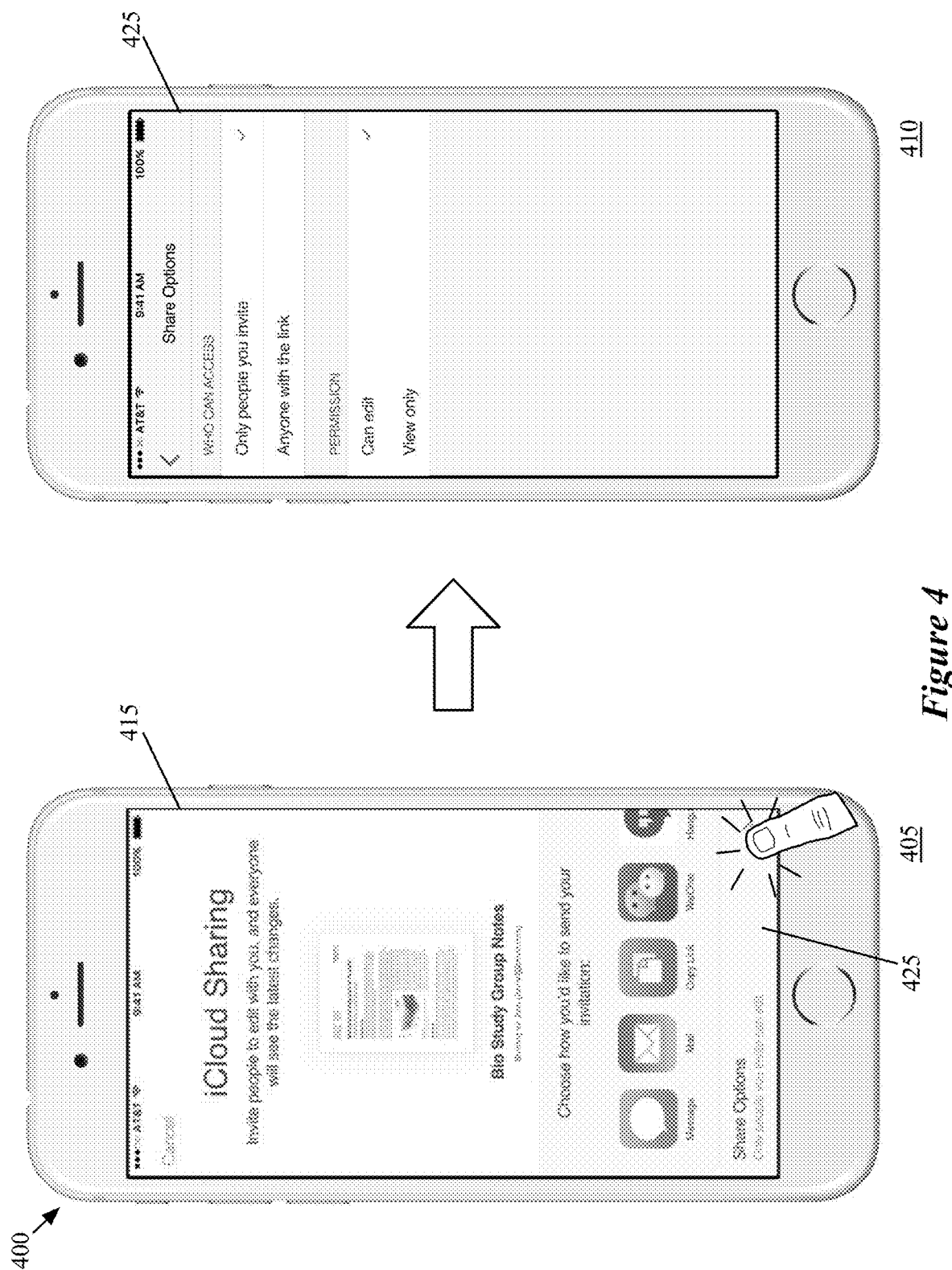
FIG. 4 illustrates a cloud sharing user interface of some embodiments that provides customizable share options.

FIG. 4 illustrates a cloud sharing user interface of some embodiments that provides customizable share options over two stages 405-410 of a smart phone device 400. The device 400 is similar to the device 200, and the GUI shown in this figure could also be displayed on other types of devices, as noted above. The first stage 405 shows a GUI 415, which is similar to the GUI 240 displayed at the third stage 215 of FIG. 2. However, in addition to the information about the document being shared (in this case a word processing document title "Bio Group Study Notes"), the GUI 415 also displays a sharing options item 420, which specifies (prior to sharing the document) what level of access will be provided and to whom. At this juncture, the item 420 specifies that only users who have been specifically invited by the document owner can access the document, and that these users can edit the document. At this stage 405, the user selects this item 420.

The selection of the sharing options item 420 causes the device to provide a sharing options GUI 425, which allows the user to customize who can access the document and the type of access those users have to the document. In some embodiments, application developers have the option as to whether to include these customizable options. For instance, the notes application shown in FIGS. 2 and 3 does not include these options, whereas the word processing app shown in this figure does. The customizable options of some embodiments provide selections regarding which users can access the document, and the permissions given to those users. As shown in figures below, once users have been invited, the access level for each user can be customized in some embodiments. In this case, the owning user can choose that anyone with the link is allowed to access the document or that only those who are invited to share the document can access the document. In the former case, the document is not encrypted on the cloud server in some embodiments, while in the latter case the document is encrypted with the public keys of the users that are allowed access. For permission levels, this example shows that the owner of the document can either provide full editing privileges to the other users or can provide only viewing privileges.

Figure 5:
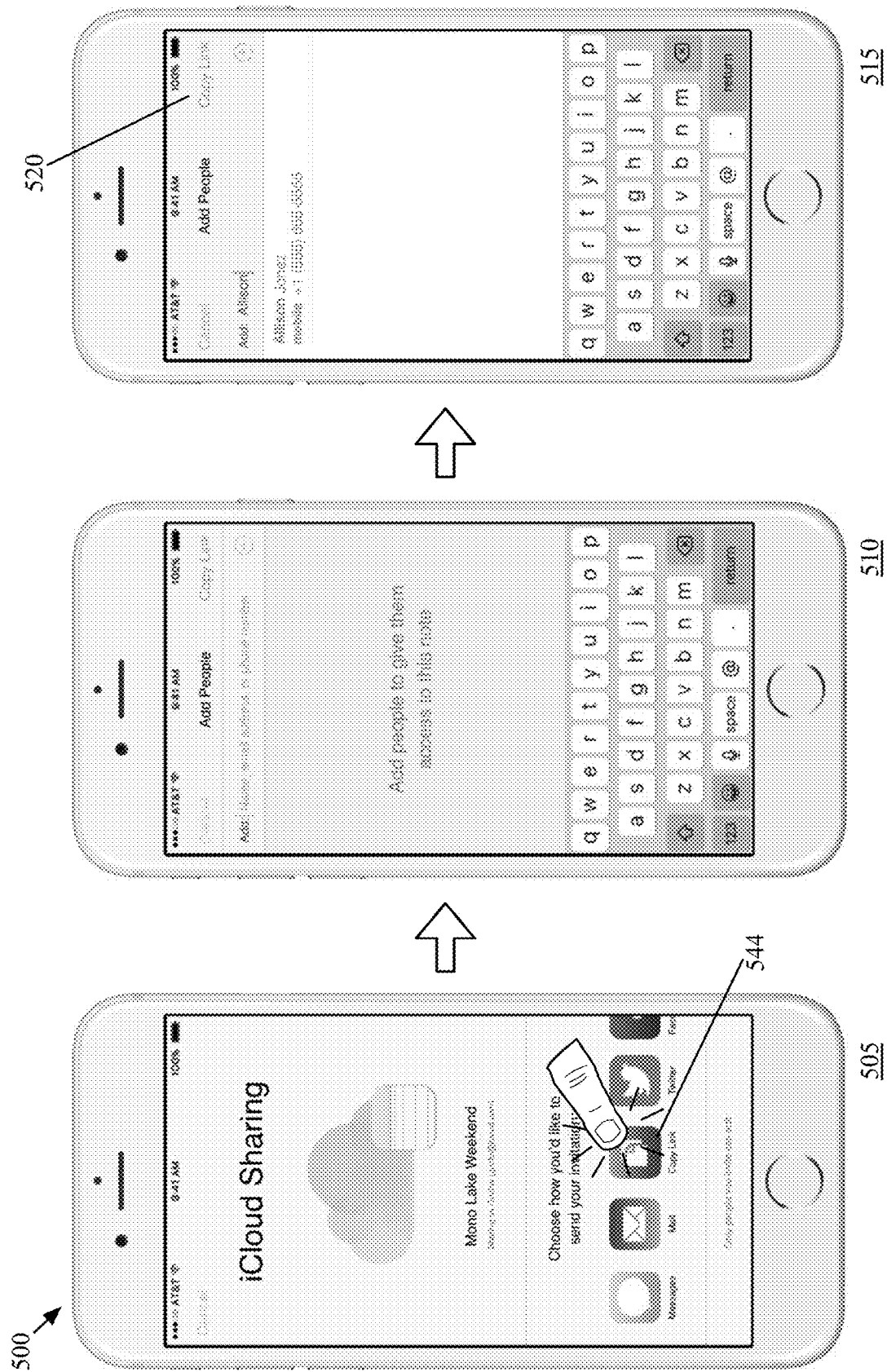
FIG. 5 illustrates a cloud sharing user interface of some embodiments that allows a user to add users to directly provide the users with access to a shared data asset.

FIG. 5 illustrates a cloud sharing user interface of some embodiments that allows a user to add users to directly provide the users with access to a shared data asset over three stages 505-515 of a smart phone device 500. At the first stage 505, the device displays the cloud sharing GUI 240, for a different note (titled "Mono Lake Weekend"). In this case, the user selects the copy link item 544.

As shown in the second stage 510, this allows the owner of the data asset to add users with which to share the document. The user can type in names, e-mail addresses, or phone numbers. The third stage 515 illustrates that the user has typed in "Allison", and an auto-complete function provides a selectable option for Allison Jonez' phone number. In some embodiments, users can mix and match phone numbers and e-mail addresses, and when the user selects the "copy link" item 520 the link to the shared data asset is sent to the selected communication addresses.

Figure 6:
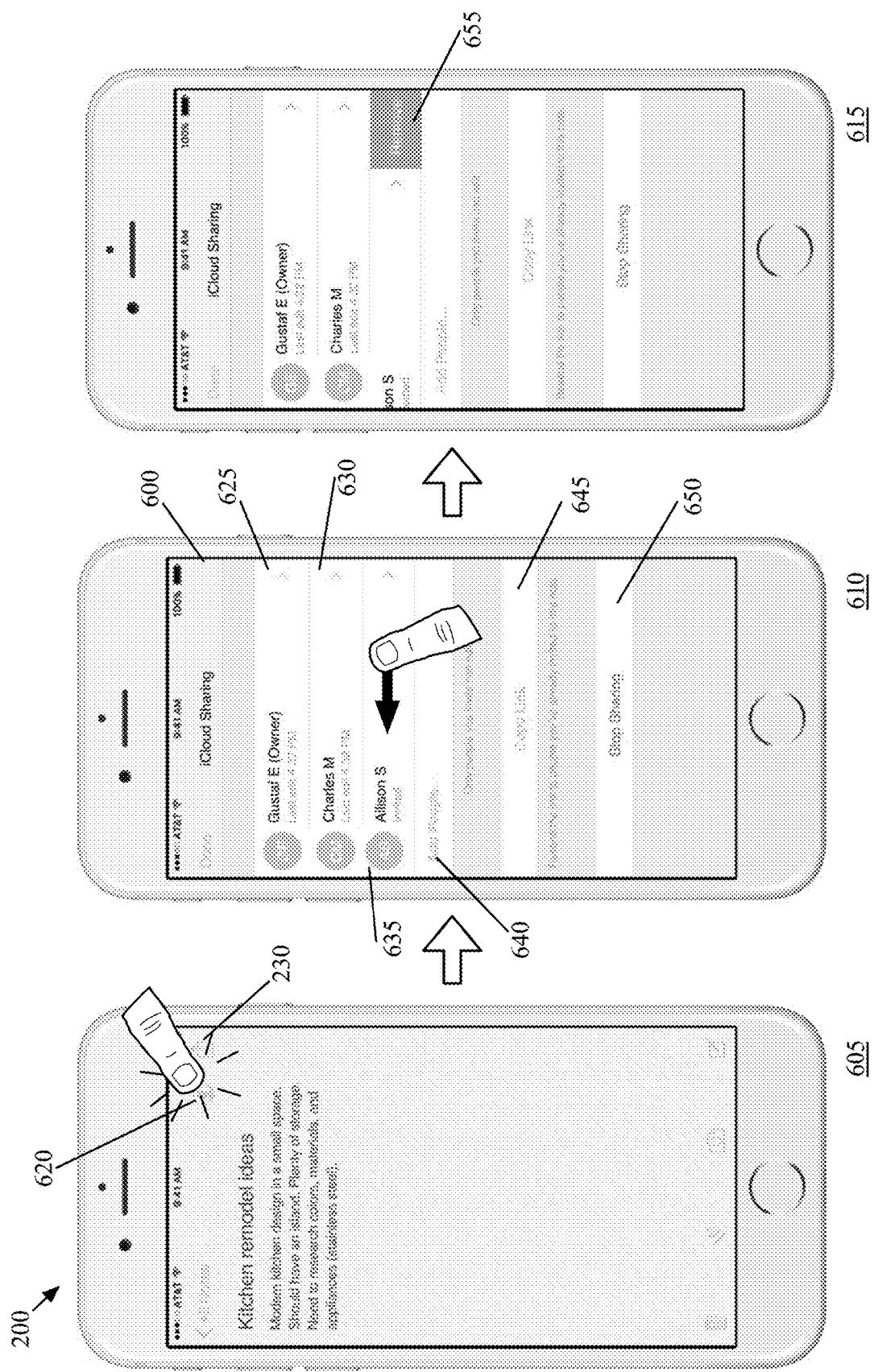
FIG. 6 illustrates the device of FIG. 2 after the owner has shared the note on "Kitchen remodel ideas" with two users.

FIG. 6 illustrates the device 200 after the owner has shared the note on "Kitchen remodel ideas" with two users over three stages 605-615. The first stage 605 illustrates the same notes application GUI as at the first stage 205 of FIG. 2. However, because this note is now shared with other users through the cloud services platform, an additional cloud sharing information item 620 is now displayed (in this case, in the top right of the GUI, next to the sharing item 230. This affordance 620 both (i) indicates to the owning user that the current note document is shared with at least one other user, and (ii) enables the user to view information about those users. At this stage, the user selects the cloud sharing information item 620.

Doing so causes the device 200 to display a sharing information GUI 600 in the second stage 610, which provides information about the cloud services platform users with whom the current data asset (the note in this case) is shared. As shown, the GUI provides selectable items 625-635 for each of the users who are allowed access to the notes document. These include the owner of the note ("Gustaf E") as well as two additional users ("Charles M" and "Allison S"). These items 625-635 also indicate the last time that each user edited the note (or in Allison's case, that she has been invited but has not viewed/edited the note. The GUI 600 also includes an item 640 for sharing the document with additional users, a copy link item 645 for sending the link to the note to the users listed (i.e., those users with whom the note is already shared), and a stop sharing item 650 for canceling the share. If the owner selects the stop sharing item 650, the sharing framework ensures that the other users (in this case, Charles and Allison) will not be able to access the note. In some embodiments, the document remains stored on the cloud services platform, but only the owner has the ability to access it (by modifying the way the document or the key to access the document is encrypted, or by moving the document from the public container for the application to the owner's private container for the application). Other embodiments remove the item from cloud storage entirely.

In this second stage 610, the user provides a leftward swipe input over the item 635 for the user Allison S. As shown in the third stage 615, the item 635 is moved left to reveal a user removal item 655 for this user. Selection of the user removal item 655 would cause Alison S. to be removed from the shared data asset (in some embodiments, after providing a verification dialog). Some embodiments accomplish this by removing the ability for Allison to decrypt the document (e.g., by removing a copy of the document or a copy of the key for accessing the document that is encrypted with Alison's public key).

Figure 7:
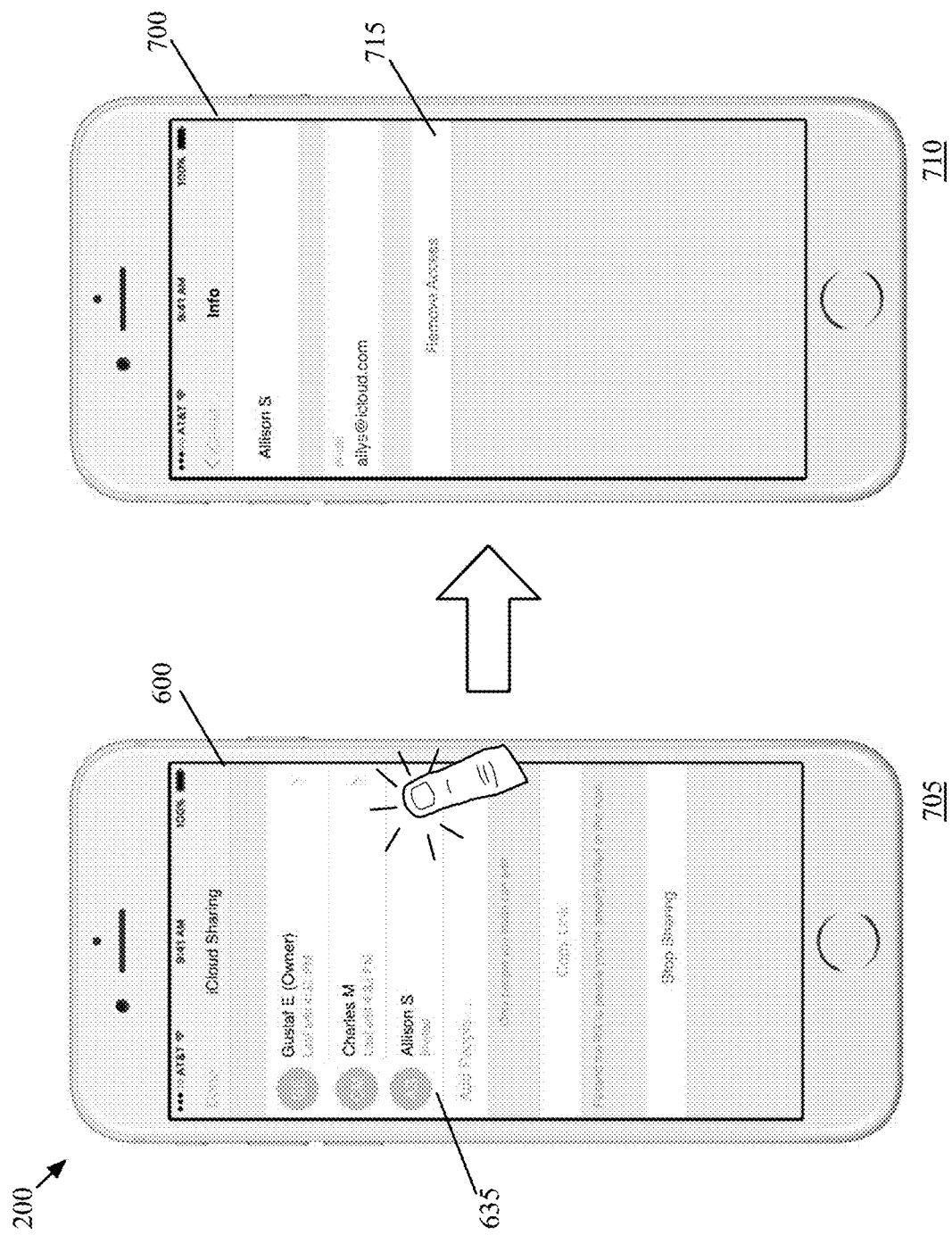
FIG. 7 illustrates the access of information for a user with which a data asset is shared.

FIG. 7 illustrates the access of information for a user with which a data asset is shared over two stages 705-710 of the device 200. The first stage 705 illustrates the device 200 displaying the same sharing information GUI 600 as at the second stage 610 of FIG. 6. At this stage 705, the user selects (e.g., with a tap input) the item 635 for the user Alison S. with which the document is shared. As a result, at the second stage 710 the device 200 displays a user information GUI 700 with information about the selected user. In this case, the information provides the user's name (e.g., their name on the cloud services platform) and communications address (in this case, an e-mail address). Some embodiments use the address (e.g., e-mail, phone number, etc.) associated with the user's cloud service account. In addition, the GUI 700 includes a user removal item 715. Selection of this item 715 operates in the same manner as selection of the user removal item 655 in some embodiments.

Figure 8:
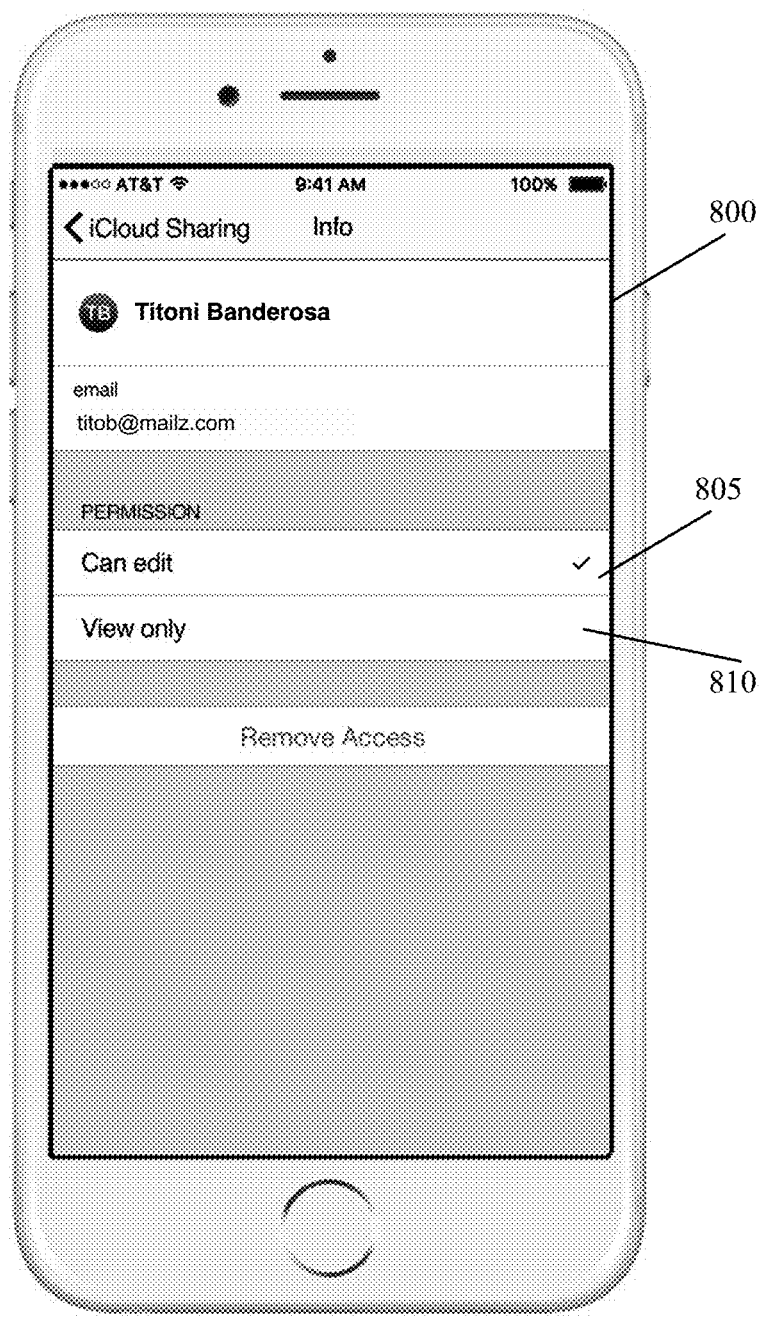
FIG. 8 illustrates an alternative user information GUI which can be reached from a sharing information GUI such as that shown in FIG. 6.

FIG. 8 illustrates an alternative user information GUI 800 which can be reached from a sharing information GUI such as that shown in FIG. 6. In this case, the sharing information GUI (and thus the user information GUI 800) would have been reached from a shared data asset managed by an application that allows the user to customize access levels per user. As such, the GUI 800 includes, in addition to user information and a user removal item, a set of permissions options 805 and 810. In this example, the item 805 is selected, indicating that the user ("Titoni Banderosa") is allowed to edit the data asset. However, the owning user could select the item 810 in order to change the permissions for this user to only being allowed to view the data asset.

The above FIGS. 2-7 illustrated various GUI interactions relating to sharing on a smart phone or similar device. In some embodiments, the same GUI constructs and interactions are used on tablet devices, laptop or desktop computers, etc. However, in other embodiments, the sharing framework on a tablet device provides similar types of interactions in a different GUI, which is illustrated in FIGS. 9 and 10.

Figure 9A:
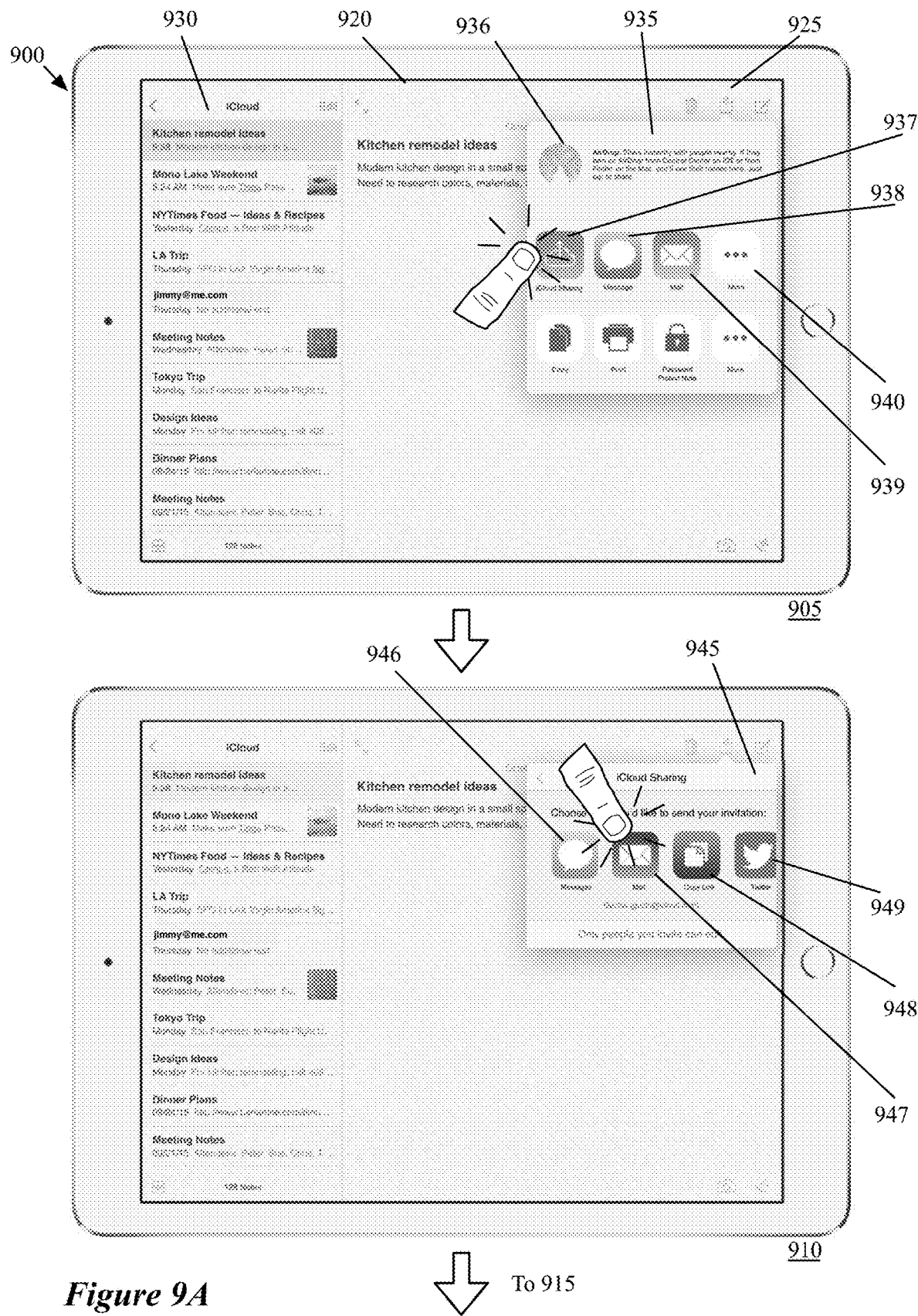
FIG. 9A-B illustrates a user sharing a data asset (specifically, an editable note) on a tablet device.
Figure 9B:
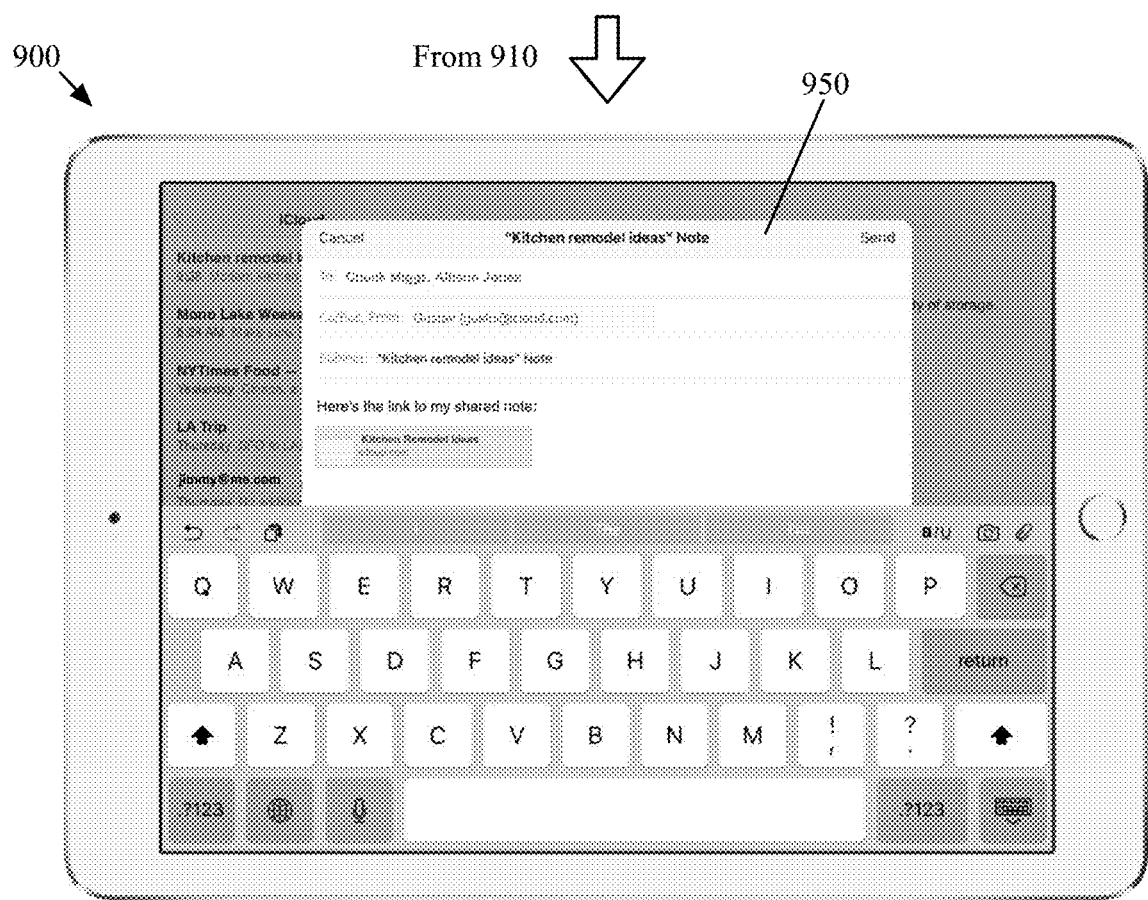
Figure 10:
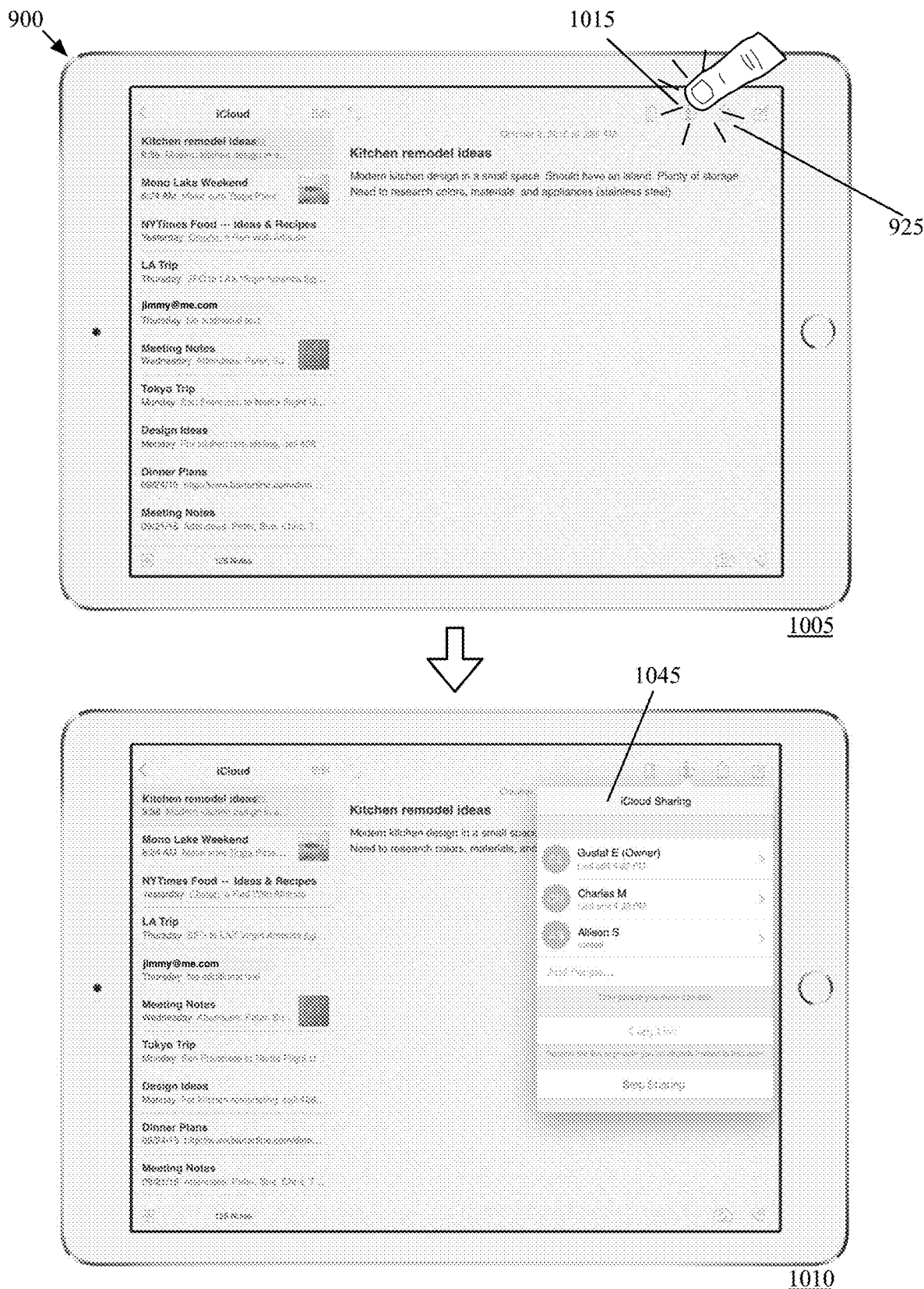
FIG. 10 illustrates the device of FIG. 9 after the owner has shared a note with two users.

FIG. 9A-B illustrates a user sharing a data asset (specifically, an editable note) over three stages 905-915 of a tablet device 900, similar to the operations of FIG. 2 on a smart phone device. In this case, the first stage 905 illustrates the application GUI 920 after an initial user interaction to select a sharing item 925. The application GUI 920 displays a list of notes 930 available to the user (currently showing those stored on the user's cloud storage), with a "Kitchen remodel ideas" note currently selected. The GUI 920 includes various selectable GUI items for operations to perform on the note, including the aforementioned sharing item 925.

Upon selection of the sharing item 925 (e.g., via a touch selection), the device 900 displays a sharing options overlay 935 (e.g., animating the display of this overlay 935 as popping up from the selected item). As with the overlay 235 described above, this GUI construct includes multiple GUI items for different mechanism to share the currently open data asset (the current note). These options include an item 936 for device-to-device transfer (AirDrop), as well as items for sharing through a cloud services platform 937, sharing via a text message 938, sharing via e-mail 939, and a more options item 940 which, if selected, provides additional mechanisms for sharing the currently open data asset to one or more recipients. As noted above, the latter options (message, e-mail, etc.) directly send a copy of the data asset to one or more recipients, whereas the sharing via the cloud services platform causes the device to store a shared copy of the asset in cloud storage (or modify the encryption on the asset already in cloud storage) so that the other users with which the asset is shared can all edit the same copy. In this case, the user selects the item 937 in order to share the item through the cloud services platform.

Thus, at the second stage 910, the device 200 displays a cloud sharing overlay 945 (some embodiments animate the overlay 935 as collapsing and the new overlay as subsequently popping up from the sharing item 925) similar to the cloud sharing GUI 240. The cloud sharing overlay 945 allows the user to select the mechanism by which to notify other users of the document, which is still shown in the GUI 920 underneath the overlay. The cloud sharing overlay 935 includes selectable items for sending the link to the shared asset via text message 946, e-mail 947, and a social media messaging platform (Twitter) 949, as well as an item for copying a link 948. Selection of these items operations in much the same way as selection of similar items 242-245, shown in FIG. 2 above. At this stage 910, the user selects the e-mail affordance 947.

As a result, the device 900 automatically generates an editable e-mail message 950 from the e-mail address associated with the device (and with the cloud services account with which the device 900 is associated). This e-mail includes a link to the note, as well as automatically formulated text that the user can edit. In some embodiments, the e-mail subject is the name of the data asset being shared ("Kitchen remodel ideas", in this case). In some embodiments, the notes application (or other application that is sharing data assets) sends a request to the OS-level sharing framework via the sharing API, and the OS generates the link and calls the appropriate messaging application (in this case, an e-mail application) to create a message with the generated link. Selection of the other messaging types, in some embodiments, works as described above by reference to FIG. 2.

Though not shown herein, in some embodiments all of the features described above by reference to the smart phone device and GUI in FIGS. 3-8 are available in the tablet GUI as well. That is, for at least some applications, users can modify the permission levels for different users, add users to a shared document, etc. FIG. 10 illustrates the device 900 after the owner has shared the note on "Kitchen remodel ideas" with two users over two stages 1005-1010. The first stage 1005 illustrates the same notes application GUI 920 as the first stage 905 of FIG. 9. However, because this note is now shared with other users through the cloud services platform, an additional cloud sharing information item 1015 is now displayed (in this case, in the top right of the GUI, next to the sharing item 925). This affordance 1015 both (i) indicates to the owning user that the current note document is shared with at least one other user, and (ii) enables the user to view information about those users. At this stage, the user selects the cloud sharing information item 1015.

Doing so causes the device 1000 to display a sharing information overlay 1000 that includes information about the users of the cloud services platform with whom the current data asset (the note) is shared. As shown, the sharing information overlay 1000 includes selectable items for each of the users, with properties similar to those items shown in FIG. 6. That is, in some embodiments the owner of the note can use these to remove the users, view additional information about the users, and (in some applications) modify the access level for individual users.

While the above examples illustrate GUI interactions in a mobile device (e.g., smart phone, tablet, etc.) environment, some embodiments incorporate a similar framework with similar GUI constructs into a laptop or desktop computer environment. FIGS. 11-13 illustrate a GUI of a word processing application in a laptop/desktop computing environment that incorporates the constructs of such a sharing framework.

Figure 11A:
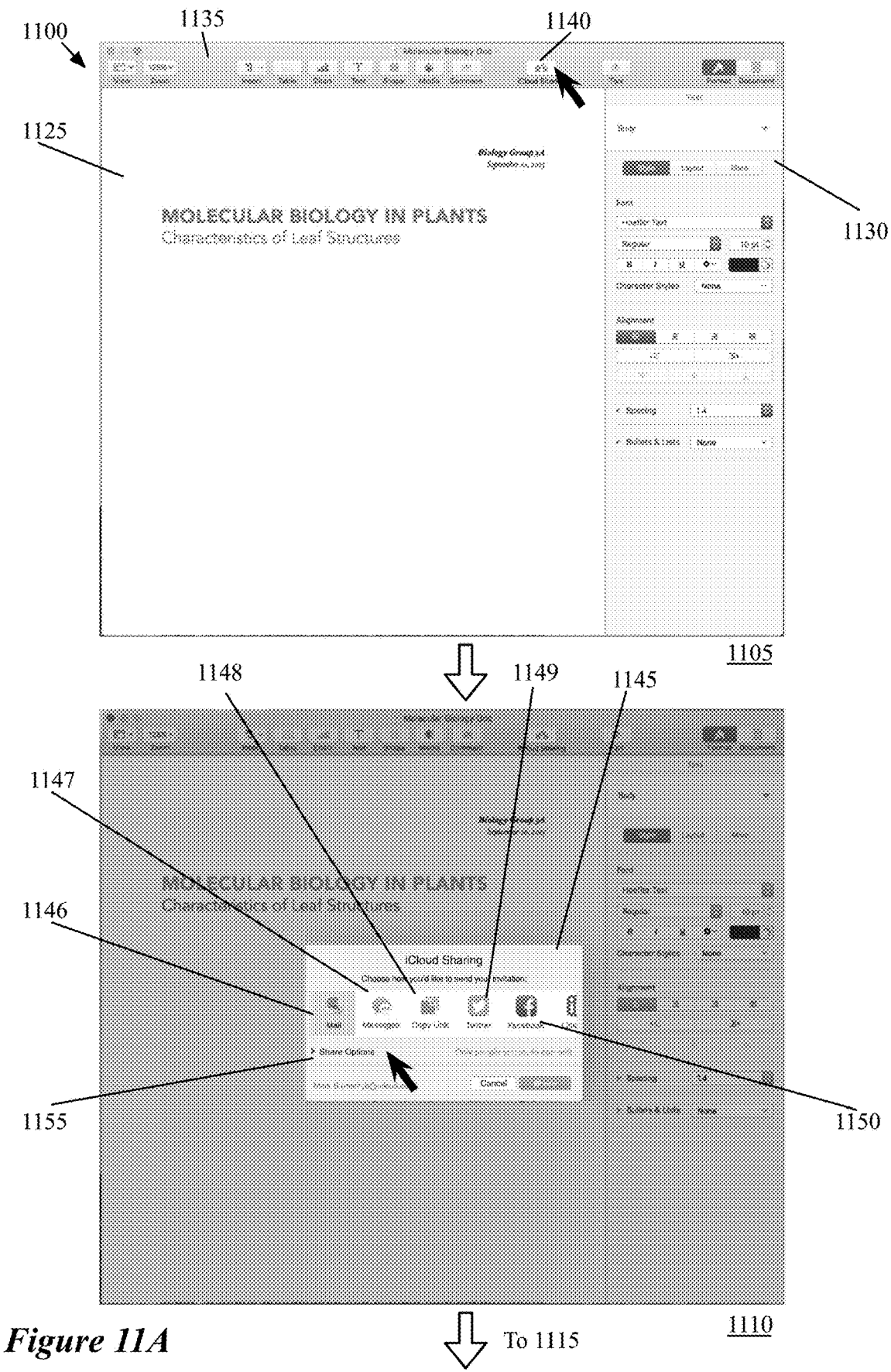
FIGS. 11A-B illustrates a user sharing a data asset (specifically, an editable word processing document) in a word processing application GUI.
Figure 11B:
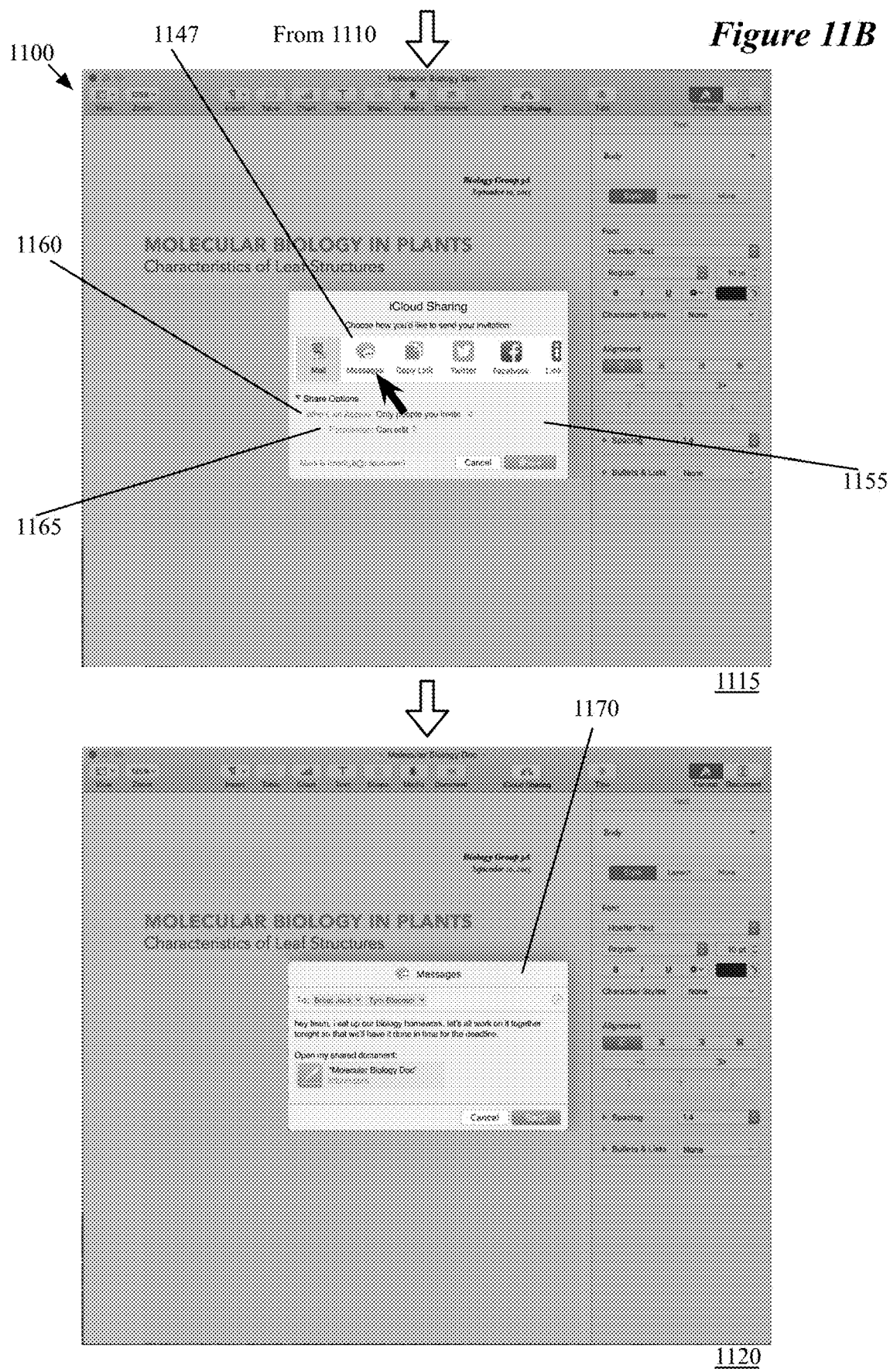
Figure 12:
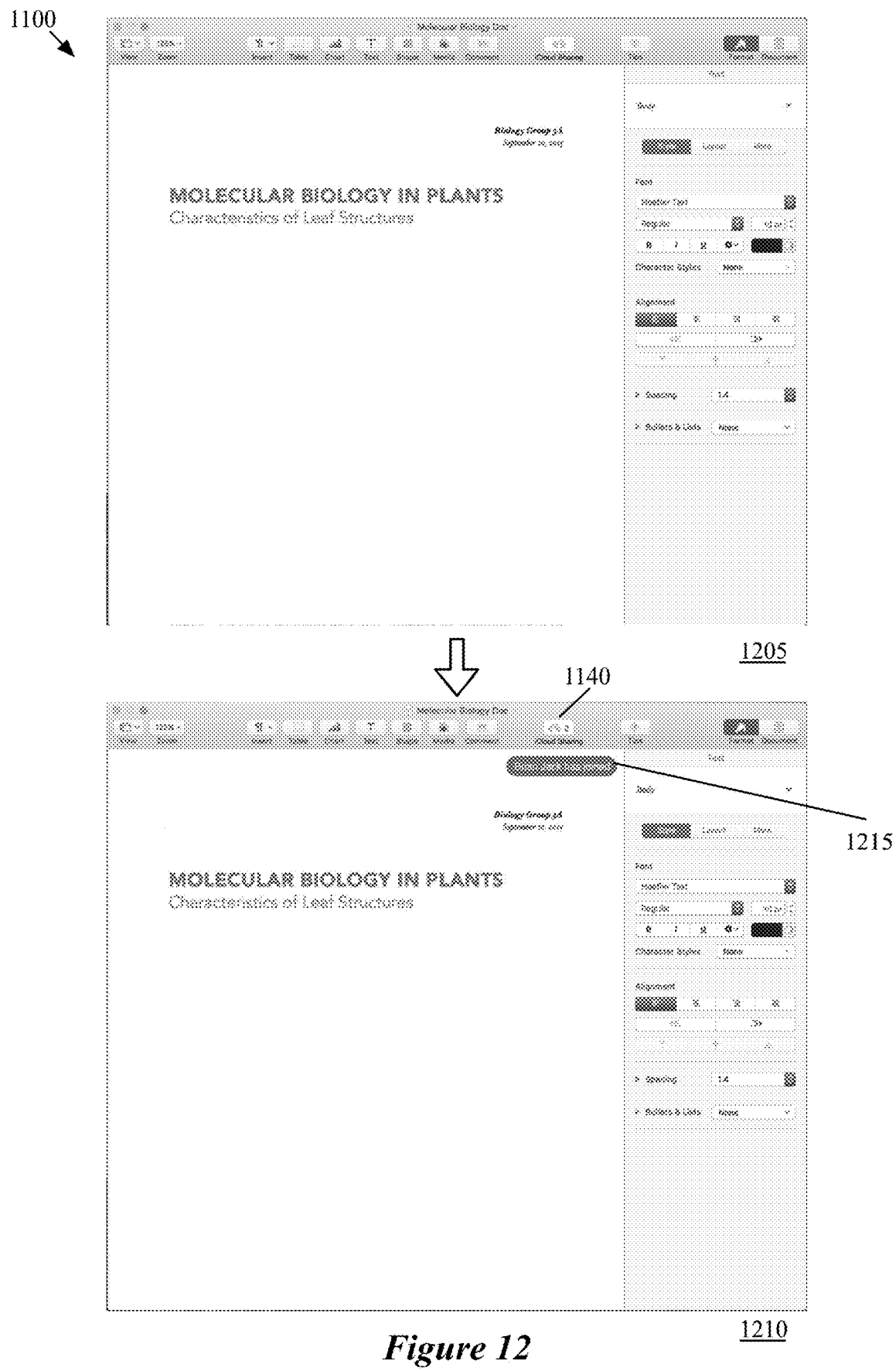
FIG. 12 illustrates the word processing application GUI of FIG. 11 after the document has been shared, as an invited user accesses the document.

Specifically, FIGS. 11A-B illustrates a user sharing a data asset (specifically, an editable word processing document) over four stages 1105-1120 of a word processing application GUI 1100. This word processing GUI 1100 is shown as might be displayed on a laptop or desktop computing environment (e.g., in a Mac OS X, Windows, Linux, etc. environment), but it should be understood that these constructs could also be displayed in a mobile device environment of some embodiments.

The first stage 1105 illustrates the GUI 1100, which includes a document display area 1125 (for displaying a currently opened document), an editing tools display area 1130 (for displaying various editing tools for editing the current document), and a toolbar 1135. The toolbar 1135 includes a selectable cloud sharing item 1140 that enables sharing via the cloud services platform. Some embodiments also include one or more additional items for directly sharing a document (via e-mail, text messaging, application-specific messaging, etc.). In this stage 1105, the user positions a cursor over the cloud sharing item 1140 and selects the item (e.g., with a cursor controller device).

As a result, the second stage 1110 illustrates the application GUI 1100 in the background (using a partially transparent gray fill) with a cloud sharing overlay 1145 displayed as overlaid on the application GUI. As in the previous GUIs for different devices, the cloud sharing overlay (provided by the OS-level sharing framework) displays selectable items for different mechanisms through which to notify other users of the shared data asset. Specifically, the overlay includes items for e-mail 1146, messages 1147, and social media platforms 1149 and 1150 (Twitter and Facebook, respectively). There is also an item for copying a link 1148, which allows the user to copy a link to the shared data asset on the cloud storage servers and provide this link to other users in any manner chosen. In some embodiments, the user can view additional options with a sideways drag gesture with a cursor controller (or equivalent gesture on a touchpad, trackpad, etc.). In this example, the e-mail item 1146 is the first option listed, whereas in the examples above, the messages option was presented first. Some embodiments always present text messaging as the first option on mobile devices, while presenting e-mail as the first option on desktop/laptop computers. In other embodiments, the order of the items changes based on usage (i.e., with more commonly used types of messaging listed first). At this stage 1110, the e-mail item 1146 is highlighted for selection (some embodiments automatically highlight the first option, with the user able to scroll through the options using, e.g., arrow keys), although the user has not yet made a selection.

The cloud sharing overlay 1145 also includes an expandable sharing options section 1155, similar in function to that shown in FIG. 4 above. At this stage 1110, the section 1155 is not expanded, but indicates that only those users with whom the document is explicitly shared will be allowed to view/edit the document. The user (via a cursor controller) selects this section for expansion at stage 1110.

The third stage 1115 shows the resulting cloud sharing overlay 1145 with an expanded sharing options section 1155. The expanded section includes two drop-down menus, similar to the different sections of the sharing options GUI 425. The first drop-down menu 1160 provides options regarding who is allowed to access the document (e.g., only those invited by the owner or anyone with a link to the document), which in some embodiments defines how or whether the document is encrypted on the cloud storage. The second drop-down menu 1165 provides permissions options for those who have access to the document (e.g., whether privileges include editing or only viewing). As described above, in some embodiments these options can be customized after sharing. In addition, at this stage 1115, the user selects the messages item 1147 to create a new message with the link to the shared document.

The fourth stage 1120 illustrates a message overlay 1170 after the user has added recipients and edited the message content. In some embodiments, the overlay 1170 is provided by a messaging application on the computer based on a command from the sharing framework of the OS. In some embodiments, the user enters the recipient addresses (e.g., e-mail addresses or phone numbers) before the message is created (e.g., through a dialog), and the framework then creates the message with the recipients auto-populated (e.g., within a messaging application that contains an ongoing conversation with the various participants). In other embodiments, the framework automatically provides the editable messages overlay 1170, allowing the user to edit the message and populate the recipients within the overlay. Once the user sends the message, this message is added to any ongoing conversation between the owner and the recipients (or a new conversation is created if none yet exists).

FIG. 12 illustrates the word processing application GUI 1100 after the document has been shared, as an invited user accesses the document, over two stages 1205-1210. In the first stage 1205, the application GUI 1100 appears the same as in the first stage 1105 of FIG. 11. In some embodiments, however, the cloud sharing item 1140 has a different appearance if the document is already shared as compared to before the document has been shared.

In the second stage 1210, one of the invited users opens the document (e.g., by selecting the received link). As shown, the cloud sharing item 1140 is modified slightly to indicate the number of users currently viewing and/or editing the document in some embodiments, while other embodiments display the number of users that have been invited to view and/or edit the document. In addition, as the other user joins, a notification item 1215 pops up for a brief time period underneath the cloud sharing item 1140, to indicate to the owner which user has recently joined the document. The operations performed on the receiving device will be described in further detail below.

Figure 13A:
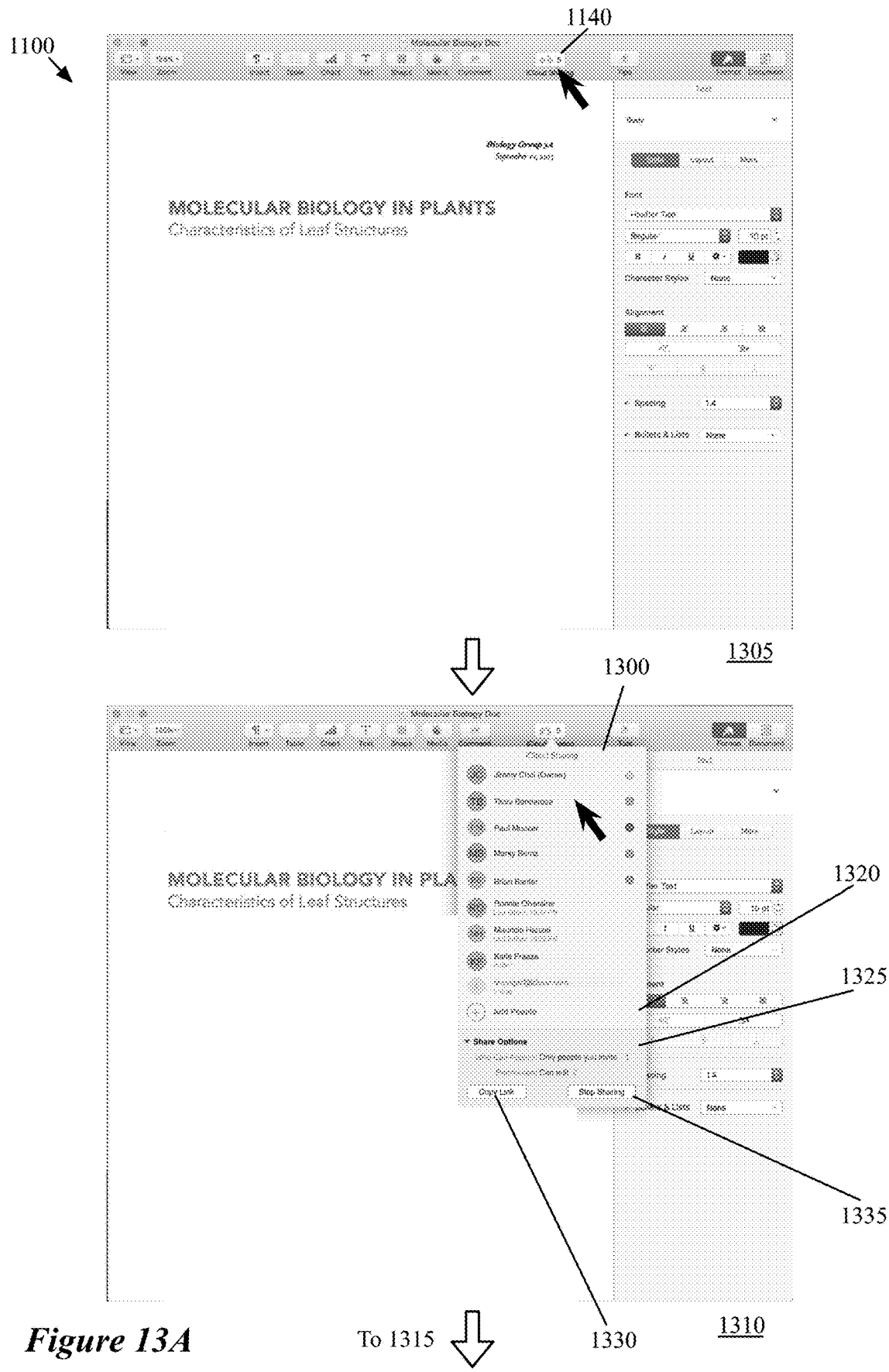
FIGS. 13A-B illustrate the word processing application GUI after the document has been shared as the owning user views information about the other users that have been invited to access the document.
Figure 13B:
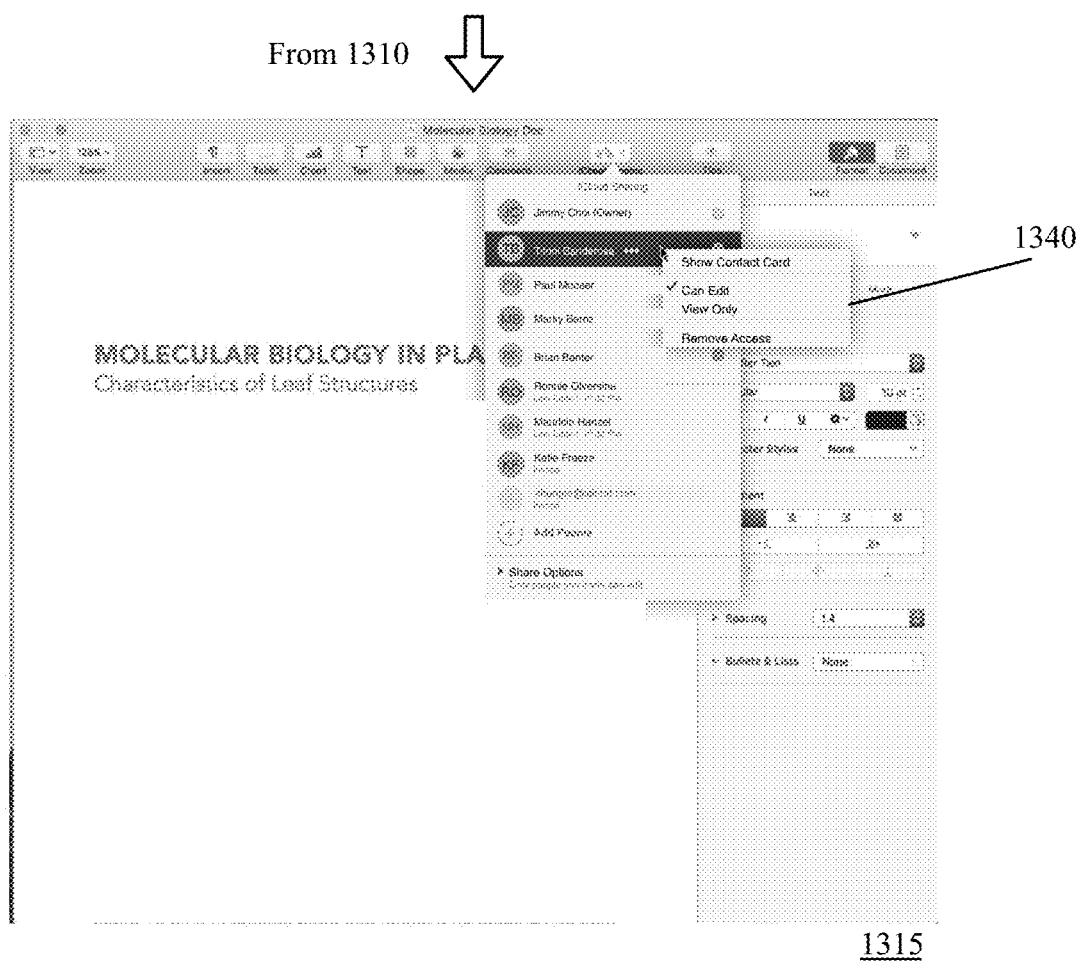

FIGS. 13A-B illustrate the word processing application GUI 1100 after the document has been shared as the owning user views information about the other users that have been invited to access the document over three stages 1305-1315. The first stage 1305 illustrates the GUI 1100 in a similar state as in the previous figures, except that the cloud sharing item 1140 indicates that five users currently have the biology notes document open on their respective devices. At this stage, the user selects this cloud sharing item 1140.

Because this document has already been shared, selection of the cloud sharing item 1140 causes the application to display the cloud sharing information overlay 1300. This overlay includes items for each of the users with whom the document has been shared, as well as status information about each of these users. For the five users (including the owner) that currently have the document open, a color indicator is displayed next to their name, which indicates their marker color within the document. These colors match the color of a cursor or other marker displayed within the editable document that indicate where in the document that user is working. For the other users that are not currently working on the document, the cloud sharing overlay 1300 displays their most recent status (e.g., a last edit time, or that they have been invited). In addition, the overlay 1300 includes an add users item 1320 (for sharing the document with additional users), share options 1325 (with drop-down menus similar to those shown at stage 1115 of FIG. 11), a copy link item 1330 (similar to the copy link items described above), and a stop sharing item 1335 (for removing all shared users from the document).

The user, at stage 1310, selects one of the users ("Titoni Banderosa") with which the document is shared (e.g., by right- or left-clicking on the item for the user, etc.), and is presented with various options relating to the user in a menu 1340 shown in the third stage 1315. This menu provides options to show a contact card for the user, change the editing privileges for the user, or completely remove the user's access to the document.

The above examples illustrate GUIs incorporating cloud sharing constructs on three different types of devices that may be authorized with the cloud services platform (smart phone, tablet, laptop/desktop computer). In some cases, however, a user may want to access their cloud storage documents on an unauthorized device (e.g., a public computer, a friend's computer, etc.). In some embodiments, these documents (and cloud sharing functionality) is also available through a web browser, as shown in FIGS. 14-15.

Figure 14A:
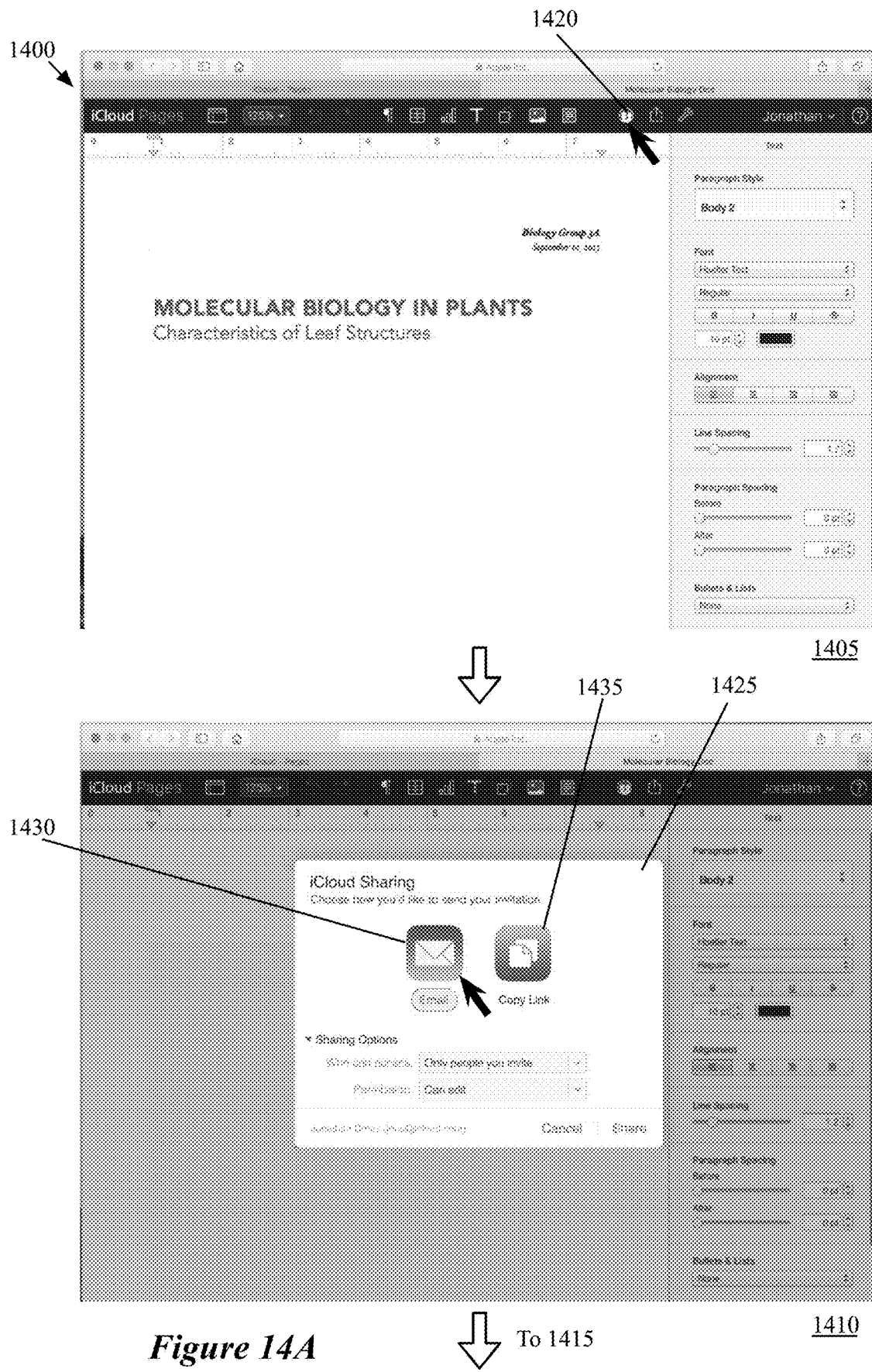
FIGS. 14A-B illustrate a web browser GUI through which a user accesses and shares a document.
Figure 14B:
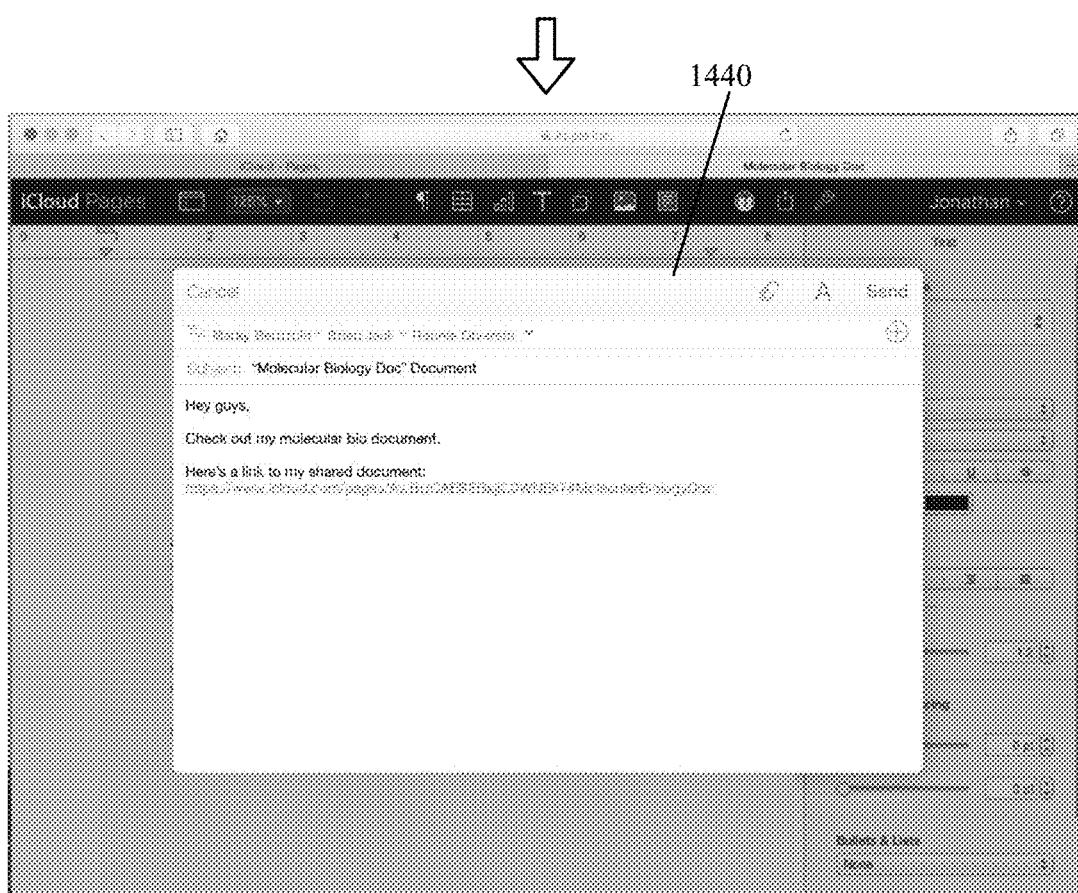

FIGS. 14A-B illustrate a web browser GUI 1400 through which a user accesses and shares a document over three stages 1405-1415. The first stage 1405 illustrates the web browser open to a document on a user's cloud storage drive, with the user already having logged in to the cloud services and opened a word processing document. As shown, the GUI 1400 provides many of the similar features as the word processing application GUI 1100, as well as a cloud sharing item 1420. The user selects this item 1420 at this stage.

Thus, the second stage 1410 displays a cloud sharing overlay 1425 over the web browser GUI 1400. The cloud sharing overlay 1425 only provides items for invitation by e-mail 1430 or copying a link 1435, as opposed to the previous examples that included text messaging or other application-specific messaging mechanisms. Because the user is logging in through a web browser and these options may not be available on the device or directly linked with the cloud services account, the cloud sharing overlay 1425 only presents e-mail as an option. The remainder of the overlay 1425 includes similar sharing options as in the GUIs described above.

At this second stage, the user selects the e-mail option 1430. As a result, the third stage 1415 illustrates that the cloud services has generated an editable e-mail 1440 that includes a link to the shared document, which the user has populated with several recipient users. In some embodiments, the cloud service platform is associated with at least one e-mail address of the user (e.g., an e-mail provided by the cloud service platform), and this address is used to send the e-mail.

Figure 15A:
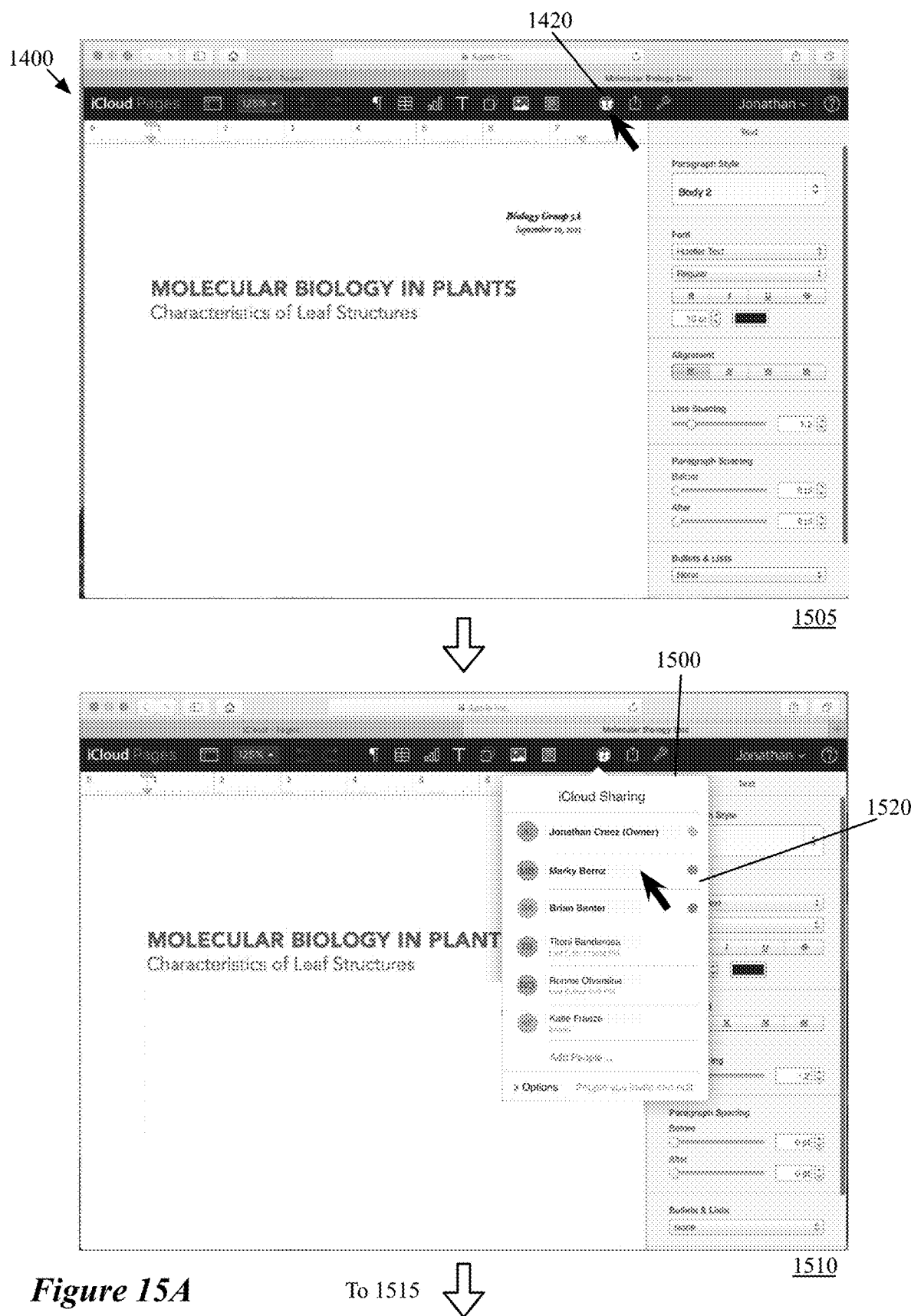
FIGS. 15A-B illustrate the web browser based GUI of FIG. 14 after the document has been shared with other users.
Figure 15B:
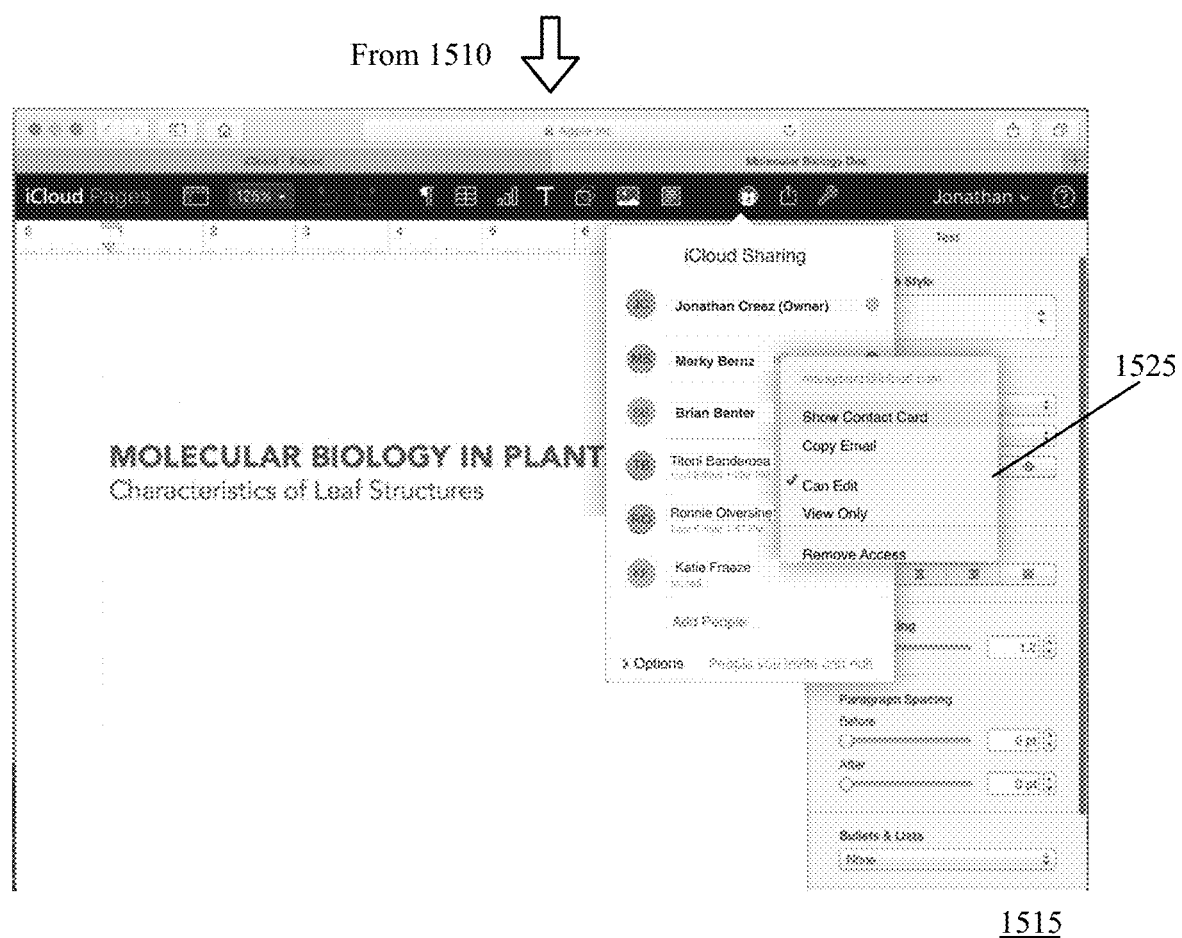

FIGS. 15A-B illustrate the web browser based GUI 1400 after the document has been shared with other users over three stages 1505-1515. The first stage 1505 illustrates the GUI 1400 in the same state as the first stage 1405 of FIG. 14, as the user again selects the cloud sharing item 1420. Because the document has previously been shared, this causes the web browser to display a cloud sharing information overlay 1500 in the second stage 1510.

Much like the overlay 1300 shown in FIG. 13, the overlay 1500 includes items for each of the users with whom the document has been shared, as well as status information about the users and a color indicator for the current users that identifies the color used to indicate the location of that user's cursor or other marker within the shared document. The overlay 1500 also includes a sharing options section that can be opened (it is closed in this stage, but allows the user to modify global access settings, stop sharing etc., as described above) as well as an add users item.

Each of the user indicator items are selectable in some embodiments, as shown in the third stage 1515 after the user has selected an item 1520 for the user "Marky Bernz". Doing so provides a menu 1525 with options similar to those described above for FIG. 13, to modify the sharing settings for the selected user.

These examples illustrated sharing a data asset on a device and then later viewing that shared data asset on the same device. It should be understood that in some embodiments users can also share a data asset on a first device and then later view that data asset on another of their devices (as the data asset is stored in cloud storage). For example, the user who shared the note in FIG. 2 from his smart could later access that note on his tablet and be presented with the GUI shown in FIG. 10. Similarly, the user who shared a biology notes word processing document through either the device framework or web browser could access that same document on a mobile device, with a GUI similar to those shown for the mobile devices above.

Figure 16:
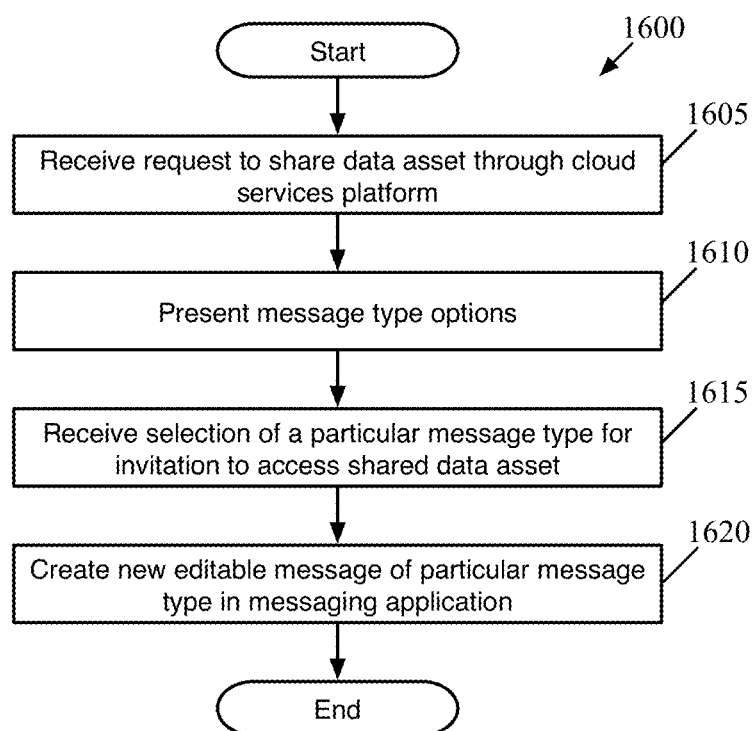
FIG. 16 conceptually illustrates a process of some embodiments for automatically creating a message for sending an invitation to a shared documents.

FIG. 16 conceptually illustrates a process 1600 of some embodiments for automatically creating a message for sending an invitation to a shared documents. In some embodiments, the process 1600 is performed by a user device (e.g., by an OS-level sharing framework on the user device), such as a smart phone, tablet, laptop, desktop, media player, etc.

As shown, the process 1600 receives (at 1605) a request to share data asset through the cloud services platform. In some embodiments, the user of the device provides input through the GUI of an application executing on the device (e.g., a native or third-party application). The user may interact with GUI constructs of the application that are provided by the sharing framework (e.g., the various GUI constructs shown in the above figures), and the application provides this request to the OS framework.

In response, the process 1600 presents (at 1610) a set of message type options. As shown in the above figures representing some of the possible GUI implementations, these message type options may include e-mail, text messaging, and/or application-specific messaging such as that provided by various social media applications or other third-party text/data messaging applications. Thus, when the user makes this selection, the process receives (at 1615) a selection of a particular message type for sending an invitation to access the shared data.

In response, the process creates (at 1620) a new editable message of the particular message type in the appropriate messaging application. That is, the operating system calls the messaging application selected by the user (or the messaging application for sending the type of message selected by the user), and commands the messaging application to create a new message with the link to the document being shared. This may be a new e-mail from the e-mail address of the user that is associated with the user account. In the case of text messages or other conversation-based messaging applications, some embodiments request that the user also input a set of recipients, so that the new editable message can be inserted into the appropriate conversation. The process 1600 then ends, and the user may now edit the content of the message.

III. Receipt of Shared Data Assets

The above Section II described examples of the sharing of data assets by an owner via the sharing framework of some embodiments. This framework also provides for the recipients to access the shared data assets in a secure manner in some embodiments. Because the data assets are shared through the cloud services platform and are encrypted with the recipient user's public key, in some embodiments the recipient is required to also have an account with the cloud services platform. However, as described in the above section, the owning user may send the invitation to access the data asset to an e-mail address, phone number, application-specific account, etc., rather than to a cloud services account. If the recipient communications address has previously been associated with a cloud services account, then sharing is easy.

However, in some cases, the recipient communications address will not be associated with a cloud services account. As such, the framework of some embodiments provides mechanisms for the receiving account to be associated with the cloud services account (typically that with which the receiving device is already associated). When a user accesses the message providing the link (or when the user actually selects the link), the framework of some embodiments identifies that the communications address is not associated with the cloud services account of the device, and thus prompts the user to associate the address with the cloud services account, which requires input of the cloud services account password. In addition, some embodiments require that the user verify the e-mail or other communications address first. When the user selects the link (or just opens the communications message), the device prompts the user whether their address should be verified. Assuming the user selects to verify the address, the device displays a list of communications addresses with which the data asset owner shared the documents, from which the user selects an address. The cloud services platform then sends a verification message (containing a verification link) to the selected address, which the user can open and subsequently link the communications address to the cloud services account associated with the device. Some embodiments require the user to input the cloud services account password in order to complete verification and, if the device is not associated with any cloud services account, to input both the account identifier (username, associated communications address, etc.) and password.

Figure 17A:
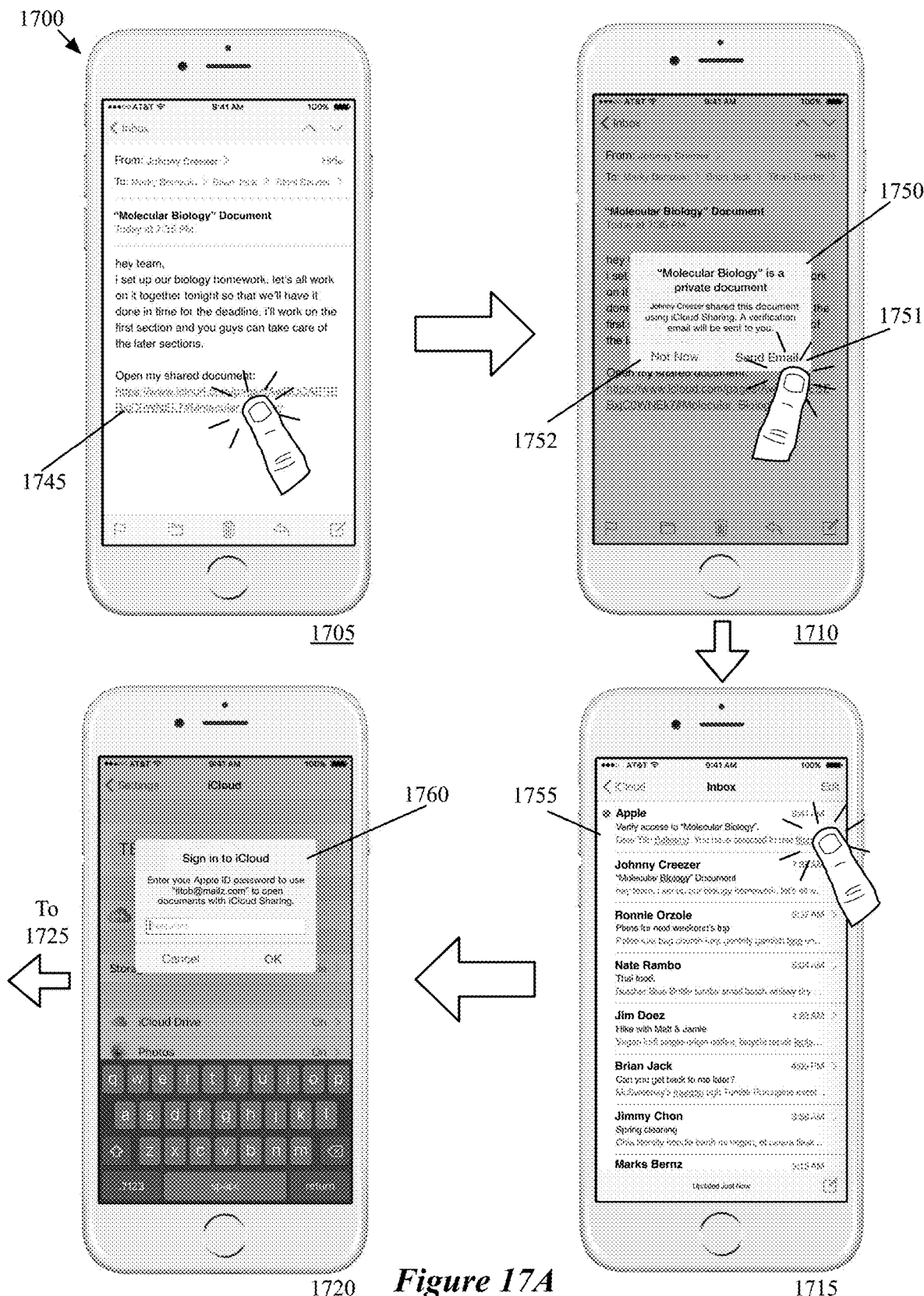
FIGS. 17A-B illustrate a communication address verification process on a smart phone device.
Figure 17B:
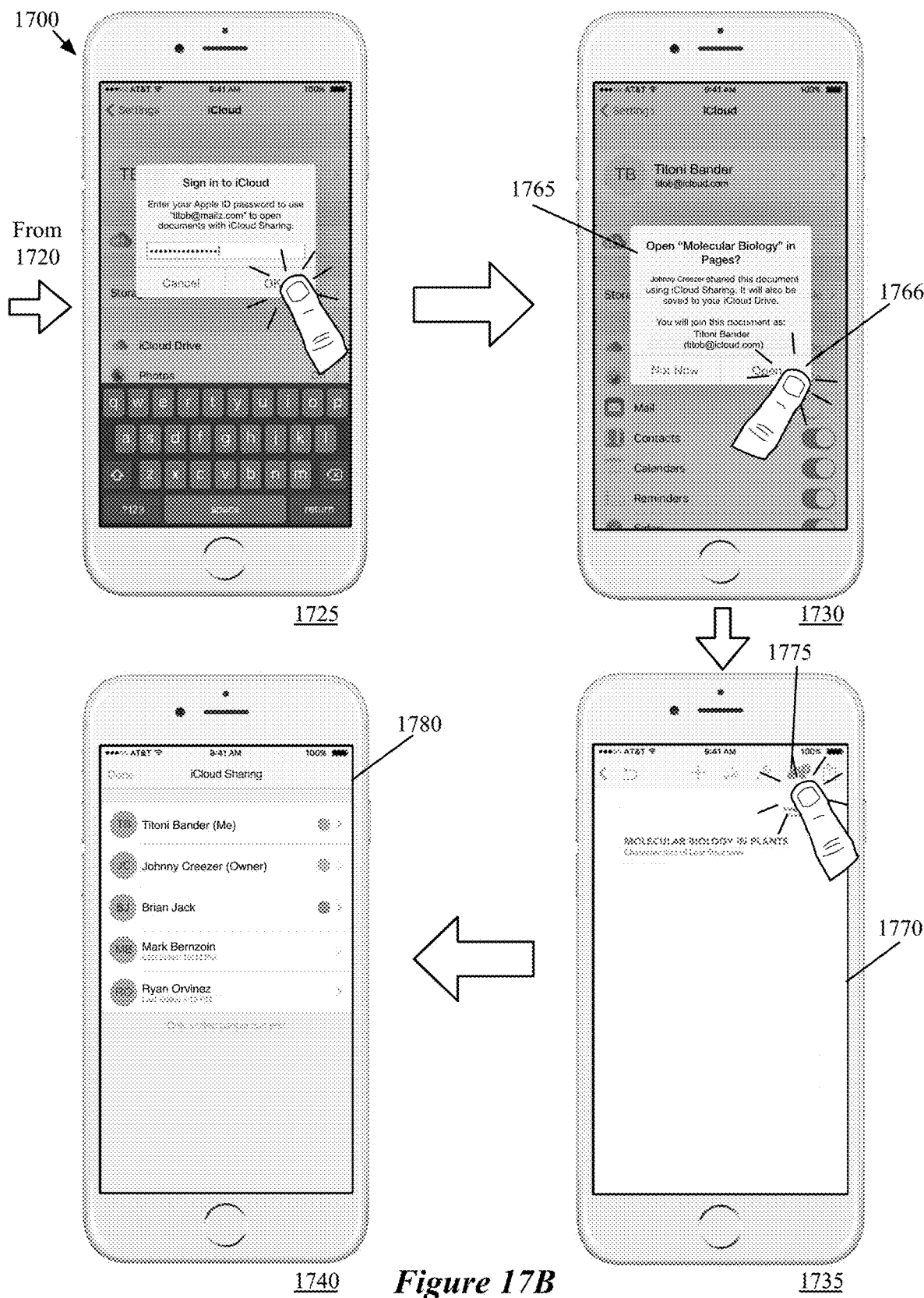

FIGS. 17A-B illustrate this verification process on a smart phone device 1700 over eight stages 1705-1740 of the device 1700. While this process is shown on a smart phone device that provides sharing GUI constructs similar to those shown in FIG. 2, one of ordinary skill in the art will recognize that similar verification processes might be performed on other types of devices with different GUIs, such as a tablet, laptop, or desktop, depending on the device being used by a recipient when receiving a communications message with a link to a shared data asset.

The first stage 1705 illustrates the device 1700 after the user of that device has opened an e-mail sending a link to a shared asset (e.g., the biology notes document shared in several of the examples of the preceding section). This e-mail indicates the sending user ("Johnny Creezer") that is the owner of the document and the other recipients of the document, as well as a message from the sender and a link 1745 to access the shared document on cloud storage. At this stage, the user selects the link (e.g., with a tap input).

If the e-mail address of the recipient (i.e., the e-mail address at which the current user received the e-mail) is associated with a cloud services account (and the device 1700 is also associated with that account), then accessing the document is simple. The device 1700 (e.g., the sharing framework of the OS of the device) downloads the document (which, as described below, may entail downloading several encrypted layers of data) and decrypts the document with the user's private key, as the document will have been encrypted with the corresponding private key by the device of the sender.

However, in this case, the e-mail address to which the owner sent the invitation is not associated with a particular cloud services account. As such, in some embodiments the document has not yet been encrypted with a public key of the receiving user's cloud service account, because the cloud services platform has not identified the receiving user (having only an e-mail address not affiliated with any particular account). As such, the device 1700 begins a process to associate the recipient e-mail address with a cloud services account.

As shown in the second stage 1710, the device 1700 initially displays an e-mail verification prompt 1750. This prompt identifies that the received document is a privately shared document that is shared through the cloud services platform (iCloud Sharing), and indicates that a verification e-mail will be sent to the user. The verification prompt 1750 includes two selectable items 1751 and 1752, allowing the user to choose whether to have the verification e-mail sent now or to wait until later. The user selects the send e-mail item 1751. In some embodiments, this request asks the cloud services platform to send a verification e-mail to the e-mail address with which the e-mail application on the device 1700 is associated, so long as that address is one of the e-mail addresses to which the owner of the document initially sent the invitation. Thus, if the e-mail is forwarded to a different e-mail address, that user will be unable to access the account (if the e-mail address to which the invitation is forwarded is associated with a different cloud services account, this account will not have access; if the e-mail address is not associated with a cloud services account, the recipient will not be able to receive the verification e-mail.

In this case, the verification e-mail has been sent to the same e-mail address as the invitation, and in the third stage 1715 the user has returned to their inbox within the e-mail application on the device 1700. The inbox now includes a new e-mail 1755 from the cloud services platform (Apple) requesting that the user verify access to the document "Molecular Biology" (i.e., the shared document from the link 1745. The user then selects this new e-mail 1755.

Figure 18:
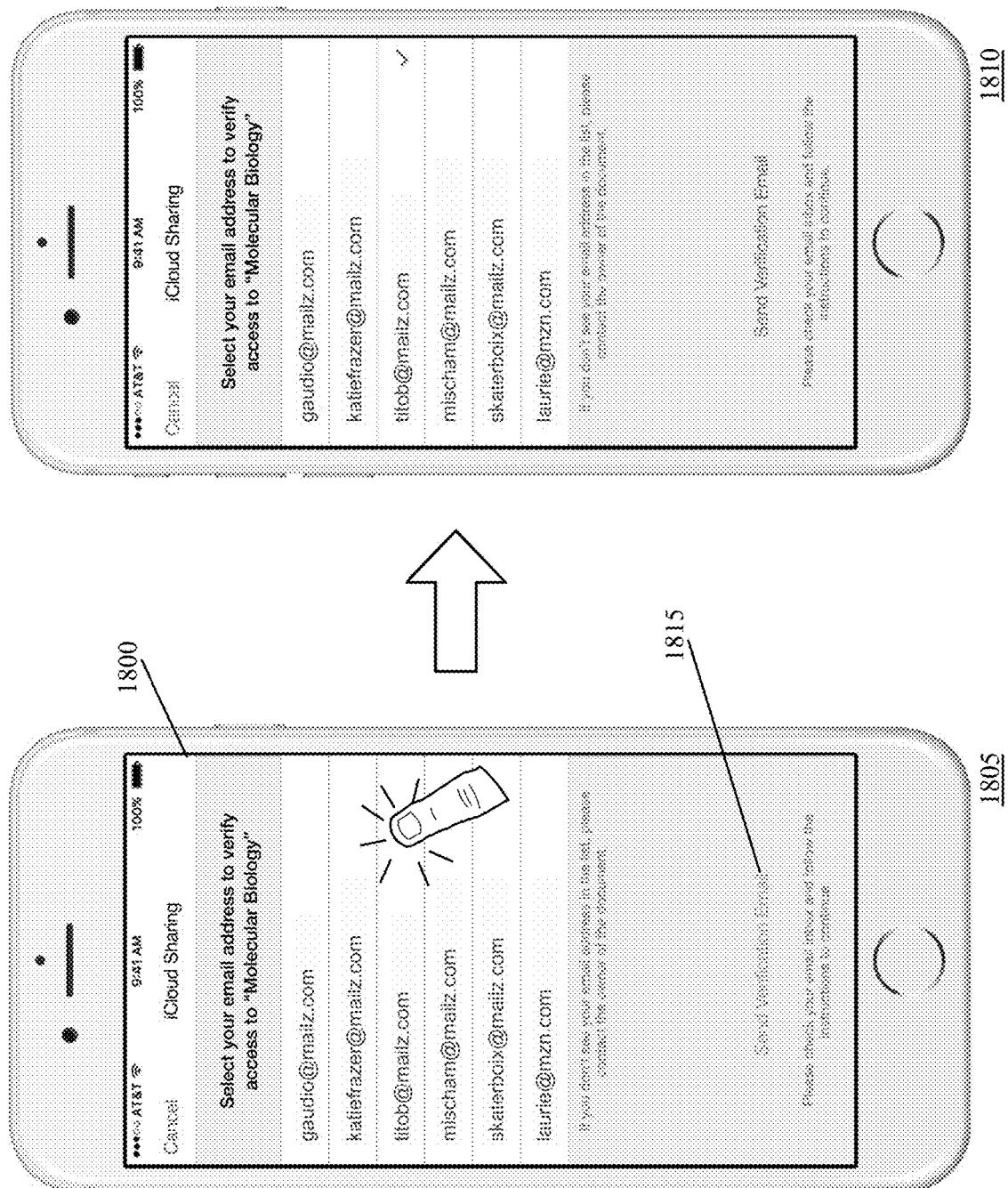
FIG. 18 illustrates an additional e-mail address selection GUI that the cloud sharing framework displays when the user of a device selects e-mail verification from a third-party e-mail application rather than a native e-mail application that is integrated with the device.

In this example, the e-mail application is a native application integrated with the operating system of the device 1700, and thus the verification prompt can lead immediately to the e-mail because the device can easily identify the e-mail address from the application. However, if the user is viewing the e-mail in a third-party application, then some embodiments provide an e-mail selection GUI, in which the user manually chooses one of the e-mail addresses to which the invitation was sent for the cloud services platform to send an e-mail verification. FIG. 18, described below, illustrates an example of such an e-mail selection.

The fourth stage 1720 of FIG. 17 illustrates the result of the user selecting the e-mail message 1755, as the device 1700 displays a cloud services sign-in prompt 1760. In some embodiments, the device displays this prompt as soon as the user opens the e-mail 1755, while other embodiments wait for the user to select a verification link within that e-mail. In either case, the verification request sends a call to the operating system, which handles the cloud services sign-in procedure. As shown at this stage, the device 1700 displays a cloud sharing settings GUI in the background, rather than the e-mail application.

As explained in the prompt 1760, the user is requested to enter his password for the cloud services account in order to associate the recipient e-mail address (titob@mailz.com) to which the invitation was sent with that user's cloud services account. In the fifth stage 1725, the user has input his password. The device 1700 then sends this password (or a proof of the password, encrypted in some embodiments) to the cloud services platform, which verifies the password and associates the user's e-mail address with the cloud services account. In addition, in some embodiments, the cloud services platform encrypts a copy of the document (or a copy of the key for accessing the document) with the public key of the recipient user account, so that devices logged into that user account will be able to access the document.

The sixth stage 1730, after the user has successfully associated the recipient e-mail address with his cloud services account, displays a prompt 1765 asking the user whether the shared document should be opened. The prompt indicates the owner of the document as well as the cloud services account that will be used to access the shared document (titob@icloud.com). At this stage, the user selects the option 1766 to open the document on his device 1700.

The seventh stage 1735 illustrates the device 1700 after opening the document in a word processing application of some embodiments. The word processing application GUI 1770 includes a document display area for the editable document (only editable if the user was given editing privileges by the owner), as well as a toolbar with various selectable affordances relating to the document. These affordances include a cloud sharing item 1775, displayed with any document that is shared via the cloud services platform (as is the case with the current document). This affordance indicates that three users currently have the document open, as was the case with similar items on the owner device. The user selects this affordance 1775 at this stage.

As a result of the selection, the eighth stage 1940 illustrates that the application has opened a cloud sharing information GUI 1780. This GUI 1780 is similar to the cloud sharing information GUI 600 shown above for the owner device. However, because the user is not the owner, none of the options to customize share settings are available in the GUI 1780. That is, the non-owner user cannot change users' edit privileges, add users to the document, or end the shared status of the document. The GUI 1780 does still identify the status of the users with whom the document is shared, and provides indicators of edit colors for each of the users that currently have the document open on their respective devices.

As mentioned, FIG. 18 illustrates an additional e-mail address selection GUI 1800 over two stages that the cloud sharing framework displays when the user of a device selects e-mail verification from a third-party e-mail application rather than a native e-mail application that is integrated with the device, over two stages 1805-1810. The first stage 1805 illustrates the GUI 1800 before the user has selected an e-mail address. As indicated above, some embodiments display the GUI 1800 after the second stage 1710 of the process shown in FIG. 17 (or a similar stage with a similar prompt, after the user has selected the link to a document within a received e-mail). The GUI 1800 includes a list of the e-mail addresses to which the document was sent (some embodiments only include e-mail addresses that are not already affiliated with a cloud services account, and thus may not include the entire list of recipients. In addition, the GUI includes a selectable item 1815 for requesting a verification e-mail, which is currently not selectable. At this stage 1805, the user selects his e-mail address (titob@mailz.com), which causes the verification e-mail to become selectable (indicated by its darkening or changing color in this example) in the second stage 1810.

Figure 19:
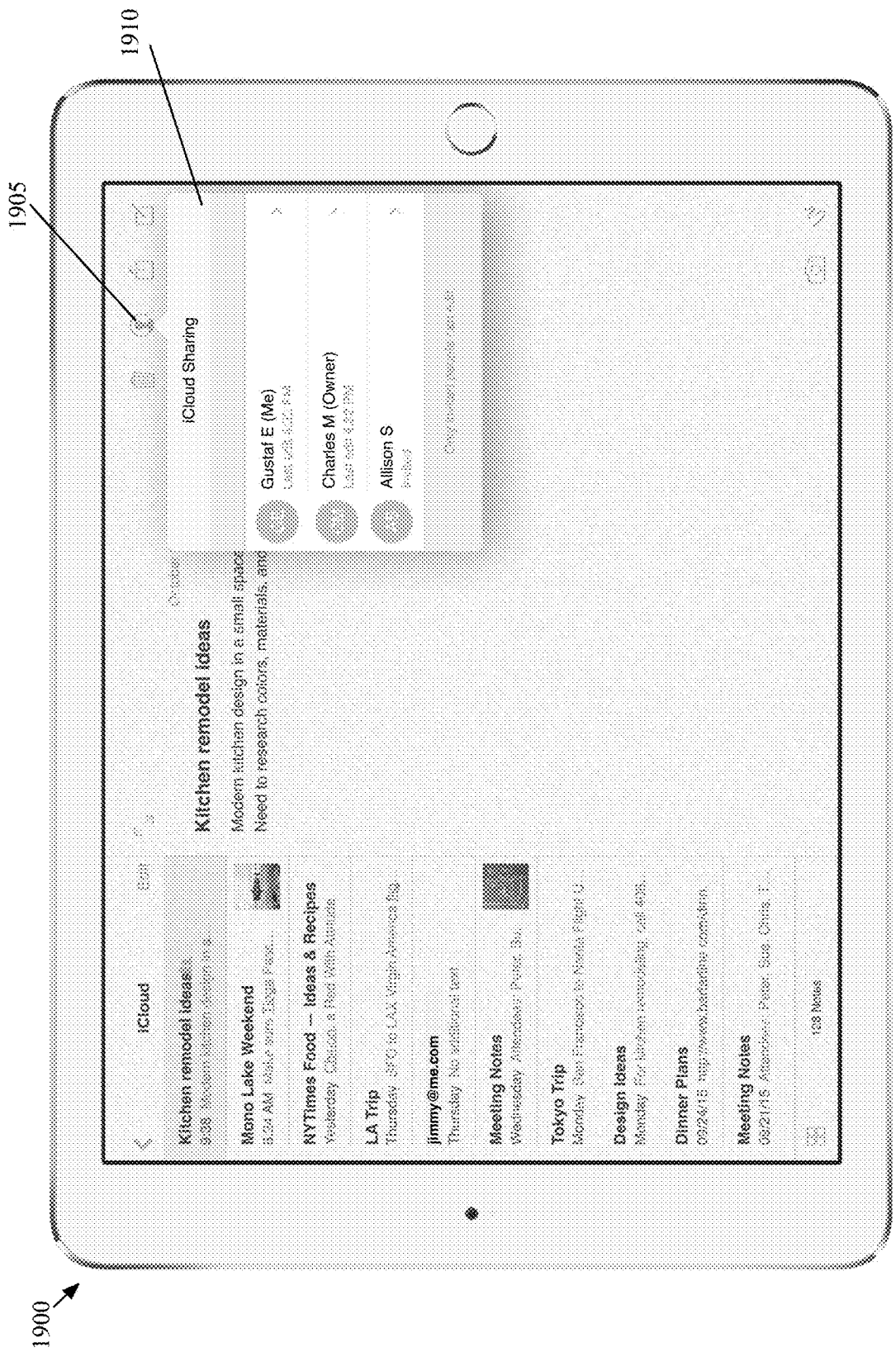
FIG. 19 illustrates a sharing information overlay for a recipient on a tablet device.
Figure 20:
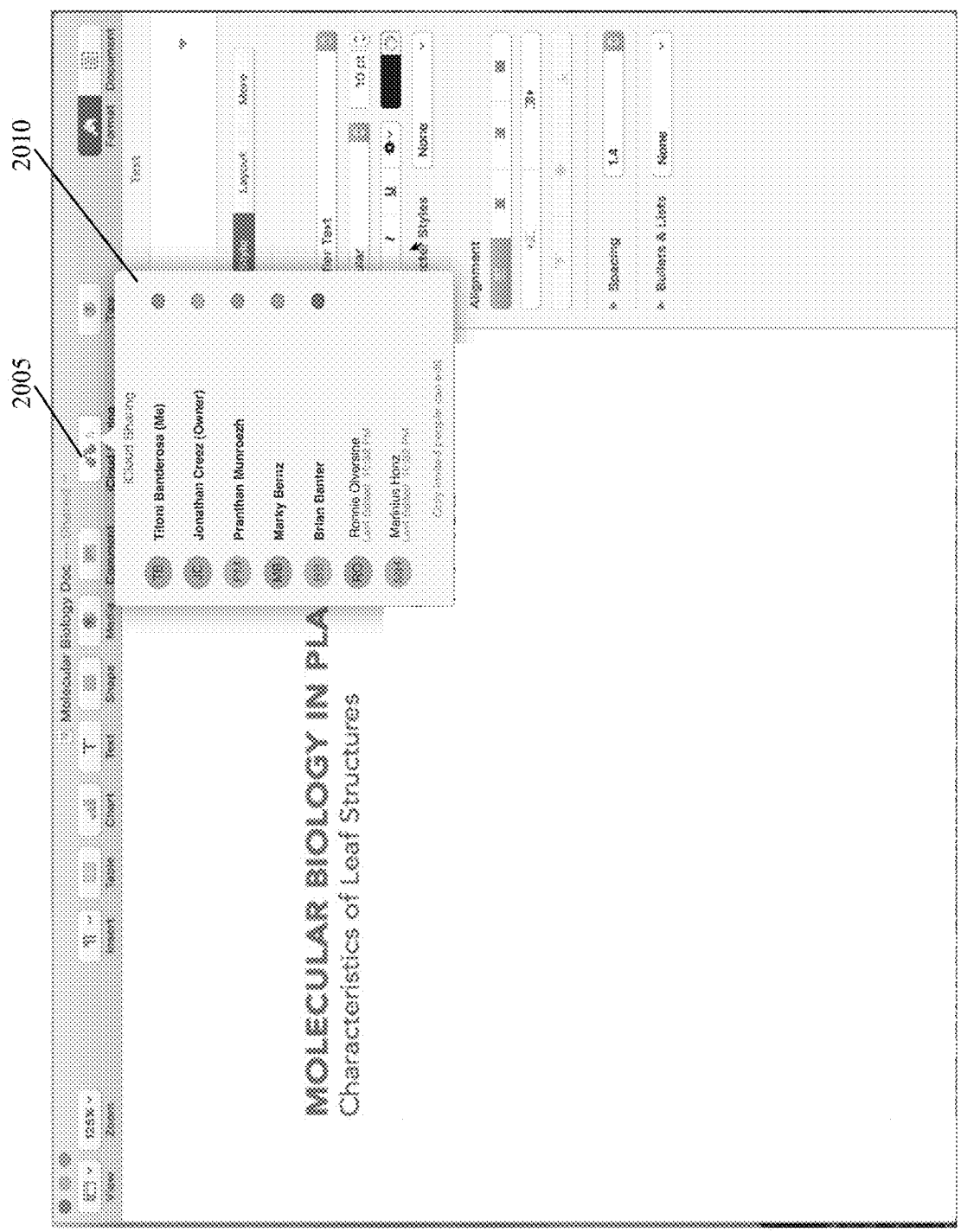
FIG. 20 illustrates a similar sharing information overlay on a laptop/desktop device.

The examples described above show the e-mail verification process and subsequent non-owner user GUI on a smart phone device. Just as the owner of a data asset can access that data asset on various different devices with different GUI constructs, as shown in the previous Section II, the recipient can access these shared data assets (and perform similar address verification processes) on multiple types of devices. FIG. 19 illustrates a sharing information overlay for a recipient on a tablet device 1900, while FIG. 20 illustrates a similar sharing information overlay on a laptop/desktop device. FIG. 19 illustrates that a recipient user of a tablet device 1900 has opened a shared note and selected a cloud sharing item 1905. As a result, the notes application displays a cloud sharing information overlay 1910, that indicates the users with whom the note was shared. The information overlay 1910 indicates both (i) the current user ("Gustaf E") and the owner of the note ("Charles M"), but does not provide any selectable items for modifying the sharing settings.

Similarly, FIG. 20 illustrates that a recipient user of a word processing application on a laptop/desktop computing device has opened a shared word processing document and selected a cloud sharing item 2005 in order to open a cloud sharing information overlay 2010. As with the example in FIG. 17, the cloud sharing information overlay 2010 indicates the names of the users with whom the document has been shared, the owner and current user, color indicators for each user with the document currently open, and does not have any items for modifying the sharing settings for the document.

Figure 21:
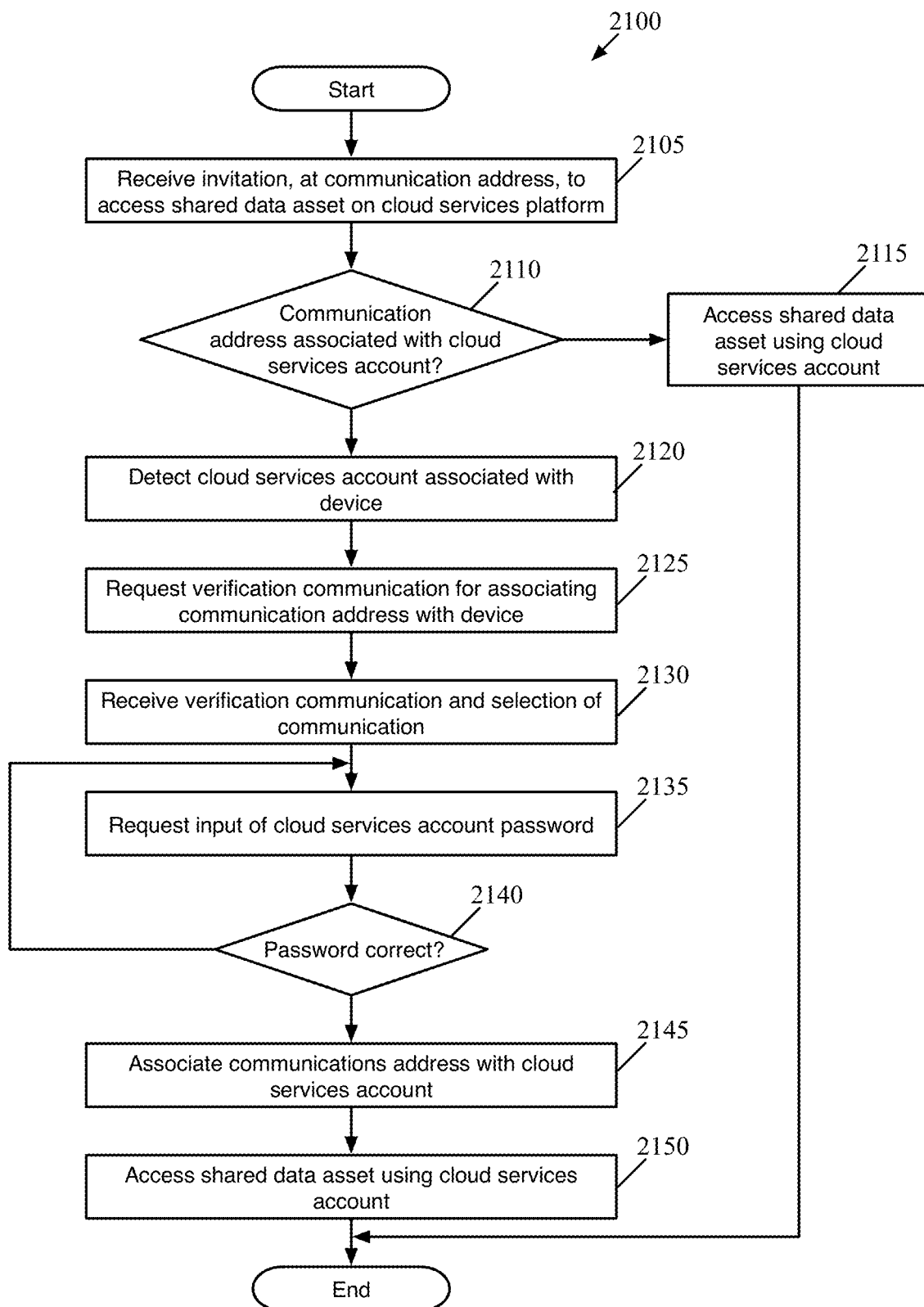
FIG. 21 conceptually illustrates a process of some embodiments for accessing a shared data asset upon receipt of an invitation to view and/or edit the shared data asset.

FIG. 21 conceptually illustrates a process 2100 of some embodiments for accessing a shared data asset upon receipt of an invitation to view and/or edit the shared data asset. In some embodiments, this process is performed by a user device (e.g., a smart phone, tablet, desktop computer, laptop computer, media player, etc.) that is associated with an account for the cloud services platform through which the data asset is shared.

As shown, the process 2100 begins by receiving (at 2105) an invitation, at a particular communication address, to access a shared data asset on a cloud services platform. Specifically, in some embodiments, the process begins when a user selects to access the shared data asset (e.g., by selecting a link to the data asset in a communication received at the particular communication address). While the example in the figures show a link received at an e-mail address, this process may be required for all types of electronic communication addresses, such as phone numbers (for text messages) or application-specific messaging addresses (e.g., social media accounts) in some embodiments.

The process 2100 then determines (at 2110) whether the particular communication address is associated with a cloud services account. In some embodiments, e-mail addresses, phone numbers, and/or other addresses may be associated with an account, so long as the user verifies these addresses. Thus, if the address is already associated with the account, the process accesses (at 2115) the shared data using the cloud services account. This may involve, in some embodiments, calling the appropriate application for the shared data asset and opening the shared asset in that application (in addition to downloading the shared asset and decrypting the asset with the user's private key).

However, if the address is not associated with the account, the process 2100 begins the sequence for creating this association. The process detects (at 2120) the cloud services account associated with the device. In some embodiments, if the device is not associated with a cloud services account, the device prompts the user to create this association if so desired, which in some such embodiments requires the use of a second device that is already associated with the account (for verification).

Assuming the device is associated with a cloud services account, the process then requests (at 2125) a verification communication (from the cloud services platform servers) for associating the communication address with the device. In some embodiments, as shown in stage 1710, the device prompts the user as to whether to have this communication sent to the address. Furthermore, if the user is using a third-party messaging application such that the operating system cannot retrieve the communication address to which the verification message should be sent, the device displays a list of communication addresses to which the invitation, and requests that the user select an address to which the cloud services platform will send the verification message.

The cloud services platform therefore sends a verification message to the communications address, to ensure that the user is not attempting to access the link from a different communications address (e.g., after being forwarded an invitation to a privately shared document). Thus, the process next receives (at 2130) a verification communication and selection of that communication. In some embodiments, the user opens a communication and selects an item (e.g., a link) in that communication to proceed with the verification process.

To complete verification, the process 2100 requests (at 2135) input of the cloud services account password. As shown in FIG. 17, in some embodiments the device provides a prompt requesting the password and specifies the cloud services account with which the communications address will be associated. Assuming the user enters a password, the process determines (at 2140) whether this password is correct. In some embodiments, the device sends a message with the password (e.g., with a hash or other value derived from the password using a one-way function) to the cloud services platform, which provides verification as to whether the password is correct. If the password is incorrect, the process returns to 2135 (assuming the user has not entered the password incorrectly more than a threshold amount of times).

Otherwise, the process associates (at 2145) the communications address to which the original communication (the invitation to access the shared data asset) was sent with cloud services account. In some embodiments, this entails communicating with the authentication of the cloud services platform. In addition, because the shared data asset is now associated with a particular cloud services account, the asset can be encrypted with the public key for that particular account, allowing the user device to decrypt the shared asset. The process accesses (at 2150) the shared asset using the cloud services account, then ends. This access, in some embodiments, entails opening the shared asset in the appropriate application for that asset.

IV. Chaining of Data in Cloud Storage

The above Sections II and III describe the user interactions to both share data through cloud storage and access that data. As indicated above, some embodiments use the public key of the user with which a data asset is shared to enable access to the data asset by that user. However, some embodiments do not directly encrypt the data asset with the user public key, instead using one or more levels of indirection. These levels of indirection also allow for the quick and easy sharing of folders of data assets (or other associated sets of data assets, such as a document with many attachments), and for the movement of collections of data assets (shared or personal) between folders within cloud storage, while maintaining the requisite encryption on those data asset.

In some embodiments, each data asset is encrypted with a content-specific public key in a content record, such that only one encrypted copy of the data asset needs to be stored, irrespective of the number of keys that should be able to decrypt the data asset (though multiple versions of the data asset might be stored, separately encrypted with the content-specific key, e.g. for editable documents). The content-specific private key is stored in a structure record, in some embodiments, and may be generated randomly when the data asset is initially stored on the cloud services platform (though this description regularly refers to storage of the private key, some embodiments actually store a randomly generated value from which the private key can be generated). When a folder or other collection of data assets is stored on the cloud services platform by a user, some embodiments use a key chaining procedure so that one key can access the entire set of data assets, and so that the collection of assets can be moved to another folder without having to modify the encryption for each individual data asset.

Figure 22:
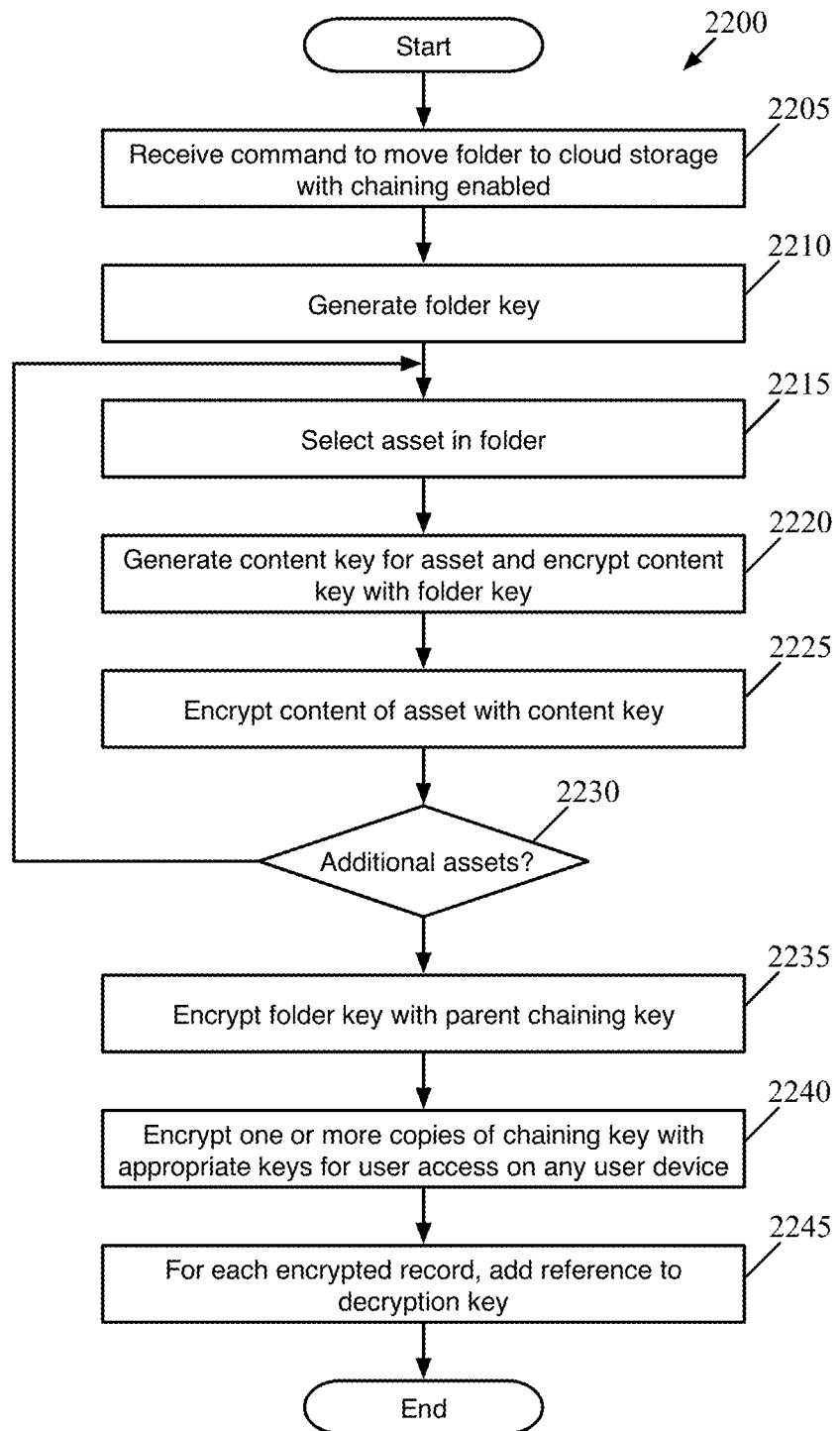
FIG. 22 conceptually illustrates a process of some embodiments for encrypting such a collection of data assets for storage in a user's cloud storage.

FIG. 22 conceptually illustrates a process 2200 of some embodiments for encrypting such a collection of data assets for storage in a user's cloud storage (either in the user's personal storage, or encrypted within the public storage for sharing with one or more identified other users). In some embodiments, the process 2200 is performed by the device of the user that owns the collection of data assets when the user first adds the collection (e.g., a folder, a document with multiple attachments, etc.) to her cloud storage. Because the device performs the operations, the data assets are not stored in decrypted form on the cloud storage server at any time. When the user accesses the documents through a web browser on an unauthorized device in some embodiments, however, the user authorizes servers of the cloud services platform to perform the requisite decryption in order for the user to access the files. The process 2200 will be described in part by reference to FIG. 23, which conceptually illustrates an example of the encryption scheme for storing a collection of data assets in cloud storage in some embodiments.

As shown, the process 2200 begins by receiving (at 2205) a command to move a folder (or another collection of data assets, such as a document with multiple attachments) to cloud storage with chaining enabled. While this process refers to a folder, it should be understood that any collection of associated data assets may be stored with chained encryption in the manner described. For instance, some embodiments encrypt a notes document with multiple attachments in this same manner, with the note effectively being a folder with multiple data assets (the attachments and content of the note).

Figure 23:
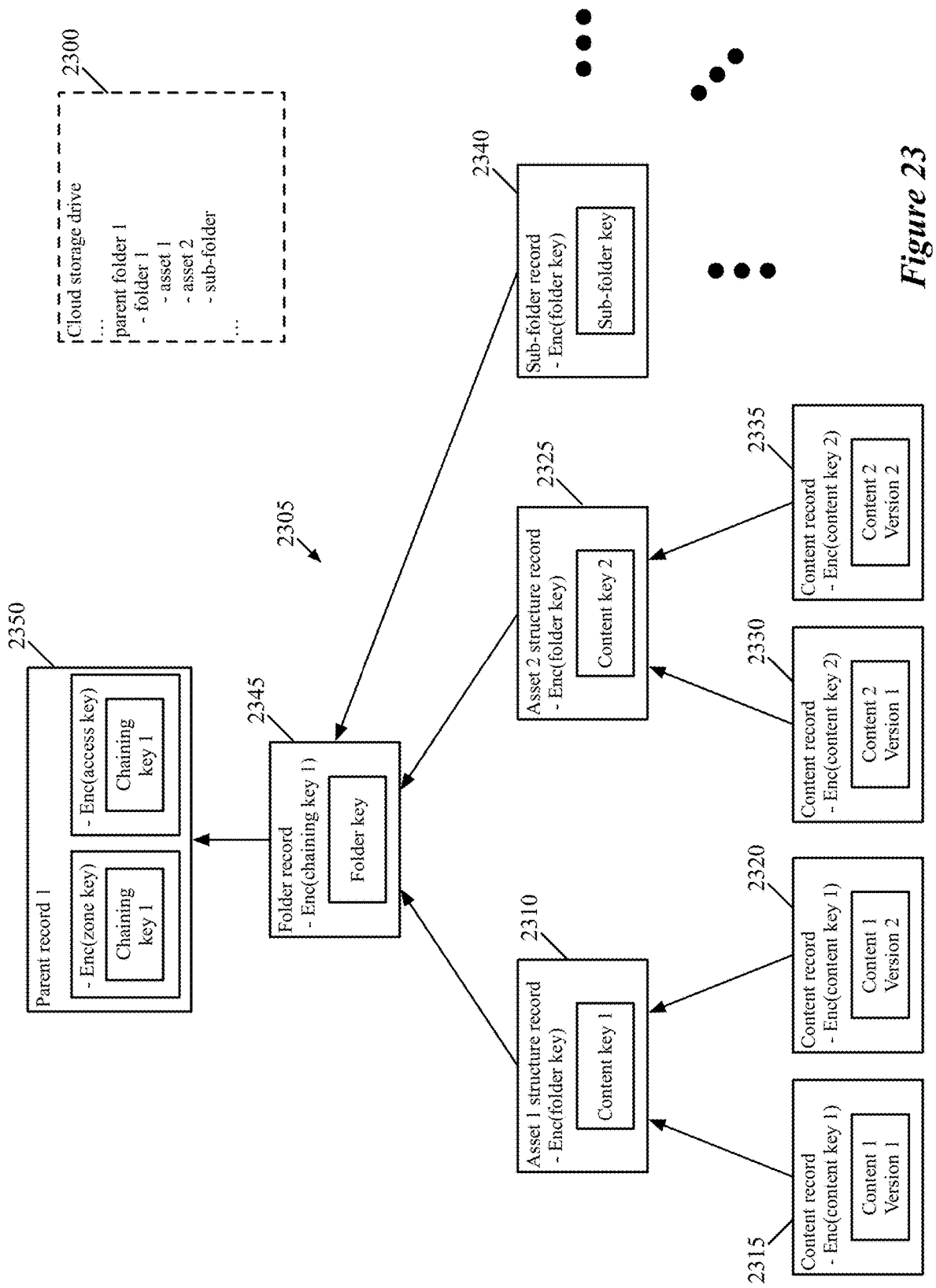
FIG. 23 conceptually illustrates an example of the encryption scheme for storing a collection of data assets in cloud storage in some embodiments.

In some embodiments, the user has a cloud storage drive with a file system hierarchy for storing data assets on the cloud services platform. Thus, when a user moves a folder or other collection of assets into this cloud storage drive (e.g., through a GUI on the user's device), the user device performs the encryption processes required to securely store the collection of data assets on the cloud services platform. FIG. 23 conceptually illustrates the storage of a folder on a user's cloud storage drive according to some embodiments. The inset 2300 illustrates a portion of the file system hierarchy of that drive, with the folder including at least two assets (asset 1 and asset 2) and a sub-folder, and being stored in a parent folder. Furthermore, some embodiments allow the user to determine whether key chaining is enabled, either for the drive as a whole or for specific folders; though not shown, key chaining is enabled in this case.

The process 2200 generates (at 2210) a folder key. Though the keys described in this section as a folder key, a chaining key, a sub-folder key, a content key, etc. are written as a single key, one of ordinary skill in the art will recognize that some embodiments generate a private key and public key for each of the keys described. When a key is used to encrypt data, the public key is used to perform the encryption (so that the corresponding private key can be used for decryption). When a key is encrypted for storage in a cloud storage record, either the private key or seed data from which the private key can be generated is the data encrypted for storage. To generate the folder key, some embodiments generate random seed data from which the private key and then public key is derived deterministically using a key derivation function.

The process 2200 then moves on to encrypting the data assets in the folder. It should be understood that the process 2200 is a conceptual process, and different embodiments may perform the various operations in different orders. For example, the process shows each data asset being encrypted one after the other, while some embodiments may perform multiple encryption threads in parallel. Furthermore, different encryption operations might take place in a different order; as an example, some embodiments encrypt the folder private key prior to encrypting the data assets of the folder using the folder public key.

As shown, the process 2200 selects (at 2215) an asset in the folder. The order in which the assets are selected may be random, ordered based on name or other factor, etc. In addition, as mentioned, some embodiments actually perform these operations in parallel. The process then generates (at 2220) a content key for the asset and encrypts the content key with the folder key. As noted above, this means that the content private key or seed data from which the content private key can be generated) is encrypted (i.e., as the plaintext input to an encryption operation) using the folder public key (i.e., as the key input to the encryption operation). As with the folder key, some embodiments randomly generate seed data for each content key and then use a key derivation function to derive private and public content keys from that seed data. The process also encrypts (at 2225) the content of the asset with the content key (i.e., with the content public key). With the currently selected data asset encrypted, the process 2200 determines (at 2230) whether additional assets need to be encrypted. If additional data assets remain in the folder, the process returns to 2215 to select and encrypt another data asset from the folder.

FIG. 23 illustrates the organization of the various records 2305 stored in cloud storage for the folder added to a user's cloud storage drive. As shown, several records are stored for each asset in the folder. In some embodiments, multiple versions of each asset may be stored (e.g., for editable documents, to allow the user to revert to past versions), and each of these versions is encrypted with the same content key. Thus, as shown, the cloud storage records 2305 include an asset structure record 2310 for the first asset, that stores the content private key for that first asset encrypted with the folder public key. This first content key is used to encrypt each of the two versions of the first data asset, which are stored in separate records 2315 and 2320. Similarly, the cloud storage records 2305 also include an asset structure record 2325 for the second asset, that stores the content private key for that second asset. Like the first content private key, this key is also encrypted with the folder public key. This second content key is used to encrypt each of the two versions of the second data asset, which are stored in separate records 2330 and 2335. Because both content keys in the structure records 2310 and 2325 are encrypted using the same folder public key, they can thus be decrypted using the same folder private key.

The folder shown in FIG. 23 also contains a sub-folder. Thus, the user's device also generates a key for that sub-folder (a sub-folder key) in the same way that the folder key is generated. The sub-folder key (i.e., the sub-folder private key or seed data) is encrypted with the folder key and stored in a sub-folder record 2340. This sub-folder key can then be used to encrypt content keys for any data assets stored in the sub-folder. In addition, the sub-folder may itself contain sub-folders, for which keys are generated, and so on through the file system hierarchy.

Returning to FIG. 22, once all of the data assets in the folder are encrypted (assuming there no recursive traversal of layers of sub-folders), the process encrypts (at 2235) the folder key with a parent chaining key. This chaining key might be a folder key for a parent folder, or a specific chaining key generated in order to encrypt the folder key. If the key does not yet exist, then the process also generates this key (again, by generating a random seed data and using a key derivation function.

The process 2200 also encrypts (at 2240) one or more copies of the chaining key with appropriate keys for user access on any user device. As shown in FIG. 23, the folder private key is stored in a folder record 2345, encrypted with a first chaining key. A parent record 2350 stores two copies of the first chaining key, each encrypted with a different key. One copy is encrypted with a zone key and a second copy is encrypted with an access key. In some embodiments, the zone key is a key stored in a higher-level record that can be accessed from a user's keychain (a set of keys accessible only to the user, which are decrypted with the user's private key). Similarly, the access key may be an application-specific key or other key that is available with the user private key. So long as the folder is not shared, any key used to encrypt the chaining key should ultimately require possession of the user private key (and therefore possession of the user's account password) to generate.

Finally, the process 2200 adds (at 2245) a reference to the decryption key for each encrypted record, then ends. In some embodiments, these references indicate, for each record, the location of the private key that is required to decrypt the record. In some embodiments, the references are formatted as a list of one or more public key identifiers, that simply identifies the public key used to encrypt the data in the record. Thus, each of the content records 2315, 2320, 2330, and 2335 include references to their respective content keys, the structure records 2310 and 2325 that store these content keys (as well as the sub-folder record 2340) include references to the folder key, etc. The parent record 2350, in some embodiments, includes a list of the various different keys that could be used to decrypt the chaining key.

It should be understood that, although shown as the final operation in the process 2200, some embodiments embed these references in the record when the record is created (e.g., along with the encryption of the data in the record). Furthermore, while not shown in the process, the user device also transmits the set of records to servers of the cloud services platform for storage. In some embodiments, the cloud services servers validate the references before actually storing the data, to ensure that all of the data will be able to be decrypted by the user. That is, the servers would validate that the content records refer to the key in their respective structure records, etc.

By using the folder key to encrypt all of the associated data assets (e.g., the assets within a folder), the collection of data assets can be moved to a different parent folder (which might, e.g., have different sharing permissions) without requiring most of the records to change at all. That is, all of the assets will not need to be re-encrypted by the user device. Instead, the copy of the folder key encrypted with the current chaining key is removed from the folder record, and a new copy of the folder key is instead encrypted with a new chaining key, the private key for which is kept (encrypted with the appropriate access keys) in a new parent-level record.

Figure 24:
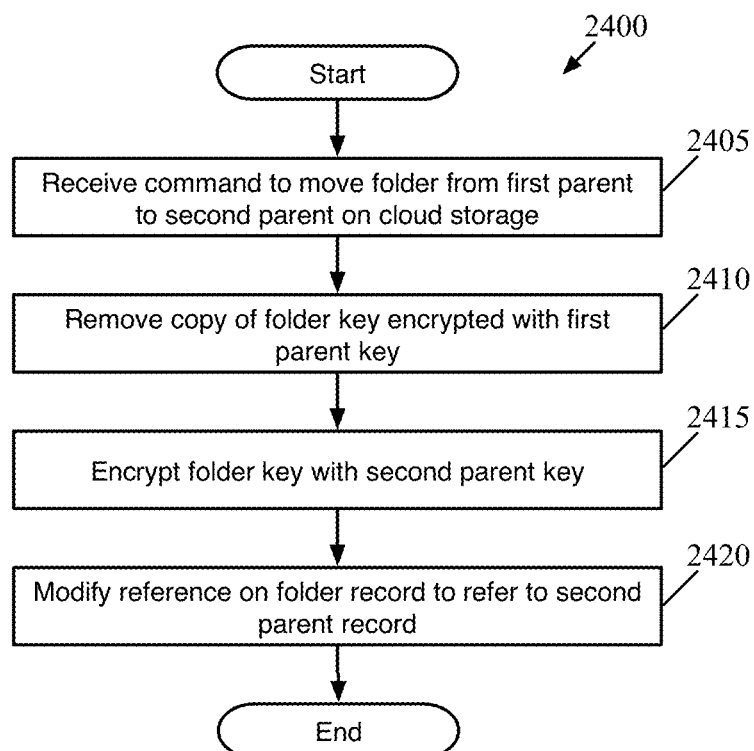
FIG. 24 conceptually illustrates a process of some embodiments for modifying the encryption of a collection of data assets that are moved from one parent folder to another parent folder in a user's cloud storage drive.

FIG. 24 conceptually illustrates a process 2400 of some embodiments for modifying the encryption of a collection of data assets that are moved from one parent folder to another parent folder in a user's cloud storage drive. In some embodiments, this process is performed by the device through which the user accesses her cloud storage to make the change, so long as that device is an authorized device associated with the user's cloud services account. If the user accesses her cloud storage through a web browser, in some embodiments servers of the cloud services platform are authorized to perform the encryption and decryption. This process 2400 will be described in part by reference to FIG. 25, which illustrates the result of moving the folder shown in FIG. 23 to a different parent folder in cloud storage.

Figure 25:
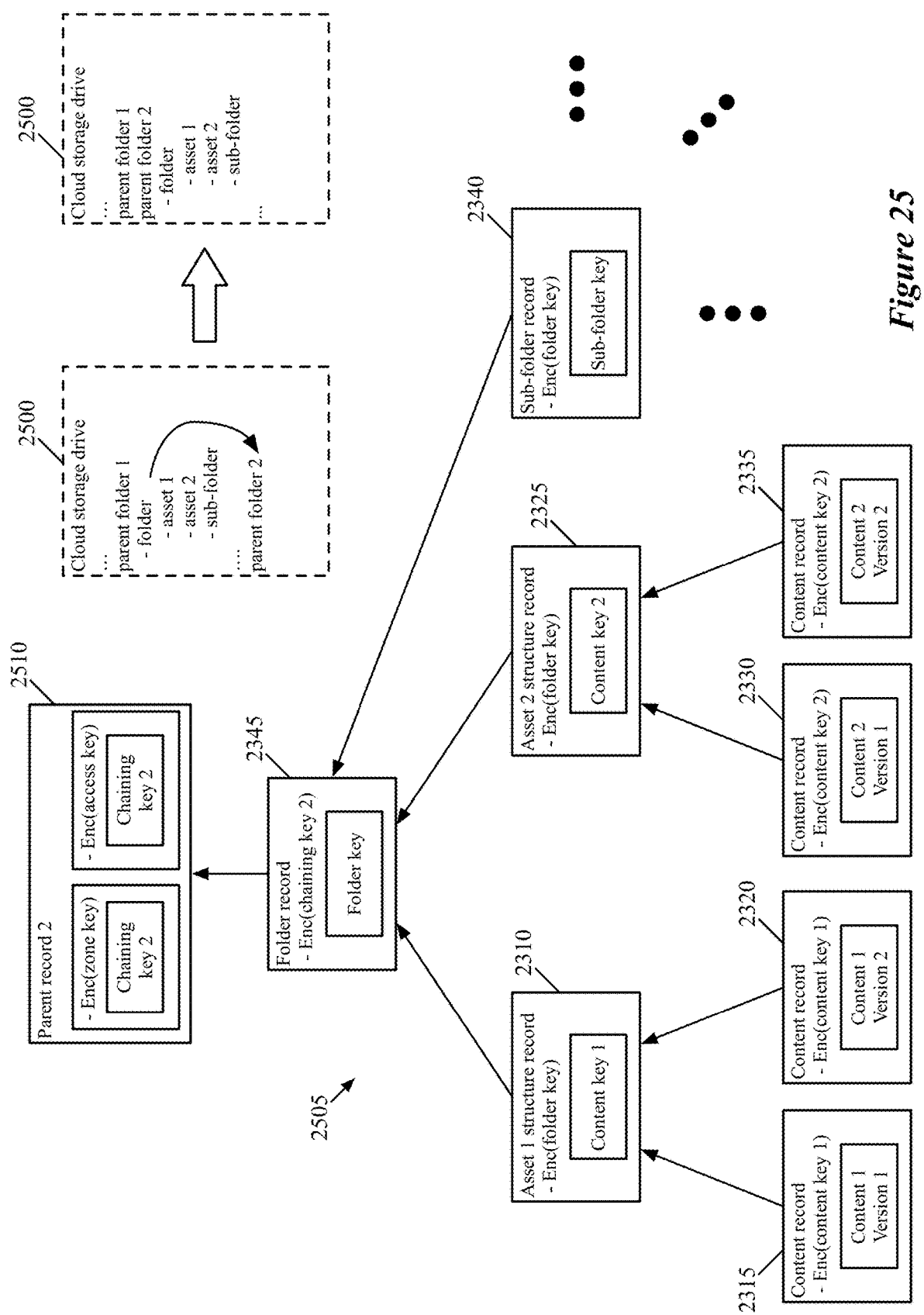
FIG. 25 illustrates the result of moving the folder shown in FIG. 23 to a different parent folder in cloud storage.

As shown, the process 2400 begins by receiving (at 2405) a command to move a folder (or other collection of data assets) from a first parent to a second parent on the cloud storage. In some embodiments, the first parent and second parent are different folders within a user's cloud storage drive. These parent folders will have different sharing permissions as well, in some embodiments. For example, the first parent folder might not be shared with any other users, whereas a user might have previously shared the second parent folder with one or more other users of the cloud services platform. FIG. 25 illustrates, in the inset 2500 that indicates the file system hierarchy of the user's cloud storage drive, that the user takes the folder illustrated in FIG. 23 and moves this folder from the first parent folder to a second parent folder. The new set of records 2505 illustrates the result of this operation.

Next, the process 2400 removes (at 2410) the copy of the folder key encrypted with the first parent key. Referring to FIG. 23, this means that the folder record 2345 is removed. In some embodiments, the user device (or server, if the user accesses the cloud storage via a web browser) downloads the folder record and decrypts the folder key, in addition to commanding the cloud storage servers to remove the record from the storage. As the folder key is not replicable (because the random seed data used to generate the folder key is not replicable) and is required to decrypt the various data assets, the device needs to ensure that it has a copy of the folder key or the seed data) before actually removing the record containing the folder key from cloud storage.

The process then encrypts (at 2415) the folder key with the second parent key (e.g., a second chaining key), and modifies (at 2420) the reference in the folder record to refer to the second parent record. In FIG. 25, the records 2310-2345 that are below the folder record in the hierarchy (e.g., the structure and content records of the assets, etc.) remain unchanged after the move. That is, the encryption on all of the data assets does not need to be modified so long as they are moved together (if a data asset is itself moved to a different folder, its encryption will change). However, the folder record 2345 is modified to include a newly encrypted folder key (that is, the folder key is the same but it is encrypted with a different chaining key) and as a result to refer to a different chaining key (and parent record). As shown, the folder record 2345 now refers to a new parent record 2510 rather than the previous parent record 2350. The new parent record 2510 includes multiple copies of its own chaining key, in this case encrypted with the same keys as the first chaining key.

The chaining of keys within the folder structure hierarchy also enables easy sharing of folders or other collections of data assets. If a data asset is shared individually, then some embodiments encrypt the content-specific key for that data asset with one or more different public keys (of the different users with which the asset is shared), and list identifiers for these public keys as part of the structure record data. However, if a collection of data assets (e.g., a folder, a recipe book with numerous recipes treated as separate data assets, a note with numerous attachments) is shared with a second user, rather than separately encrypting each of the data assets (i.e., the data assets' structure records) with the public key of the second user, some embodiments encrypt either the chaining key or the folder-level key with the second user's public key. If the first user removes the second user's ability to access the set of data assets, then the copy of the chaining private key encrypted with the second user's public key is removed from the parent record.

If the data asset is shared individually, then some embodiments encrypt the content-specific key with one or more different public keys, and list identifiers for these public keys as part of the structure record data. For instance, if a first user shares an individual data asset with three other users, then (at least) four copies of the content-specific key are stored in the structure record for that data asset, each copy encrypted with the public key of one of the four users. In addition, in some embodiments, other keys may also be used to encrypt the content-specific key. For example, some embodiments do not directly encrypt the content-specific key in the structure record with the user key of the owner of the data asset, with the user key instead used to access a high-level key of a hierarchical set of encrypted keys, one of which encrypts the content-specific key so that the owning user can access the content.

Figure 26:
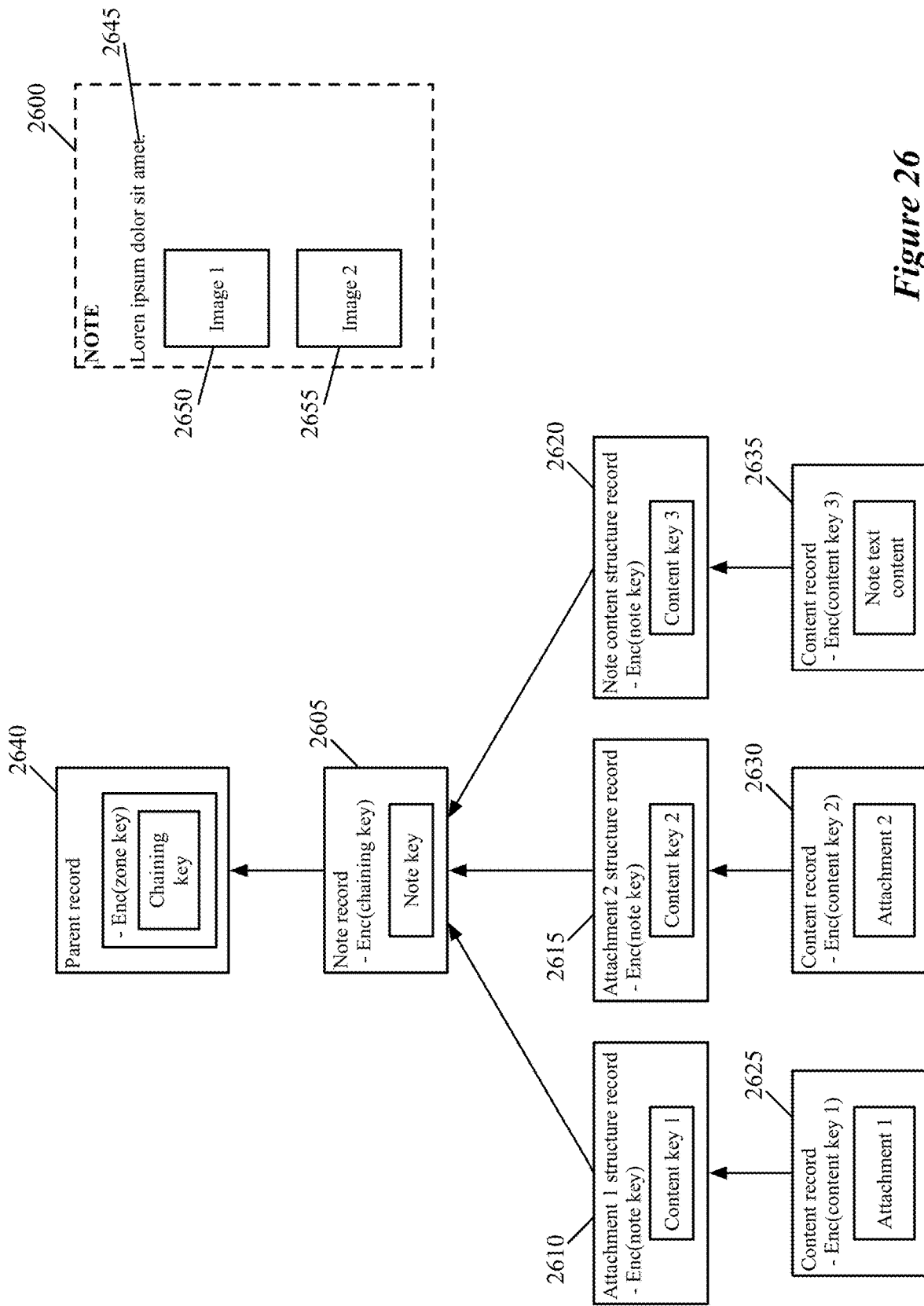
FIG. 26 conceptually illustrates the encryption of a note for storage in a user's cloud storage drive.

FIG. 26 conceptually illustrates the encryption of a note 2600 for storage in a user's cloud storage drive. As shown, the note 2600 includes text content 2645 as well as two image attachments 2650 and 2655. In some embodiments, notes documents treat embedded or attached files (e.g., images, videos, drawings, maps, links, audio files, document files, etc.) as attachments, and they are not stored as part of the content of the note itself. Thus, the note is stored similarly to a folder, with multiple data assets stored as subsidiary records to the record for the note.

Specifically, the figure illustrates a note record 2605 with three subsidiary structure records, each for a different data asset of the note. The note record 2605 stores a note key 2610 (e.g., a private key generated by the document that created the note, using randomized seed data as described above). The structure records include two structure records 2610 and 2615 for the attachments and a third structure record 2620 for the text content of the note. Each of these structure records 2610-2620 stores a separate content key, all three of which are encrypted with the same note key stored in the note record 2605. The content keys are then used to encrypt the content of the respective data assets in records 2625-2635 (i.e., the two attached images and the text content). These content records 2625-2635 each refer to their respective content keys (in the respective structure records), while the structure records 2610-2620 all refer to the same note key (in the note record 2605). The note is stored in a folder in some embodiments, and therefore the note key in the note record 2605 is encrypted using a chaining key (e.g., a folder key of the parent folder). In this example, that folder is a top-level folder, and therefore its chaining key is encrypted with a zone key (a key that the user who owns the note can access) and stored in the parent record 2640.

As mentioned, collections of assets, such as a note or a folder, may be shared with other users through cloud storage. These collections of assets are shared in such a way that the recipient user can decrypt the assets in the collection, but no other assets in the owning user's cloud storage drive. To minimize the amount of encryption/decryption required, some embodiments only encrypt the top-level key of the shared collection with the public key of the recipient user, rather than encrypting each data asset with the user key.

Figure 27:
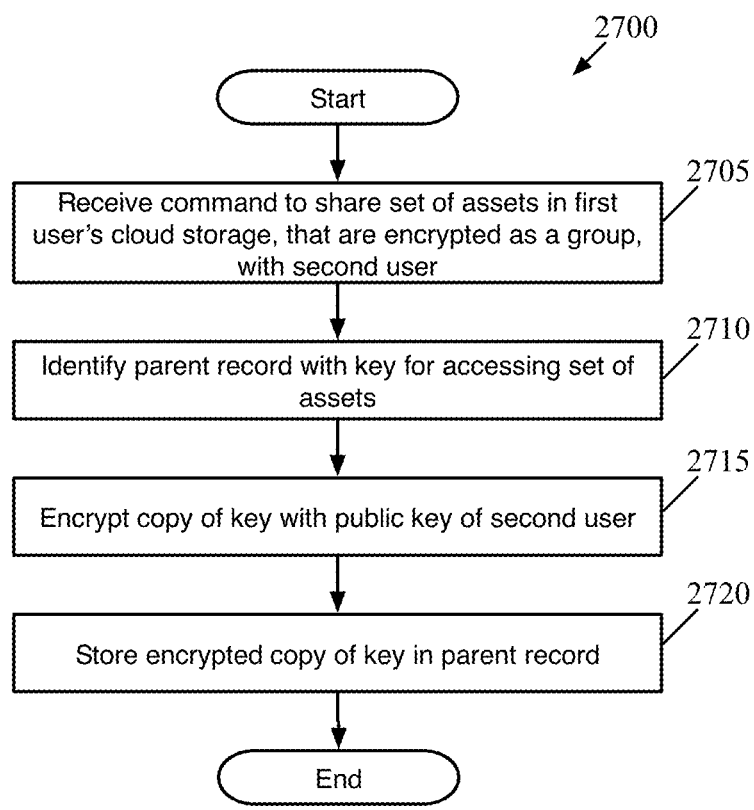
FIG. 27 conceptually illustrates a process of some embodiments for sharing a set of assets with another user.

FIG. 27 conceptually illustrates a process 2700 of some embodiments for sharing a set of assets with another user. In some embodiments, the process 2700 is also performed by the user device via which the user shares a collection of data assets with another user. For instance, if the user is editing a note with attachments on her smart phone or tablet and opts to share that note with a recipient user, the user device performs the process 2700 to encrypt the data such that the recipient user can access the note (in addition to sending a communications message to the recipient user with a link to the note on cloud storage. The process 2700 will be described in part by reference to FIG. 28, which illustrates the note of FIG. 26 being shared with a second user.

Figure 28:
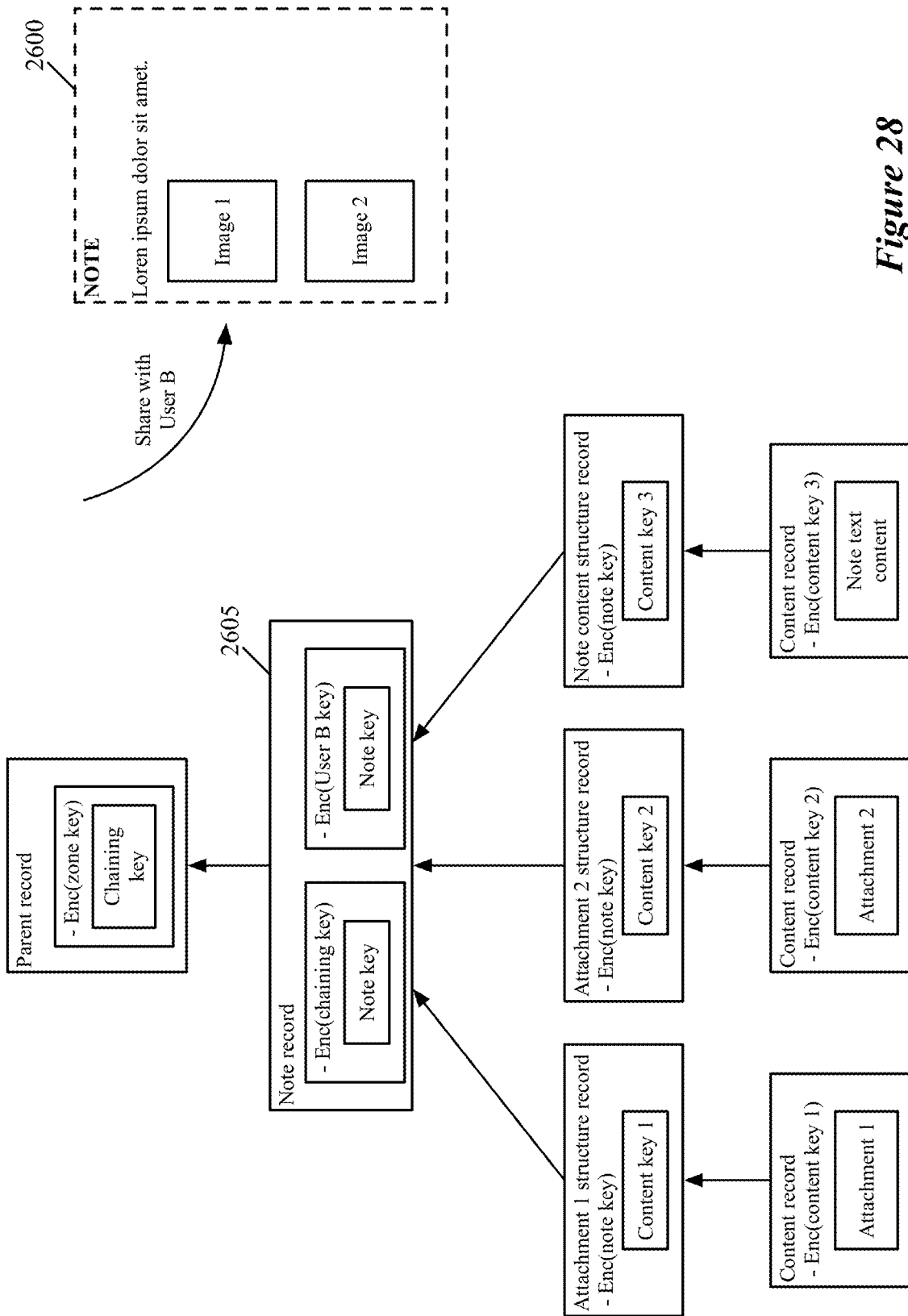
FIG. 28 illustrates the note of FIG. 26 being shared with a second user.

As shown, the process 2700 begins by receiving (at 2705) a command to share a set of assets in a first user's cloud storage, that are encrypted as a group, with a second user. For instance, if a user performs the operations shown in FIGS. 2-3 to share a note (that has attachments) through a cloud services platform with one or more additional users, that note will be treated as a collection of assets. FIG. 28 illustrates that the owner of the note 2600 shares that note with a second user (User B).

The process 2700 identifies (at 2710) a parent record with a key for accessing the set of assets, encrypts (at 2715) a copy of the key using the public key of the second user, and stores (at 2720) an encrypted copy of the key in the parent record. In order to perform these actions, in some embodiments the device downloads the identified record and decrypts the key stored in the identified record, so that the key can then be re-encrypted with the public key of the second (recipient) user. This public key, as described in further detail below in Section V, may be stored in a key repository within the cloud services platform, and may be diversified by the cloud services servers for additional user privacy. In some embodiments, the identified record is the record of the collection being shared. For example, if a folder is shared, then the record for that folder is identified and the folder key is encrypted. Referring to FIG. 23, if the folder (folder 1) was shared, then some embodiments would encrypt a second copy of the folder key stored in the folder record 2345 with the public key of the recipient user, and store that additional copy in the folder record as well.

As shown in FIG. 28, when the note 2600 is shared, the user device encrypts a second copy of the note key with the public key of User B and stores this in the note record 2345 (along with a reference to the key used for encryption, and thus the key required for decryption). If the note were to be shared with several additional users, then the note record 2345 would include additional copies of the note key encrypted with the public key of each of these additional users. By sharing the note (or a folder, or other collection of assets) in this way, only the one key (the parent key) needs to be encrypted with the recipient user public key, and the encryption on each of the data assets in the collection remains unchanged.

V. Public Key Diversification

As noted above, in some embodiments the cloud services uses asymmetric encryption with public-private key pairs for each user. A data asset is encrypted using the public keys of each user with whom the data asset is shared, and thus the data asset can be decrypted with any of the corresponding private keys. That is, each user account on the cloud services platform has a private key known only to devices registered with the user account (e.g., derived from the password for the user account). In some embodiments, the cloud services platform stores a public key repository with the public keys of all of the users of the account, from which the framework on the sharing device requests the public keys for users with which a data asset will be shared. When different data assets are shared with different users (by the same application or by different applications), the framework of some embodiments requests these users' different public keys from the cloud services servers so as to encrypt the data asset with each of these keys.

However, the shared data assets for multiple applications are stored in a public database of the cloud services platform and are thus accessible (though not necessarily decryptable) by all of these multiple applications (and thus the application developers). Because the encrypted data assets are stored in a manner that lists the public keys that were used to encrypt each record (as described in greater detail above in Section IV), using traditional cryptography with a single public key for each user would allow developers to access these records to identify what was being shared with different users, thus violating user privacy expectations. The developer of a first application would be able to correlate user behavior across both the first application and many other applications, when the user might expect that her behavior on a second application would be anonymous with respect to the first application. To maintain this cross-application anonymity, in a traditional system the user would need a separate public-private key pair for each application. Given the large number of unaffiliated applications users often install on their mobile devices, this solution would use excess storage for the private keys (requiring O(n) local storage on the device, where n is the number of applications that share data) and would generally overcomplicate key management.

Instead, to add further variability, some embodiments use a technique to diversify each user's public key, so that different (but equally valid for the same private key) public keys are sent to different applications. In some embodiments, the public key repository stores the public key as a first value (g) that is a generator of a cyclic group and a second value that is this generator raised to a power ($g^x$), where this power x is the corresponding private key (using a traditional discrete-logarithm cryptography system, such as DH, Elgamal, or ECDH). When an application requests the public key for this user, the repository randomly selects a new power a (a member of the cyclic group), and returns the values ($g^a$, $g^{ax}$) as the public key. The private key x will be able to decrypt data encrypted with ($g^a$, $g^{ax}$) in the same way as encrypting data encrypted with (g, $g^x$), as $g^a$ is actually just a new generator of the cyclic group, and could just have easily been the original g stored for the public key of the user.

Figure 29:
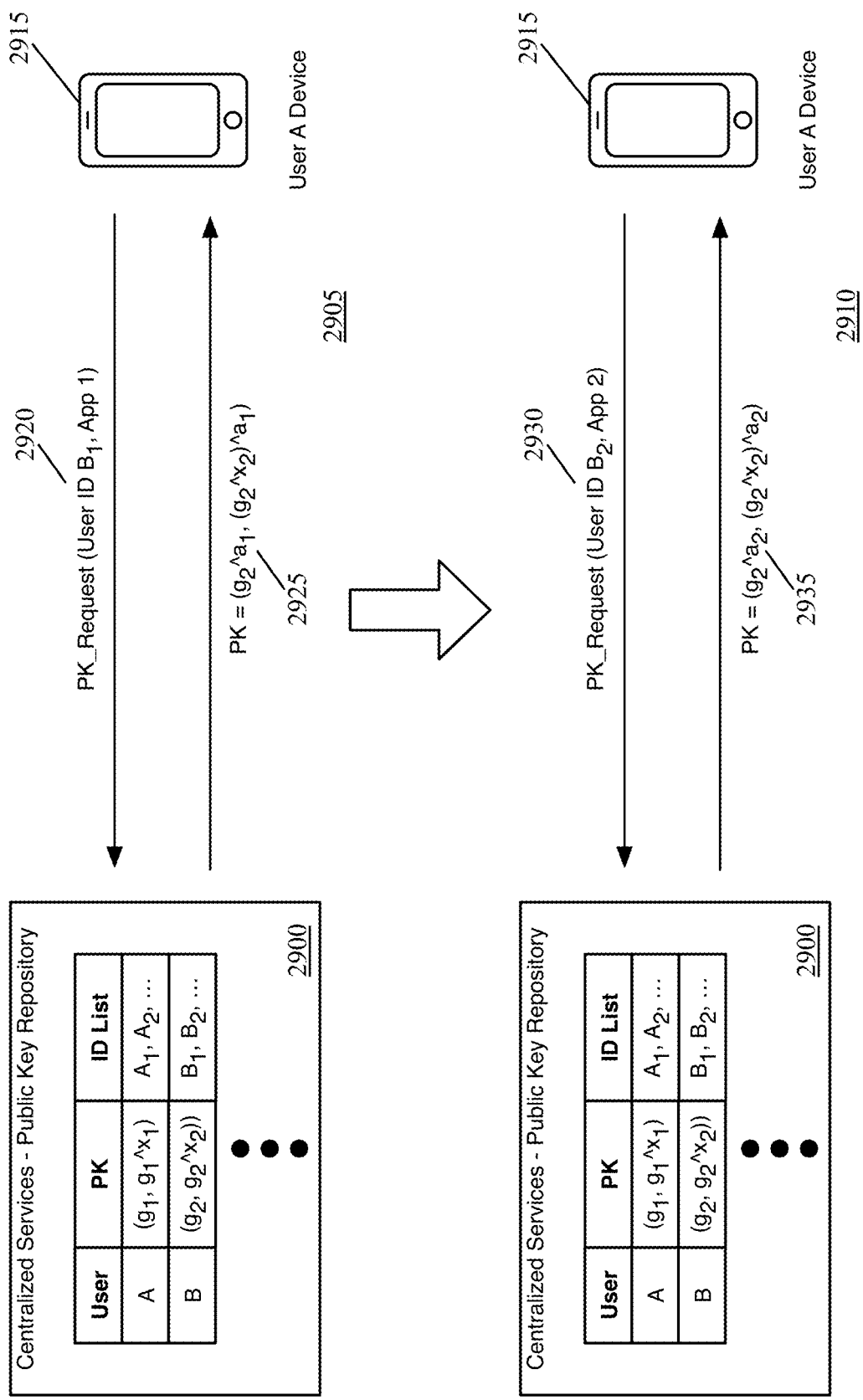
FIG. 29 conceptually illustrates an example of a device belonging to a first user requesting public keys for a second user, with the requests coming from two different applications on the device.

FIG. 29 conceptually illustrates an example of a device 2915 belonging to a first user (User A) requesting public keys for a second user (User B), with the requests coming from two different applications on the device 2915 over two stages 2905 and 2910. In this example, the device 2915 communicates with a public key repository 2900, which may represent a single server or multiple servers belonging to a cloud services platform.

As shown, the public key repository 2900 stores public key (pk) and identifier information for each user of the cloud services platform. In some embodiments, the public keys are posted to the public key repository by the user as part of their initial sign-up with the repository. The user public key may change when the user changes her password, as the private key (and thus the public key) is derived based in part on user account password in some embodiments. Some embodiments store numerous user identifiers for each user (i.e., $A_1$, $A_2$, etc. for user A) rather than a single identifier in order to prevent the aforementioned cross-application data correlation. Even if separate application developers were to collaborate, the user identifiers could not be used to identify the same user on multiple unrelated applications.

In some embodiments, the cloud services platform and associated devices use a discrete logarithm type cryptography system, such as DH, Elgamal, ECDH for the asymmetric encryption/decryption. The system of some embodiments uses key generation, encryption, and decryption algorithms, as is standard, as well as a public key randomization algorithm that enables public key diversification.

Throughout this section, it can be assumed that all the mathematical operations are taken under a cyclic group of prime order q. The key generation algorithm (KeyGen) initially randomly samples a generator g of the cyclic group (or uses a hard-coded generator, as is often the case with such algorithms), then randomly selects $x \in Z_q^*$ (that is, the set of integers with a range of 1 to q-1). The selected element x is set as the private key (sk=x), while the public key is set as pk=(g, $g^x$), using a two-tuple as the public key (because the generator g may not be hard-coded in this case, and could be changed for the public key provided by the key repository). As is well-known, all of the exponent operations are modulo q, the order of the cyclic group.

The encryption algorithm (Encrypt(pk, m)) takes as its input a public key pk=(A,B) and a message m to encrypt. This algorithm randomly selects a value $r \in Z_q^*$, and outputs ciphertext $C=(A^r, B^r \cdot m)$. In the case of a public key (g, $g^x$), the ciphertext $C=(g^r, g^{x \cdot r} \cdot m)$. The decryption algorithm (Decrypt(sk, C)) takes as its input a private key sk=x and ciphertext $C=(C_1, C_2)$, and computes $C_2 \cdot (C_1^x)^{-1}$ in order to recover a message m. Thus, when $C=(g^r, g^{x \cdot r} \cdot m)$, decryption computes $(g^{r \cdot x} \cdot m) \cdot g^{-r \cdot x} = m$.

In this context, the public key repository of some embodiments uses a randomization algorithm for the public key RandPK(pk). The randomization algorithm, given pk=(A,B) as its input, selects $a \in Z_q^*$ and outputs a randomized public key pk'=($A^a$, $B^a$). Thus, when pk=(g, $g^x$), the randomized output is ($g^a$, $g^{a \cdot x}$). Because of the nature of the encryption and decryption algorithms, these still work equally well with the randomized public key. Essentially, the randomization algorithm performs a switch of generator used to calculate the public key. That is, rather than the generator g, the randomization algorithm switches the generator to a new generator $h=g^a$. The pairs of keys ((g, $g^x$), x) and ((h, $h^x$) are equivalent in function, but indistinguishable from a non-equivalent pair (as x is not known because it is the private key). In addition, because the randomized public key could have just as easily been the original public key calculated by the key generation algorithm, the security of the cryptography system is not affected by this randomization.

Thus, as shown in FIG. 29, the public key repository 2900 stores a first public key ($g_1$, $g_1^{x1}$) for user A and a second public key ($g_2$, $g_2^{x2}$) for user B. In the first stage 2905, a first application on the device 2915 wants to share a data asset with user B, and thus the device 2915 sends a request 2920 to the public key repository 2900. This request identifies the application (App 1) and the user based on the user identifier for that user provided to the first application ($A_1$). Based on mapping the identifier $A_1$ to the user A, the public key repository 2900 identifies the public key ($g_2$, $g^{x2}$) and applies the randomization algorithm of some embodiments. As such, the public key repository 2900 returns a public key 2925 ($g_2^{a1}$, $g_2^{a1 \cdot x2}$) based on a random selection of $a_1$, which the device 2915 uses to encrypt the shared data managed by the first application.

In the second stage 2910, a second application on the device 2915 also wants to share a different data asset that it manages with the same user B, and thus the device 2915 sends another request 2930 to the public key repository, identifying the second application (App 2) and the user based on the different user identifier provided to the second application ($A_2$). Based on mapping the identifier $A_2$ to the user A, the public key repository 2900 identifies the public key ($g_2$, $g_2^{x2}$) and applies the randomization algorithm of some embodiments. As such, the public key repository 2900 returns a public key 2935 ($g_2^{a2}$, $g_2^{a2 \cdot x2}$) based on a random selection of $a_2$. The device 2915 uses this public key 2935 to encrypt the shared data managed by the second application. Although the public keys ($g_2^{a1}$, $g_2^{a1 \cdot x2}$) and ($g_2^{a2}$, $g_2^{a2 \cdot x2}$) are different (assuming that $a_1 \neq a_2$), the private key $x_2$ known to User B's devices will be able to decrypt the data assets encrypted with either of the public keys.

Figure 30:
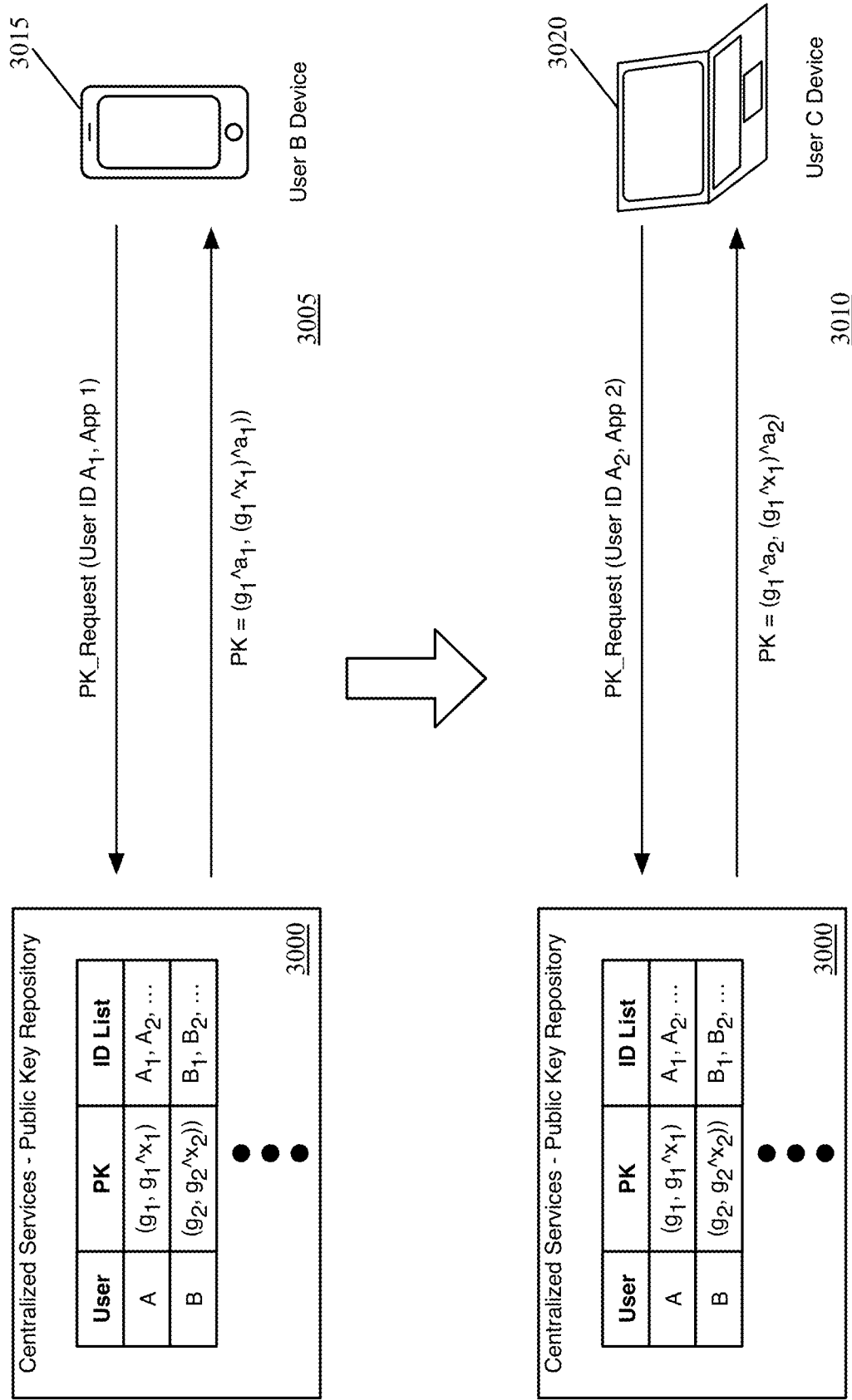
FIG. 30 illustrates similar public key diversification by a public key repository, in this case in response to requests for a first user's public key from two different devices of two different users.

FIG. 30 illustrates similar public key diversification by a public key repository 3000, in this case in response to requests for a first user's public key from two different devices 3015 and 3020 of two different users over two stages 3005 and 3010. The public key repository 3000 stores the same public keys for user A and user B as in the previous figure. In the first stage 3005, the device 3015 of a second user (User B) passes on a request from App 1 for the first user's public key, using identifier $A_1$. The repository returns a randomized public key ($g_1^{a1}$, $g_1^{a1 \cdot x1}$) based on a randomly selected value $a_2$. In the second stage 3010, the device 3020 of a third user sends a similar request, though for a different application (App 2). Receiving requests from two applications operating on different devices is the same as receiving requests from two applications operating on the same device, and thus the repository again returns a different randomized public key ($g_1^{a2}$, $g_1^{a2 \cdot x1}$) to the device 3020.

Figure 31:
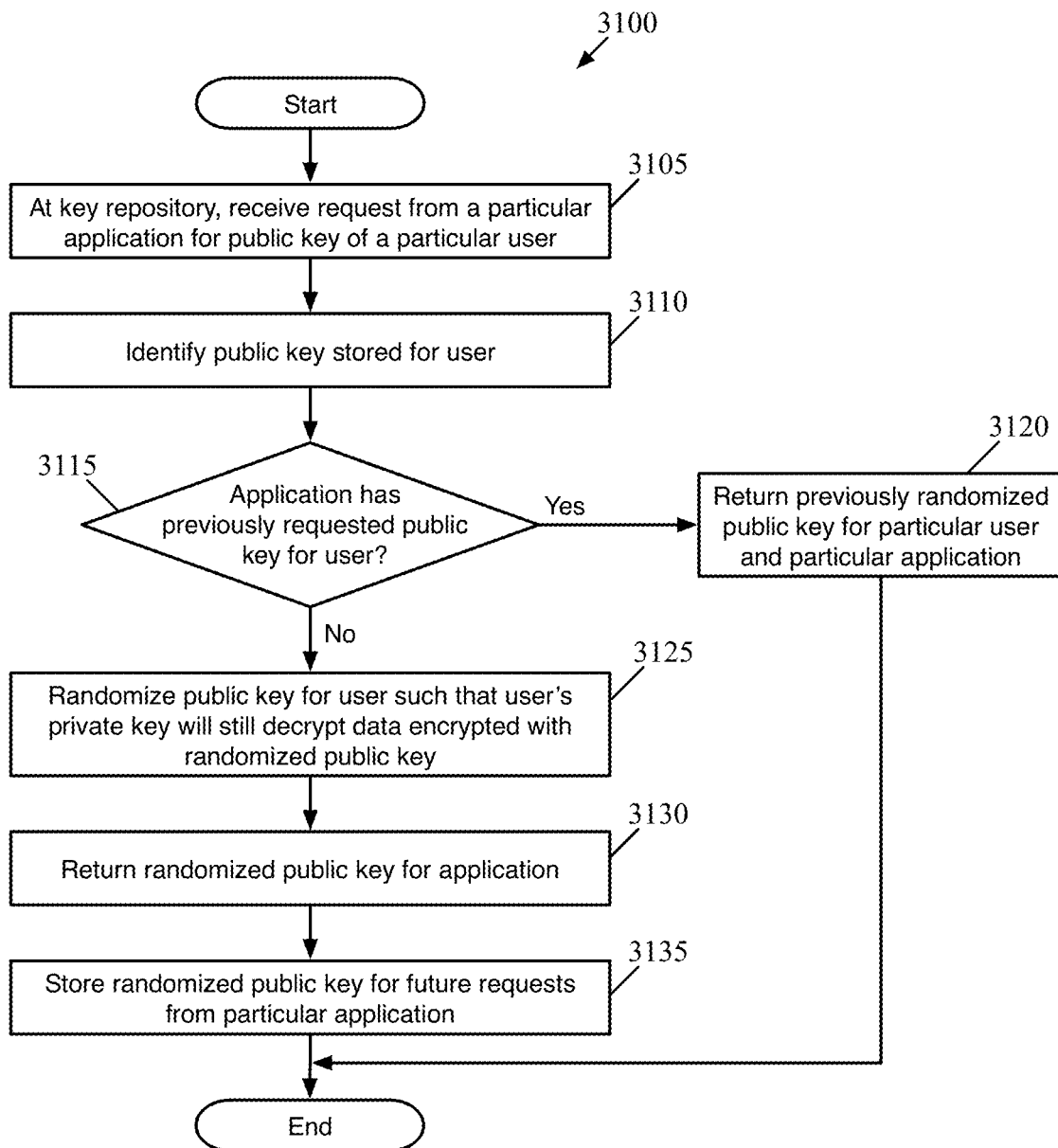
FIG. 31 conceptually illustrates a process of some embodiments for returning a public key in response to a device request.

FIG. 31 conceptually illustrates a process 3100 of some embodiments for returning a public key in response to a device request. The process 3100 is performed by a central server of a cloud services platform in some embodiments (e.g., a server that stores or has access to the public key repository for the cloud service platform), in response to requests from devices that are registered with an account on the cloud service platform. In some embodiments, the requests may also be received from other parts of the cloud services platform, when a user is accessing her cloud services account from an unregistered device.

As shown, the process 3100 begins by receiving (at 3105), at the key repository, a request from a particular application for the public key of a particular user. Often, this request occurs because an application operating on a device of a different user is instructed to share one or more data assets with the particular user. The application, through the OS-level framework of the device, sends a request to the cloud services platform for the public key of the particular user, as this key is needed to encrypt the data assets for sharing.

The process then identifies (at 3110) the public key stored for the user. In some embodiments, the public key repository stores a mapping of user identifiers to public keys. In addition, in some embodiments, each application registered with the cloud services platform uses different identifiers for the users of the platform, so that applications cannot share their data about users (i.e., so user behavior within one application or group of applications is anonymous to other applications). In some embodiments, the public key repository stores a many-to-one mapping of user identifiers to public keys. In other embodiments, the public key repository stores a mapping of application and user identifier combinations to public keys, which allows for a user identifier to be used for different users with different applications (i.e., the identifier A might represent a first user to application 1 and a second user to application 2).

The process then determines (at 3115) whether the application has previously requested a public key for the particular user. Some embodiments store the randomized public key sent to a particular application for re-use any time that application (or a related application from the same application developer) sends another request (for instance, an instance of the application on an unrelated device, that would not have previously had access to the public key of the particular user). If the application has previously requested a public key for the particular user, the process returns (at 3120) the previously randomized public key for the particular user and particular application, then ends. In other embodiments that do not store the randomized public keys (e.g., as described below by reference to FIG. 32), operation 3115 and operation 3120 are not performed as part of the process for responding to public key requests.

Otherwise, the process randomizes (at 3125) the identified public key for the particular user such that the particular user's private key will still decrypt data encrypted with the randomized public key. Some embodiments store the public keys as a tuple of a generator of a cyclic group and the generator raised to the power of the private key. The randomization algorithm described above (and below by reference to FIG. 33) is used in some embodiments, that effectively selects a new generator of the cyclic group for each operation.

The process 3100 then returns (at 3130) the randomized public key for the application, sending this to the requesting device (or a different server of the cloud services platform, in the case in which the user sharing the data assets accesses the cloud storage via an unregistered device). The process also stores (at 3135) the randomized public key for future requests from the same application. As mentioned, some embodiments do not store this data (e.g., to prevent from an attack on the data that would enable an attacker to map a user's diversified public keys with each other), in which case operation 3135 is omitted.

The process 3100 (and the examples shown in FIGS. 29 and 30) requires the central repository to store a public key for user/application combination. Without the key diversification, a system with 1 million users would already need to store 1 million public keys. However, if each user shares data assets for an average of 20 applications, this becomes 20 million public keys. Rather than store each public key for an application/user combination, some embodiments use a pseudo-random, deterministic process when randomizing the public key, so that this process can be performed each time a public key is requested by an application for a user.

In addition, using this deterministic on-the-fly diversification (rather than storing all of the public key variations) provides advantages in terms of protecting user information in case the repository is accessed by an attacker. Storing the public keys mapped to the various applications would enable an attacker to identify the applications that a user has used (at least for sharing purposes). Furthermore, in some cases, even without gaining illicit access, a sophisticated attacker could determine the differences in server response time for public keys that are already stored (i.e., for applications that a user has previously used for sharing) compared to keys that the server has to generate for the first time (i.e., for applications that a user has not previously used for sharing). The deterministic re-generation of the public keys for each application, on the other hand, results in consistent behavior from the key repository irrespective of whether the user whose public key is requested has previously used an application.

Figure 32:
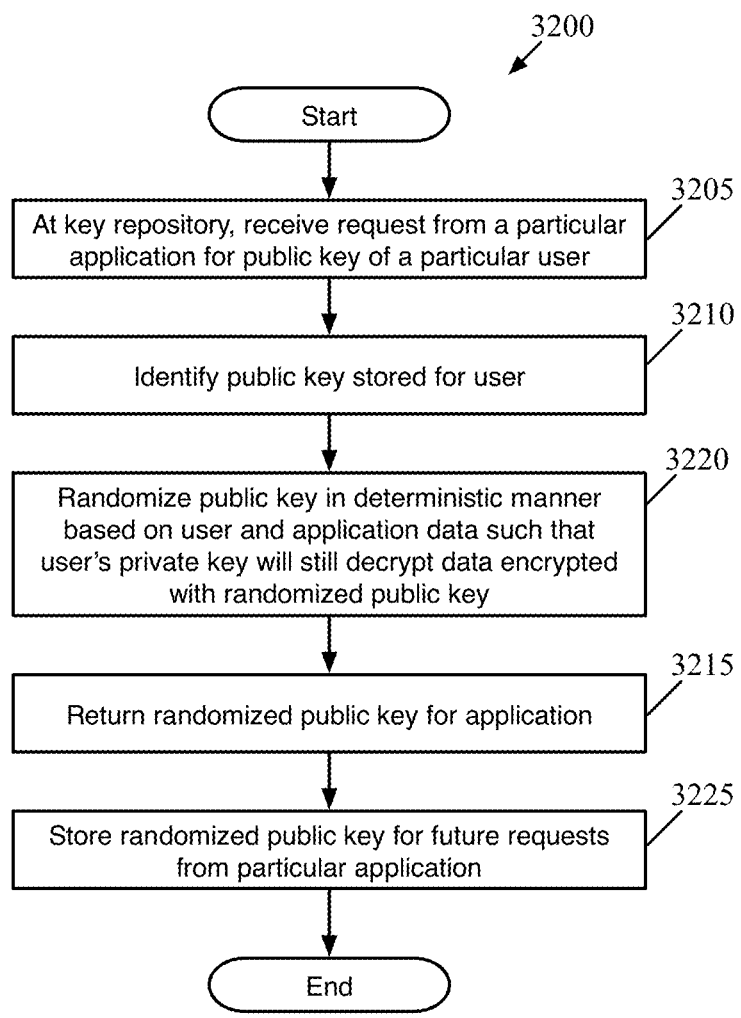
FIG. 32 conceptually illustrates a process of some embodiments for returning a public key in response to a device request, that does not require storage of the diversified keys.

FIG. 32 conceptually illustrates a different process 3200 of some embodiments for returning a public key in response to a device request, that does not require storage of the diversified keys. The process 3200 is performed by a central server of a cloud services platform in some embodiments (e.g., a server that stores or has access to the public key repository for the cloud service platform), in response to requests from devices that are registered with an account on the cloud service platform. In some embodiments, the requests may also be received from other parts of the cloud services platform, when a user is accessing her cloud services account from an unregistered device. In this case, the public key repository simply stores the non-diversified public key for each user.

As shown, the process 3200 begins by receiving (at 3205), at the key repository, a request from a particular application for the public key of a particular user. Often, this request occurs because an application operating on a device of a different user is instructed to share one or more data assets with the particular user. The application, through the OS-level framework of the device, sends a request to the cloud services platform for the public key of the particular user, as this key is needed to encrypt the data assets for sharing.

The process then identifies (at 3210) the public key stored for the user. In some embodiments, the public key repository stores a mapping of user identifiers to public keys. In addition, in some embodiments, each application registered with the cloud services platform uses different identifiers for the users of the platform, so that applications cannot share their data about users (i.e., so user behavior within one application or group of applications is anonymous to other applications). In some embodiments, the public key repository stores a many-to-one mapping of user identifiers to public keys. In other embodiments, the public key repository stores a mapping of application and user identifier combinations to public keys, which allows for a user identifier to be used for different users with different applications (i.e., the identifier A might represent a first user to application 1 and a second user to application 2).

Next, the process 3200 randomizes (at 3215) the public key in a deterministic manner based on the user and application information (e.g., user-specific and appliation-specific identifiers) such that the particular user's private key will still decrypt data encrypted with the randomized public key. In some embodiments, the randomization involves the selection of the variable a, the power to which the stored public key is raised to generate the diversified public key (as described in more detail below by reference to FIG. 33).

Specifically, in some embodiments, this value is generated using a hash function (e.g., an HMAC hash function). For instance, some embodiments use the HMAC-based Key Derivation Function (HKDF) to generate an entropy value (e) based on user- and application-specific variables. Some embodiments use a user account identifier and a application-specific user identifier. With q being the order of the cyclic group, some such embodiments generate a as, e.g., (e mod q−1)+1. By generating a in this manner, the public key will be diversified and will always be the same for a specific user-application combination without requiring the storage of each such diversified public key.

Figure 33:
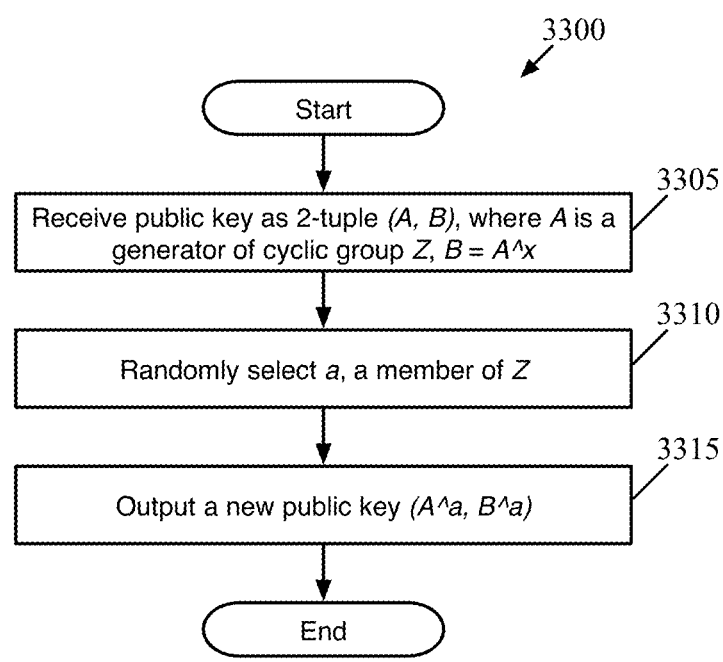
FIG. 33 conceptually illustrates a process of some embodiments for generating a randomized public key for a user, given their stored public key.

As mentioned, FIG. 33 conceptually illustrates a process 3300 of some embodiments for generating a randomized public key for a user, given their stored public key. The public key repository performs the process 3300 as part of the process for responding to a request for a user's public key (e.g., at operation 3125 of the process 3100).

As shown, the process 3300 receives (at 3305) a public key as a two-tuple pk=(A,B), where A is a generator of a cyclic group Z (e.g., a cyclic group of prime order) and $B=A^x$. In this case, x is the corresponding private key. The process then randomly (using any sort of randomization algorithm, such as that described above by reference to FIG. 32) selects (at 3310) a value a, which is a member of the cyclic group Z, and outputs (at 3315) a new public key pk'=($A^a$, $B^a$), and ends. In this case, $A^a$ will be a different (but equally valid) generator of the cyclic group, and $B^a=A^{ax}$, so this effectively just changes the generator used for the public key. Thus, the new public key works equally well for the private key x as the original, and each application can use a different public key for the same user without the user being required to store numerous private keys.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 34:
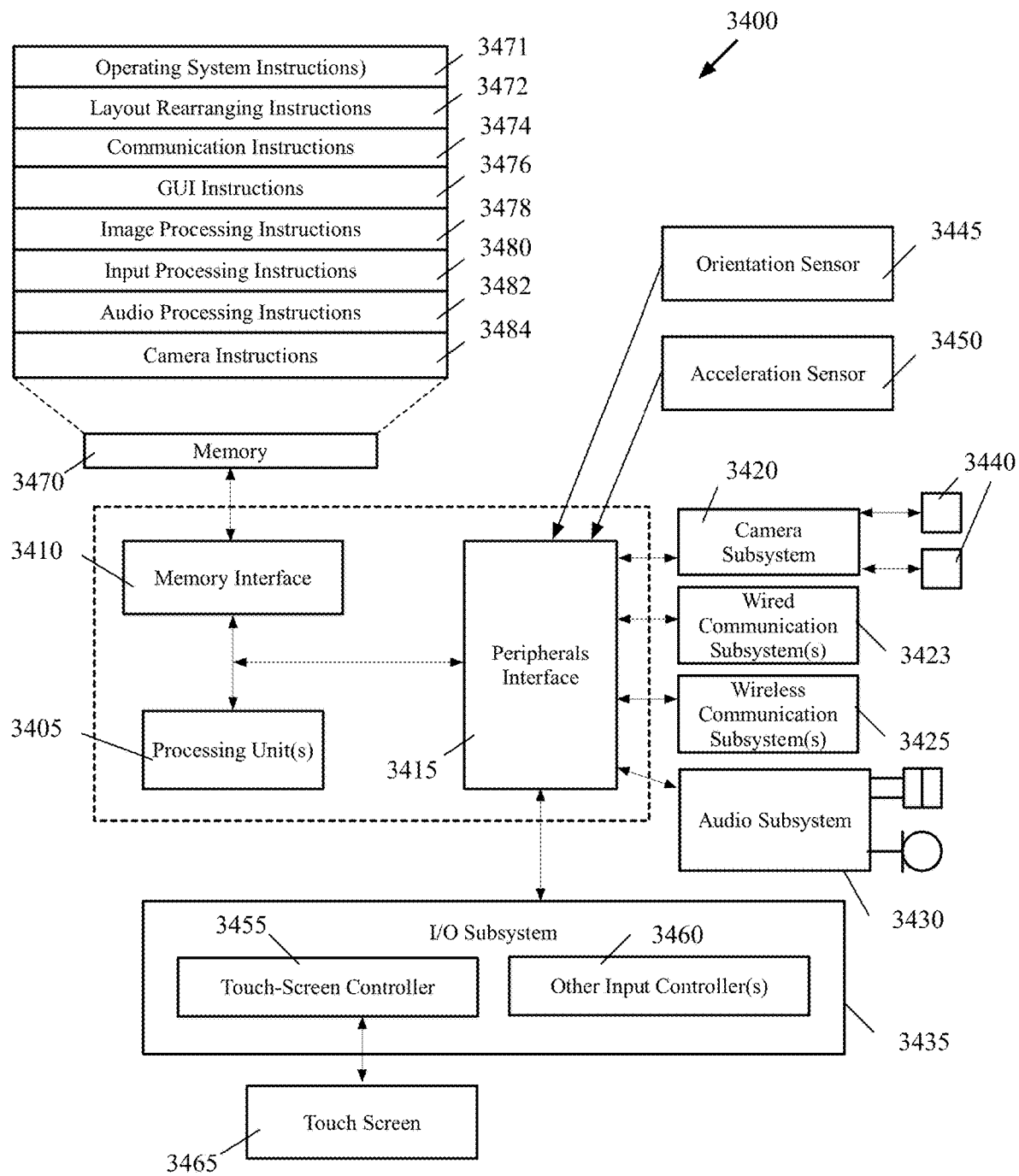
FIG. 34 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 34 is an example of an architecture 3400 of such a mobile computing device. As shown, the mobile computing device 3400 includes one or more processing units 3405, a memory interface 3410 and a peripherals interface 3415.

The peripherals interface 3415 is coupled to various sensors and subsystems, including a camera subsystem 3420, a wired communication subsystem(s) 3423, a wireless communication subsystem(s) 3425, an audio subsystem 3430, an I/O subsystem 3435, etc. The peripherals interface 3415 enables communication between the processing units 3405 and various peripherals. For example, an orientation sensor 3445 (e.g., a gyroscope) and an acceleration sensor 3450 (e.g., an accelerometer) is coupled to the peripherals interface 3415 to facilitate orientation and acceleration functions.

The camera subsystem 3420 is coupled to one or more optical sensors 3440 (e.g., a charged coupled device (CCD) optical sensor, a complementary metal-oxide-semiconductor (CMOS) optical sensor, etc.). The camera subsystem 3420 coupled with the optical sensors 3440 facilitates camera functions, such as image and/or video data capturing. The wired communication subsystem 3423 and wireless communication subsystem 3425 serve to facilitate communication functions.

In some embodiments, the wireless communication subsystem 3425 includes radio frequency receivers and transmitters, and optical receivers and transmitters (not shown in FIG. 34). These receivers and transmitters of some embodiments are implemented to operate over one or more communication networks such as a GSM network, a Wi-Fi network, a Bluetooth network, etc. The audio subsystem 3430 is coupled to a speaker to output audio (e.g., to output voice navigation instructions). Additionally, the audio subsystem 3430 is coupled to a microphone to facilitate voice-enabled functions in some embodiments.

The I/O subsystem 3435 involves the transfer between input/output peripheral devices, such as a display, a touch screen, etc., and the data bus of the processing units 3405 through the peripherals interface 3415. The I/O subsystem 3435 includes a touch-screen controller 3455 and other input controllers 3460 to facilitate the transfer between input/output peripheral devices and the data bus of the processing units 3405. As shown, the touch-screen controller 3455 is coupled to a touch screen 3465. The touch-screen controller 3455 detects contact and movement on the touch screen 3465 using any of multiple touch sensitivity technologies. The other input controllers 3460 are coupled to other input/control devices, such as one or more buttons. Some embodiments include a near-touch sensitive screen and a corresponding controller that can detect near-touch interactions instead of or in addition to touch interactions.

The memory interface 3410 is coupled to memory 3470. In some embodiments, the memory 3470 includes volatile memory (e.g., high-speed random access memory), non-volatile memory (e.g., flash memory), a combination of volatile and non-volatile memory, and/or any other type of memory. As illustrated in FIG. 34, the memory 3470 stores an operating system (OS) 3471. The OS 3471 includes instructions for handling basic system services and for performing hardware dependent tasks.

The memory 3470 also includes communication instructions 3474 to facilitate communicating with one or more additional devices (e.g., for peer-to-peer data sharing, or to connect to a server through the Internet for cloud-based data sharing); graphical user interface instructions 3476 to facilitate graphic user interface processing; image processing instructions 3478 to facilitate image-related processing and functions; input processing instructions 3480 to facilitate input-related (e.g., touch input) processes and functions; audio processing instructions 3482 to facilitate audio-related processes and functions; and camera instructions 3484 to facilitate camera-related processes and functions. The instructions described above are merely exemplary and the memory 3470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 34 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 34 may be split into two or more integrated circuits.

B. Computer System

Figure 35:
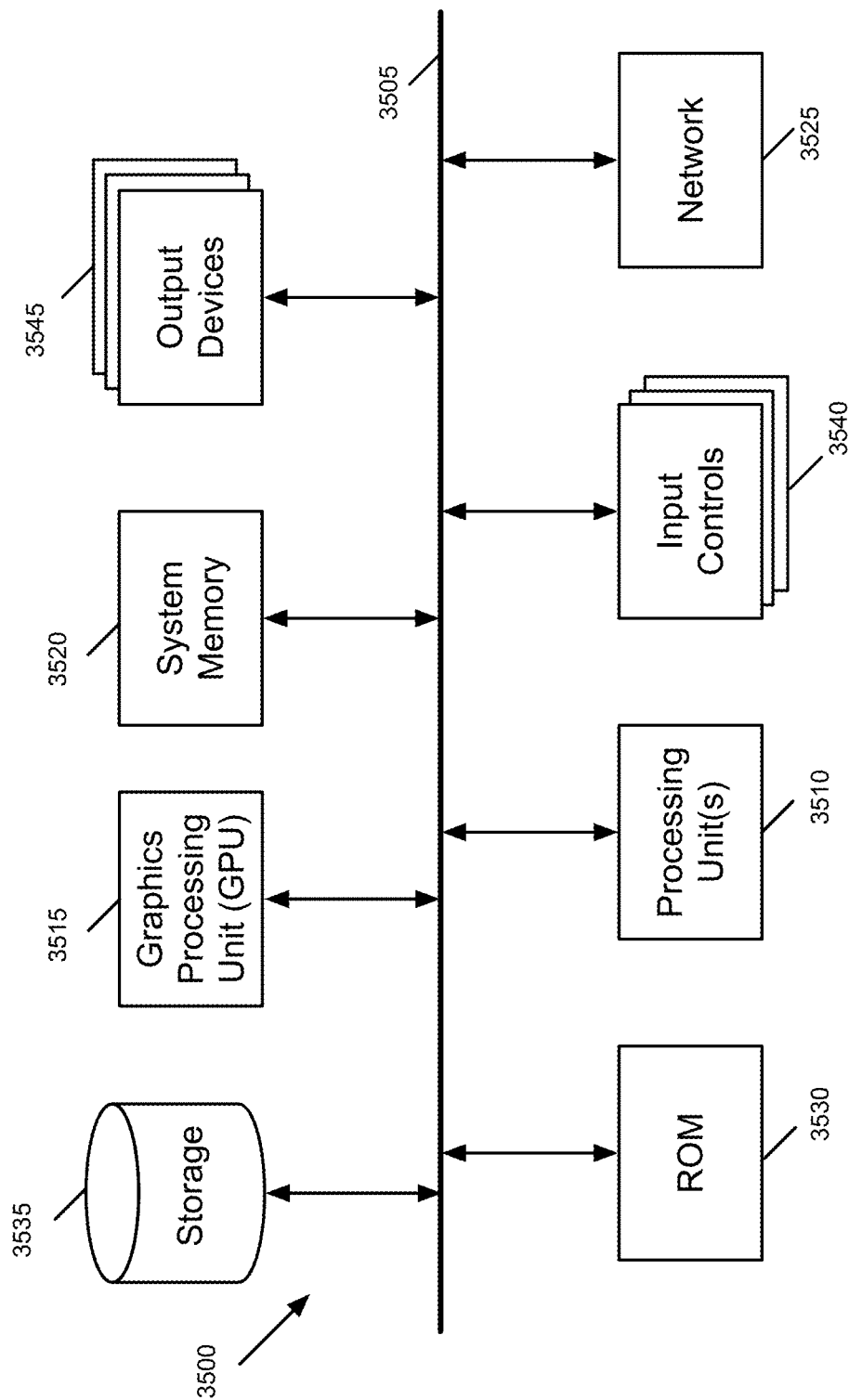
FIG. 35 conceptually illustrates another example of an electronic system with which some embodiments of the invention are implemented.

FIG. 35 conceptually illustrates another example of an electronic system 3500 with which some embodiments of the invention are implemented. The electronic system 3500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3500 includes a bus 3505, processing unit(s) 3510, a graphics processing unit (GPU) 3515, a system memory 3520, a network 3525, a read-only memory 3530, a permanent storage device 3535, input devices 3540, and output devices 3545.

The bus 3505 collectively represents all system, peripheral, and chipset buses that communicatively connect the numerous internal devices of the electronic system 3500. For instance, the bus 3505 communicatively connects the processing unit(s) 3510 with the read-only memory 3530, the GPU 3515, the system memory 3520, and the permanent storage device 3535.

From these various memory units, the processing unit(s) 3510 retrieves instructions to execute and data to process in order to execute the processes of the invention. The processing unit(s) may be a single processor or a multi-core processor in different embodiments. Some instructions are passed to and executed by the GPU 3515. The GPU 3515 can offload various computations or complement the image processing provided by the processing unit(s) 3510. In some embodiments, such functionality can be provided using CoreImage's kernel shading language.

The read-only-memory (ROM) 3530 stores static data and instructions that are needed by the processing unit(s) 3510 and other modules of the electronic system. The permanent storage device 3535, on the other hand, is a read-and-write memory device. This device is a non-volatile memory unit that stores instructions and data even when the electronic system 3500 is off. Some embodiments of the invention use a mass-storage device (such as a magnetic or optical disk and its corresponding disk drive, integrated flash memory) as the permanent storage device 3535.

Other embodiments use a removable storage device (such as a floppy disk, flash memory device, etc., and its corresponding drive) as the permanent storage device. Like the permanent storage device 3535, the system memory 3520 is a read-and-write memory device. However, unlike storage device 3535, the system memory 3520 is a volatile read-and-write memory, such a random access memory. The system memory 3520 stores some of the instructions and data that the processor needs at runtime. In some embodiments, the invention's processes are stored in the system memory 3520, the permanent storage device 3535, and/or the read-only memory 3530. For example, the various memory units include instructions for processing multimedia clips in accordance with some embodiments. From these various memory units, the processing unit(s) 3510 retrieves instructions to execute and data to process in order to execute the processes of some embodiments.

The bus 3505 also connects to the input and output devices 3540 and 3545. The input devices 3540 enable the user to communicate information and select commands to the electronic system. The input devices 3540 include alpha-numeric keyboards and pointing devices (also called "cursor control devices"), cameras (e.g., webcams), microphones or similar devices for receiving voice commands, etc. The output devices 3545 display images generated by the electronic system or otherwise output data. The output devices 3545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 35, bus 3505 also couples electronic system 3500 to a network 3525 through a network adapter (not shown). In this manner, the computer can be a part of a network of computers (such as a local area network ("LAN"), a wide area network ("WAN"), or an Intranet), or a network of networks, such as the Internet. Any or all components of electronic system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 16, 21, 22, 24, 27, and 31-33) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method comprising:
    receiving (i) a first request from a first source for a public key associated with a particular user and (ii) a second request from a second source for the public key associated with the particular user;
    distributing, by a key distribution device and to the first source, a first public key for the particular user, in response to the first request, the first public key corresponding to a private key of the particular user; and
    generating and distributing, by the key distribution device and to the second source, a second, different public key for the particular user, in response to the second request, the second, different, public key being generated from the first public key and without accessing the private key of the particular user, the second, different, public key also corresponding to the private key of the particular user, wherein the first and second sources comprise first and second applications that utilize the first and second public keys for encrypting different sets of data shared with the particular user;
    wherein data encrypted with the first public key and data encrypted with the second public key are decryptable by a device of the particular user with the private key.

2. The method of claim 1, wherein the first and second public keys are generated in such a manner that the first source and second source cannot determine that the first and second public keys are associated with the same particular user.

3. The method of claim 1, wherein the first and second applications operate on different devices of different users.

4. The method of claim 1, wherein the first and second applications operate on a same device.

5. The method of claim 1, wherein (i) the particular user is a first user, (ii) the first application operates on a device of a second user, and (iii) the first application receives the first public key, encrypts a data record with both the first public key and a public key of the second user, and stores the encrypted data record in a public database in order for the second user to share the data record with the first user.

6. The method of claim 1 further comprising:
    storing a single set of values for the public key associated with the particular user; and
    generating the first public key and the second public key from the single set of values using a randomization algorithm.

7. The method of claim 6, wherein the single set of values comprises (i) a first value that is a generator of a cyclic group and (ii) a second value that is the generator raised to a power of the private key.

8. The method of claim 7, wherein generating the first public key comprises:
    randomly selecting a first power; and
    generating a second set of values by raising the first and second values to the first power,
    wherein the second set of values is distributed as the first public key.

9. The method of claim 8, wherein generating the second public key comprises:
    randomly selecting a second power; and
    generating a third set of values by raising the first and second values to the second power,
    wherein the third set of values is distributed as the second public key.

10. The method of claim 8, wherein:
    randomly selecting the first power comprises using a pseudo-random deterministic algorithm based on an identifier for the particular user and an identifier for the first source; and
    randomly selecting the second power comprises using the pseudo-random deterministic algorithm based on the identifier for the particular user and an identifier for the second source.

11. The method of claim 7, wherein the randomization algorithm is equivalent to selecting different generators of the cyclic group for the first and second public keys.

12. The method of claim 1 further comprising generating and distributing a different public key in response to each request from a different source for the public key associated with the particular user, wherein data encrypted with any of the public keys are decrypted by the device of the particular user.

13. A non-transitory machine readable medium storing a program that, when executed by at least one processor, causes the at least one processor to perform operations, the program comprising sets of instructions for:
    receiving (i) a first request from a first source for a public key associated with a particular user and (ii) a second request from a second source for the public key associated with the particular user;
    distributing, to the first source, a first public key for the particular user, in response to the first request, the first public key corresponding to a private key; and
    generating and distributing, by a key distribution device and to the second source, a second, different public key for the particular user, in response to the second request, the second, different, public key also corresponding to the private key and the second, different, public key being generated from the first public key without accessing the private key, wherein the first and second sources comprise first and second applications that utilize the first and second public keys for encrypting different sets of data shared with the particular user;
    wherein data encrypted with the first public key and data encrypted with the second public key are decryptable by a device of the particular user with a same private key.

14. The non-transitory machine readable medium of claim 13, wherein the first and second public keys are generated in such a manner that the first source and second source cannot determine that the first and second public keys are associated with the same particular user.

15. The non-transitory machine readable medium of claim 13, wherein (i) the first source and second source are first and second applications that use the public keys to encrypt different sets of data shared with the particular user, (ii) the particular user is a first user, (iii) the first application operates on a device of a second user, and (iv) the first application receives the first public key, encrypts a data record with both the first public key and a public key of the second user, and stores the encrypted data record in a public database in order for the second user to share the data record with the first user.

16. The non-transitory machine readable medium of claim 13, wherein the program further comprises sets of instructions for:
    storing a single set of values for the public key associated with the particular user; and
    generating the first public key and the second public key from the single set of values using a randomization algorithm.

17. The non-transitory machine readable medium of claim 16, wherein the single set of values comprises (i) a first value that is a generator of a cyclic group and (ii) a second value that is the generator raised to a power of the private key, wherein the set of instructions for generating the first public key comprises:
    randomly selecting a first power by using a pseudo-random deterministic algorithm based on an identifier for the particular user and an identifier for the first source; and
    generating a second set of values by raising the first and second values to the first power,
    wherein the second set of values is distributed as the first public key.

18. The non-transitory machine readable medium of claim 13, wherein the program further comprises a set of instructions for generating and distributing a different public key in response to each request from a different source for the public key associated with the particular user, wherein data encrypted with any of the public keys are decrypted by the device of the particular user.

19. A device comprising:
    a memory; and
    at least one processor configured to:
    receive a first request from a first source for a public key associated with a particular user and a second request from a second source for the public key associated with the particular user;
    distribute, to the first source, a first public key for the particular user, in response to the first request, the first public key corresponding to a private key of the particular user;
    generate a second public key from the first public key using a randomization algorithm and without accessing the private key of the particular user, the second public key also corresponding to the private key of the particular user, and the second public key being mathematically different than the first public key, wherein the first and second sources comprise first and second applications that utilize the first and second public keys for encrypting different sets of data shared with the particular user; and
    distribute, to the second source, the second public key for the particular user, in response to the second request,
    wherein data encrypted with the first public key and data encrypted with the second public key are decryptable by another device of the particular user with the private key.

* * * * *